(12) United States Patent
Xu et al.

(10) Patent No.: US 11,112,586 B2
(45) Date of Patent: Sep. 7, 2021

(54) OPTICAL IMAGING LENS ASSEMBLY

(71) Applicant: Zhejiang Sunny Optical Co., Ltd, Ningbo (CN)

(72) Inventors: Biao Xu, Ningbo (CN); Kaiyuan Zhang, Ningbo (CN); Jianke Wenren, Ningbo (CN)

(73) Assignee: ZHEJIANG SUNNY OPTICAL CO., LTD, Ningbo (CN)

( * ) Notice: Subject to any disclaimer, the term of this patent is extended or adjusted under 35 U.S.C. 154(b) by 312 days.

(21) Appl. No.: 16/274,821

(22) Filed: Feb. 13, 2019

(65) Prior Publication Data

US 2019/0243106 A1 Aug. 8, 2019

Related U.S. Application Data

(63) Continuation of application No. PCT/CN2018/092872, filed on Jun. 26, 2018.

(30) Foreign Application Priority Data

Feb. 5, 2018 (CN) .......................... 201810113928.9
Feb. 5, 2018 (CN) .......................... 201820197135.5

(51) Int. Cl.
*G02B 13/00* (2006.01)
*G02B 5/00* (2006.01)
*G02B 9/64* (2006.01)
*G02B 13/18* (2006.01)

(52) U.S. Cl.
CPC .......... *G02B 13/0045* (2013.01); *G02B 5/005* (2013.01); *G02B 9/64* (2013.01); *G02B 13/18* (2013.01)

(58) Field of Classification Search
CPC ...... G02B 13/0045; G02B 9/64; G02B 13/18; G02B 5/005
USPC ................................ 359/708, 713, 740, 755
See application file for complete search history.

(56) References Cited

U.S. PATENT DOCUMENTS

| 2016/0124191 A1* | 5/2016 | Hashimoto | ........ G02B 13/0045 |
| | | | 359/708 |
| 2016/0154214 A1* | 6/2016 | Ishizaka | ................. G02B 9/64 |
| | | | 359/708 |
| 2018/0188484 A1 | 7/2018 | Gong et al. | |

FOREIGN PATENT DOCUMENTS

| CN | 106950681 A | 7/2017 |
| CN | 107621683 A | 1/2018 |

* cited by examiner

*Primary Examiner* — Evelyn A Lester
(74) *Attorney, Agent, or Firm* — Hauptman Ham, LLP

(57) ABSTRACT

An optical imaging lens assembly is provided. The optical imaging lens assembly includes, sequentially along an optical axis from an object side to an image side: a first lens, a second lens, a third lens, a fourth lens, a fifth lens, a sixth lens, and a seventh lens. The first lens has a positive refractive power, an object-side surface of the first lens is a convex surface; each of the second lens, the third lens, the fourth lens, and the fifth lens has a positive refractive power or a negative refractive power; the sixth lens has a positive refractive power; the seventh lens has a negative refractive power; an image-side surface of the first lens, an image-side surface of the third lens, and an object-side surface and an image-side surface of the seventh lens are concave surfaces; and TTL and ImgH satisfy: TTL/ImgH≤1.4.

19 Claims, 17 Drawing Sheets

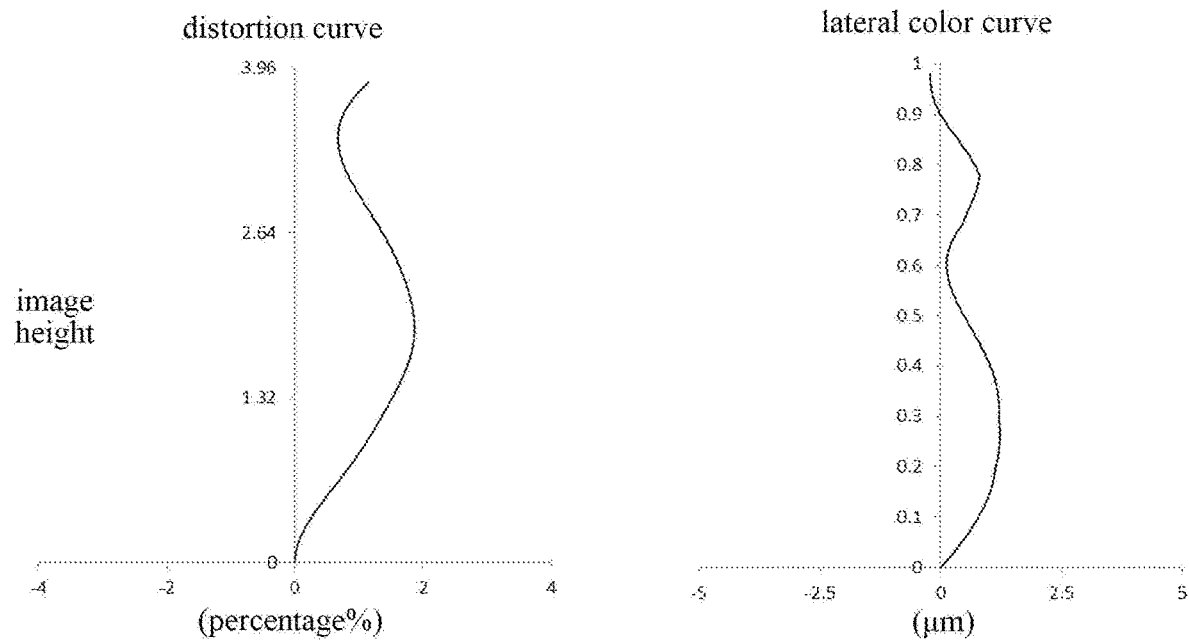
Fig. 10C
Fig. 10D
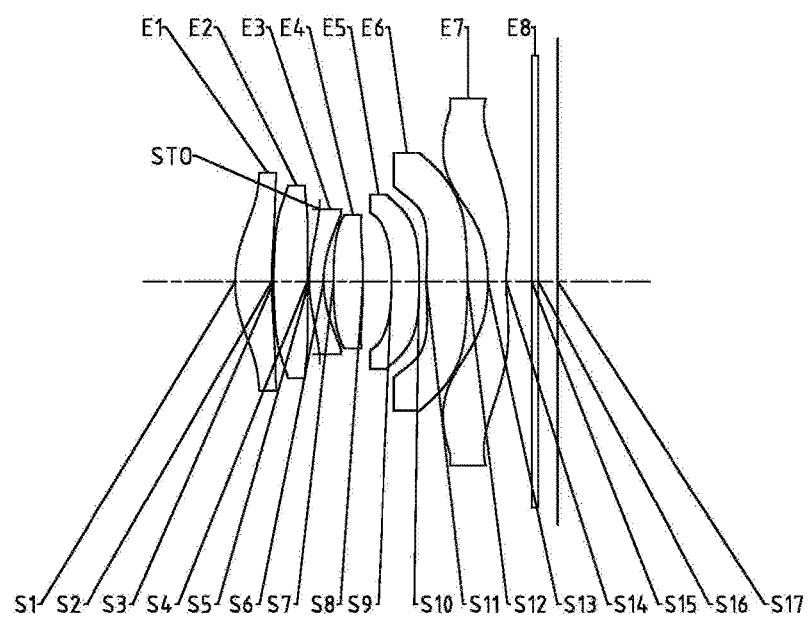
Fig. 11

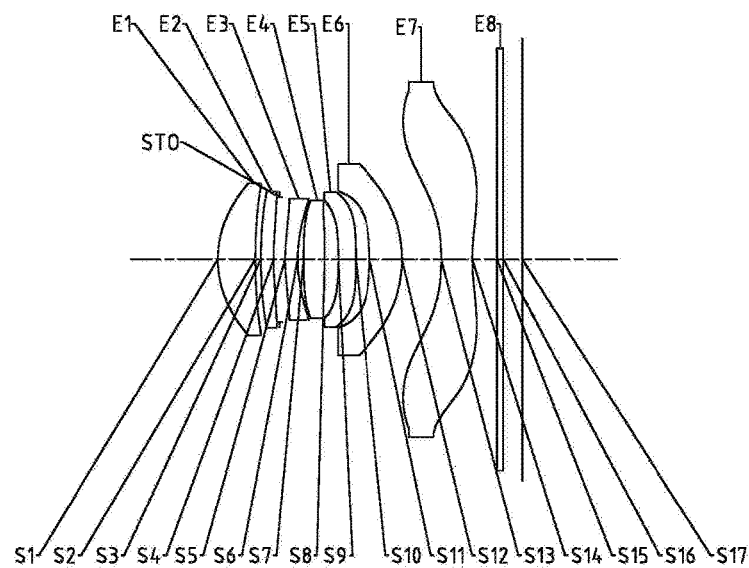
Fig. 13
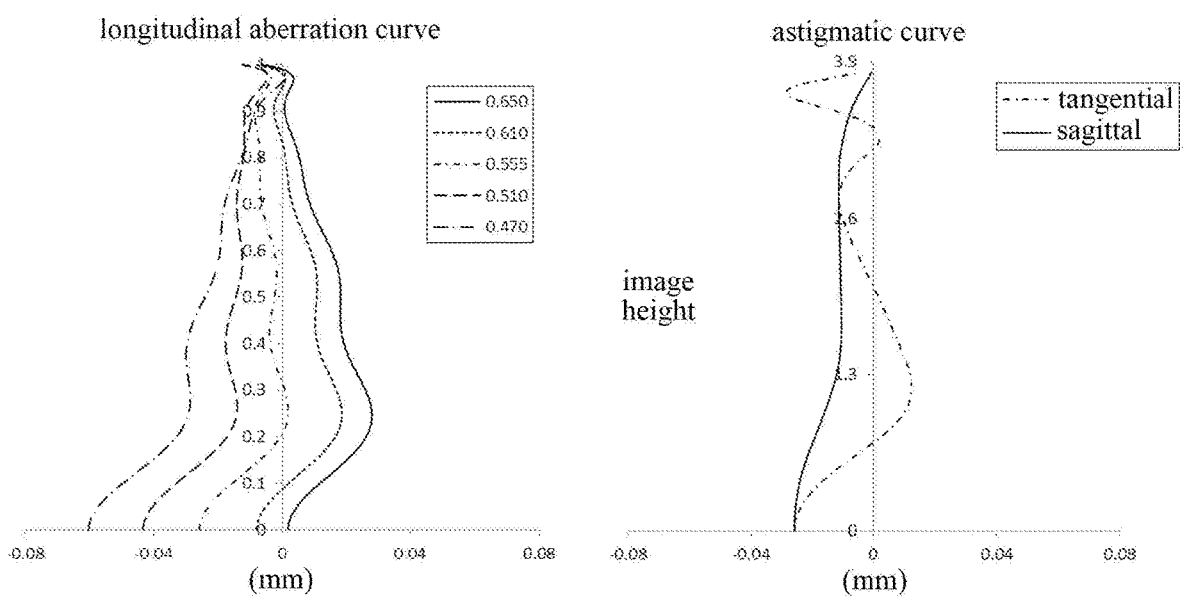
Fig. 14A
Fig. 14B

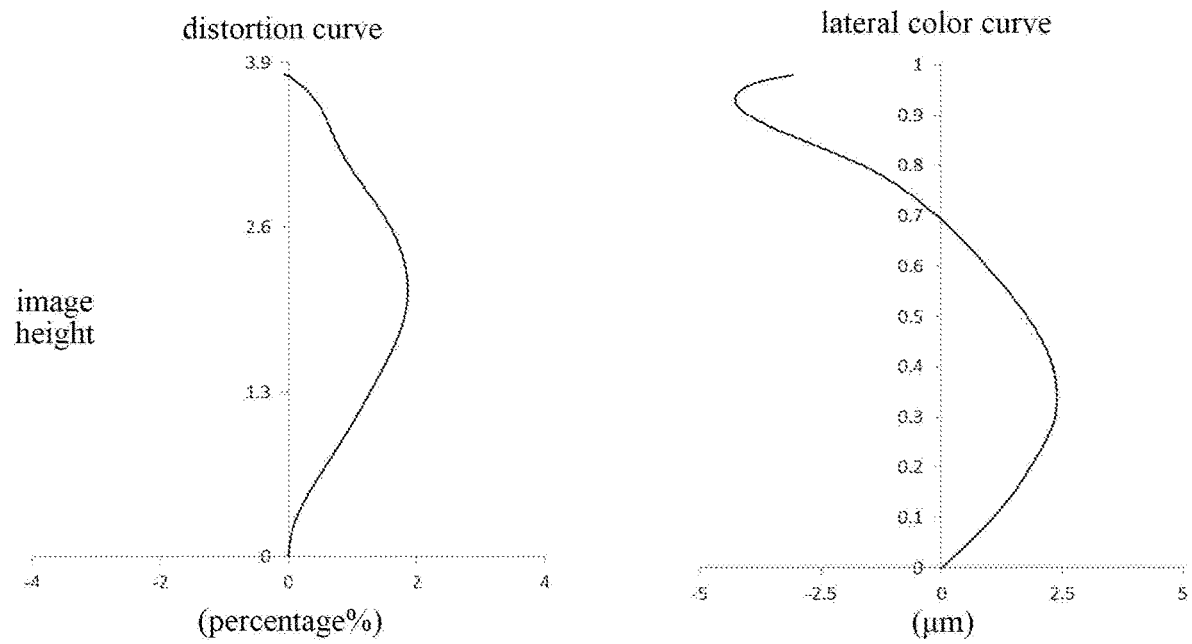
Fig. 14C
Fig. 14D
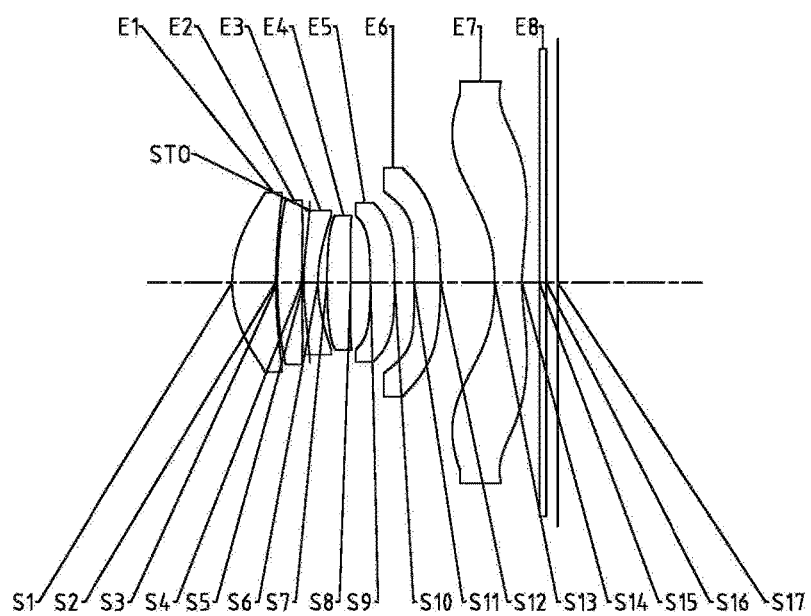
Fig. 15

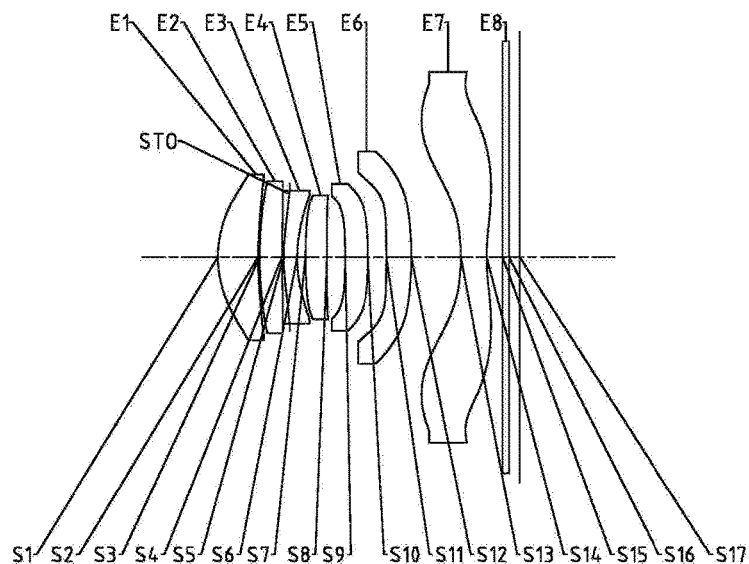
Fig. 17
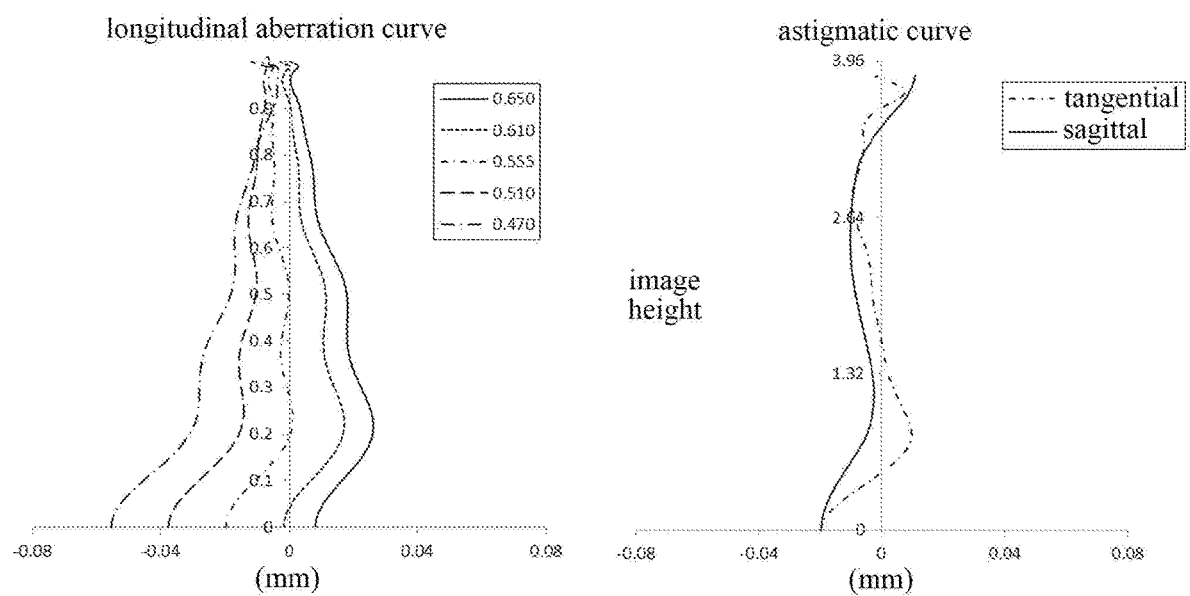
Fig. 18A · Fig. 18B

OPTICAL IMAGING LENS ASSEMBLY

CROSS-REFERENCE TO RELATED APPLICATIONS

This disclosure is a continuation of International Application PCT/CN2018/092872, with an international filing date of Jun. 26, 2018, which claims priority to Chinese Patent Application No. 201810113928.9, filed with the China National Intellectual Property Administration (CNIPA) on Feb. 5, 2018, and Chinese Patent Application No. 201820197135.5, filed with the China National Intellectual Property Administration (CNIPA) on Feb. 5, 2018, the contents of which are incorporated herein by reference in their entirety.

TECHNICAL FIELD

The present disclosure relates to an optical imaging lens assembly, and more specifically to an optical imaging lens assembly including seven lenses.

BACKGROUND

As the science and technology develops, portable electronic products are gradually arising, and portable electronic products having a camera are more and more popular. Therefore, market demands for camera lens assemblies suitable for the portable electronic products are gradually increasing. As the portable electronic products tend to be miniaturized, the total length of the lens assembly is limited, thereby increasing the difficulty in designing the lens assembly.

Meanwhile, with the improvement of performance and the reduction in size of a common photosensitive element, such as a CCD (charge-coupled device) or a CMOS (complementary metal-oxide semiconductor) element, the number of pixels of the photosensitive element is increased and the sizes of the pixels are decreased, and higher requirements are proposed on high imaging quality and miniaturization of the counterpart optical imaging lens assembly.

The reduction in the pixel size means that the amount of light admitted of the lens assembly may become smaller during the same exposure time. However, image sensors and environmental backgrounds have some system noise, resulting in a large demand for the amount of light admitted of the optical imaging lens assembly. At this time, the larger the effective amount of light entering the optical imaging lens assembly is, the better the imaging performance is.

Therefore, it is necessary to provide an optical imaging lens assembly applicable to the portable electronic products and having an ultra-thin large aperture and good imaging quality.

SUMMARY

The present disclosure provides an imaging lens assembly applicable to portable electronic products and may at least solve or partially solve at least one of the above disadvantages in the existing technology.

According to an aspect, the present disclosure discloses an optical imaging lens assembly. The lens assembly includes, sequentially along an optical axis from an object side to an image side: a first lens, a second lens, a third lens, a fourth lens, a fifth lens, a sixth lens, and a seventh lens. The first lens may have a positive refractive power, an object-side surface of the first lens may be a convex surface, and an image-side surface of the first lens may be a concave surface; each of the second lens, the third lens, the fourth lens, and the fifth lens has a positive refractive power or a negative refractive power; an image-side surface of the third lens may be a concave surface; the sixth lens may have a positive refractive power; and the seventh lens may have a negative refractive power, and both an object-side surface and an image-side surface of the seventh lens may be concave surfaces. A spacing distance TTL of a center of the object-side surface of the first lens to an image plane of the optical imaging lens assembly on the optical axis and half of a diagonal length ImgH of an effective pixel area on the image plane of the optical imaging lens assembly may satisfy: TTL/ImgH≤1.4.

In an embodiment, a distance SAG41 from an intersection point of an object-side surface of the fourth lens and the optical axis to a vertex of an effective radius of the object-side surface of the fourth lens on the optical axis and a center thickness CT4 of the fourth lens on the optical axis may satisfy: SAG41/CT4<0.5.

In an embodiment, a maximum inclination angle β52 of an image-side surface of the fifth lens and a maximum inclination angle β61 of an object-side surface of the sixth lens may satisfy: 1.0<β52/β61≤1.7.

In an embodiment, a radius of curvature R7 of an object-side surface of the fourth lens and a radius of curvature R8 of an image-side surface of the fourth lens may satisfy: −1.5<(R7+R8)/(R7−R8)≤0.

In an embodiment, a spacing distance T34 of the third lens and the fourth lens on the optical axis and a spacing distance T67 of the sixth lens and the seventh lens on the optical axis may satisfy: T34/T67≤0.50.

In an embodiment, a radius of curvature R13 of the object-side surface of the seventh lens and a radius of curvature R14 of the image-side surface of the seventh lens may satisfy: −1.5<R13/R14<−0.5.

In an embodiment, a combined focal length f67 of the sixth lens and the seventh lens and a total effective focal length f of the optical imaging lens assembly may satisfy: −2.5<f67/f<−1.

In an embodiment, a total effective focal length f of the optical imaging lens assembly, an effective focal length f1 of the first lens, and an effective focal length f2 of the second lens may satisfy: 0.5<f/f1−f/f2<1.5.

In an embodiment, a sum of center thicknesses ΣCT of the first lens to the seventh lens on the optical axis and the spacing distance TTL of the center of the object-side surface of the first lens to the image plane of the optical imaging lens assembly on the optical axis may satisfy: 0.5<ΣCT/TTL<1.

In an embodiment, the optical imaging lens assembly further includes a diaphragm, and a spacing distance SL from the diaphragm to the image plane of the optical imaging lens assembly on the optical axis and the spacing distance TTL of the center of the object-side surface of the first lens to the image plane of the optical imaging lens assembly on the optical axis may satisfy: 0.5<SL/TTL<1.

According to another aspect, the present disclosure further discloses an optical imaging lens assembly. The lens assembly includes, sequentially along an optical axis from an object side to an image side: a first lens, a second lens, a third lens, a fourth lens, a fifth lens, a sixth lens, and a seventh lens. The first lens may have a positive refractive power, an object-side surface of the first lens may be a convex surface, and an image-side surface of the first lens may be a concave surface; each of the second lens, the third lens, the fourth lens, and the fifth lens has a positive refractive power or a negative refractive power; an image-side surface of the third lens may be a concave surface; the sixth lens may have a positive refractive power; and the seventh lens may have a negative refractive power, and both an object-side surface and an image-side surface of the seventh lens may be concave surfaces. A combined focal length f67 of the sixth lens and the seventh lens and a total effective focal length f of the optical imaging lens assembly may satisfy: $-2.5 < f67/f < -1$.

According to another aspect, the present disclosure further discloses an optical imaging lens assembly. The lens assembly includes, sequentially along an optical axis from an object side to an image side: a first lens, a second lens, a third lens, a fourth lens, a fifth lens, a sixth lens, and a seventh lens. The first lens may have a positive refractive power, an object-side surface of the first lens may be a convex surface, and an image-side surface of the first lens may be a concave surface; each of the second lens, the third lens, the fourth lens, and the fifth lens has a positive refractive power or a negative refractive power; an image-side surface of the third lens may be a concave surface; the sixth lens may have a positive refractive power; and the seventh lens may have a negative refractive power, and both an object-side surface and an image-side surface of the seventh lens may be concave surfaces. A distance SAG41 from an intersection point of an object-side surface of the fourth lens and the optical axis to a vertex of an effective radius of the object-side surface of the fourth lens on the optical axis and a center thickness CT4 of the fourth lens on the optical axis may satisfy: $SAG41/CT4 < 0.5$.

According to another aspect, the present disclosure further discloses an optical imaging lens assembly. The lens assembly includes, sequentially along an optical axis from an object side to an image side: a first lens, a second lens, a third lens, a fourth lens, a fifth lens, a sixth lens, and a seventh lens. The first lens may have a positive refractive power, an object-side surface of the first lens may be a convex surface, and an image-side surface of the first lens may be a concave surface; each of the second lens, the third lens, the fourth lens, and the fifth lens has a positive refractive power or a negative refractive power; an image-side surface of the third lens may be a concave surface; the sixth lens may have a positive refractive power; and the seventh lens may have a negative refractive power, and both an object-side surface and an image-side surface of the seventh lens may be concave surfaces. A maximum inclination angle $\beta 52$ of an image-side surface of the fifth lens and a maximum inclination angle $\beta 61$ of an object-side surface of the sixth lens may satisfy: $1.0 < \beta 52/\beta 61 \leq 1.7$.

According to another aspect, the present disclosure further discloses an optical imaging lens assembly. The lens assembly includes, sequentially along an optical axis from an object side to an image side: a first lens, a second lens, a third lens, a fourth lens, a fifth lens, a sixth lens, and a seventh lens. The first lens may have a positive refractive power, an object-side surface of the first lens may be a convex surface, and an image-side surface of the first lens may be a concave surface; each of the second lens, the third lens, the fourth lens, and the fifth lens has a positive refractive power or a negative refractive power; an image-side surface of the third lens may be a concave surface; the sixth lens may have a positive refractive power; and the seventh lens may have a negative refractive power, and both an object-side surface and an image-side surface of the seventh lens may be concave surfaces. A radius of curvature R13 of the object-side surface of the seventh lens and a radius of curvature R14 of the image-side surface of the seventh lens may satisfy: $-1.5 < R13/R14 < -0.5$.

In the present disclosure, multiple lenses (e.g., seven lenses) are used. By reasonably configuring the refractive powers and the surface types of the lenses, the center thicknesses of the lenses, and the spacing distances between the lenses, the system has an advantage of large aperture in the process of increasing the amount of light admitted, thereby enhancing the imaging effect of the optical imaging lens assembly. At the same time, the optical imaging lens assembly with the above configuration may have at least one advantageous effect such as ultra-thin, miniaturization, large aperture, or high imaging quality.

BRIEF DESCRIPTION OF THE DRAWINGS

After reading detailed descriptions of non-limiting implementations with reference to the accompanying drawings, other features, objectives and advantages of the present disclosure will become more apparent. In the accompanying drawings:

FIGS. 2A-2D respectively illustrate a longitudinal aberration curve, an astigmatic curve, a distortion curve and a lateral color curve of the optical imaging lens assembly according to the first embodiment;

FIGS. 6A-6D respectively illustrate a longitudinal aberration curve, an astigmatic curve, a distortion curve and a lateral color curve of the optical imaging lens assembly according to the third embodiment;

FIGS. 10A-10D respectively illustrate a longitudinal aberration curve, an astigmatic curve, a distortion curve and a lateral color curve of the optical imaging lens assembly according to the fifth embodiment;

FIG. 11 is a schematic structural diagram illustrating an optical imaging lens assembly according to the sixth embodiment of the present disclosure;

FIG. 13 is a schematic structural diagram illustrating an optical imaging lens assembly according to the seventh embodiment of the present disclosure;

FIGS. 14A-14D respectively illustrate a longitudinal aberration curve, an astigmatic curve, a distortion curve and a lateral color curve of the optical imaging lens assembly according to the seventh embodiment;

FIG. 15 is a schematic structural diagram illustrating an optical imaging lens assembly according to the eighth embodiment of the present disclosure;

FIG. 17 is a schematic structural diagram illustrating an optical imaging lens assembly according to the ninth embodiment of the present disclosure;

FIGS. 18A-18D respectively illustrate a longitudinal aberration curve, an astigmatic curve, a distortion curve and a lateral color curve of the optical imaging lens assembly according to the ninth embodiment;

DETAILED DESCRIPTION OF EMBODIMENTS

Figure 1:
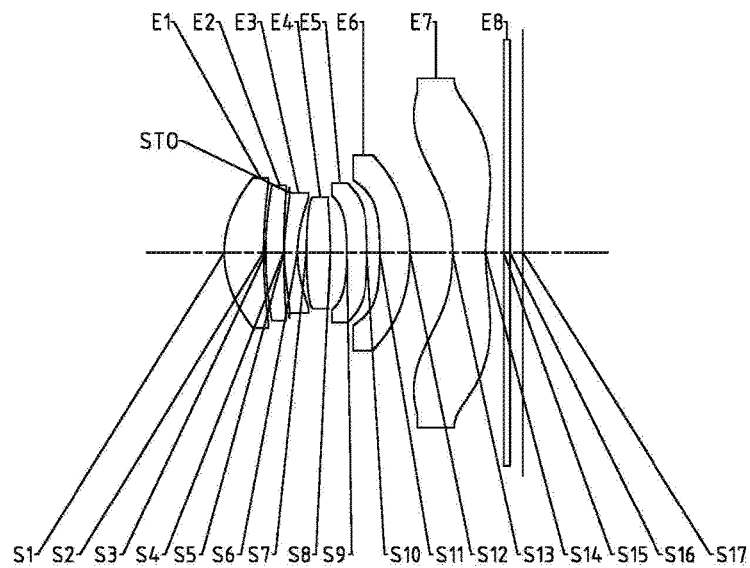
FIG. 1 is a schematic structural diagram illustrating an optical imaging lens assembly according to the first embodiment of the present disclosure.

For a better understanding of the present disclosure, various aspects of the present disclosure will be described in more detail with reference to the accompanying drawings. It should be understood that the detailed description is merely an illustration of the illustrative implementations of the present disclosure rather than a limitation on the scope of the present disclosure in any way. Throughout the specification, the identical reference numerals designate the same elements. The expression "and/or" includes any and all combinations of one or more of the associated listed items.

It should be noted that in the specification, the expressions, such as "first," "second," and "third" are only used to distinguish one feature from another, rather than represent any limitations to the features. Thus, the first lens discussed below may also be referred to as the second lens or the third lens without departing from the teachings of the present disclosure.

In the accompanying drawings, the thicknesses, sizes, and shapes of the lenses have been slightly exaggerated for the convenience of explanation. Specifically, shapes of spherical surfaces or aspheric surfaces shown in the accompanying drawings are shown by examples. That is, the shapes of the spherical surfaces or the aspheric surfaces are not limited to the shapes of the spherical surfaces or the aspheric surfaces shown in the accompanying drawings. The accompanying drawings are merely illustrative and not strictly drawn to scale.

As used herein, the paraxial area refers to an area near the optical axis. If the surface of a lens is a convex surface and the position of the convex surface is not defined, it indicates that the surface of the lens is convex at least at the paraxial area; if the surface of a lens is a concave surface and the position of the concave surface is not defined, it indicates that the surface of the lens is concave at least at the paraxial area. The surface closest to the object in each lens is referred to as the object-side surface, and the surface closest to the image plane in each lens is referred to as the image-side surface.

It should be further understood that the terms "comprising," "including," "having" and variants thereof, when used in the specification, specify the presence of stated features, elements, or components, but do not exclude the presence or addition of one or more other features, elements, components, or combinations thereof. In addition, expressions, such as "at least one of," when preceding a list of listed features, modify the entire list of features rather than an individual element in the list. Further, the use of "may," when describing the implementations of the present disclosure, relates to "one or more implementations of the present disclosure." Also, the term "illustrative" is intended to refer to an example or illustration.

Unless otherwise defined, all terms (including technical and scientific terms) used herein have the same meaning as commonly understood by those of ordinary skill in the art to which the present disclosure belongs. It should be further understood that terms, such as those defined in commonly used dictionaries, should be interpreted as having a meaning that is consistent with their meaning in the context of the relevant art and will not be interpreted in an idealized or overly formal sense unless expressly so defined herein.

It should also be noted that the embodiments in the present disclosure and the features in the embodiments may be combined with each other on a non-conflict basis. The present disclosure will be described below in detail with reference to the accompanying drawings and in combination with the embodiments.

Characteristics, principles and other aspects of the present disclosure will be described below in detail.

The optical imaging lens assembly according to illustrative implementations of the present disclosure may include, for example, seven lenses having refractive powers, that is, a first lens, a second lens, a third lens, a fourth lens, a fifth lens, a sixth lens, and a seventh lens. The seven lenses are sequentially arranged from an object side to an image side along an optical axis.

In an illustrative implementation, the first lens may have a positive refractive power, an object-side surface of the first lens may be a convex surface, and an image-side surface of the first lens may be a concave surface. The second lens has a positive refractive power or a negative refractive power. The third lens has a positive refractive power or a negative refractive power, and an image-side surface of the third lens may be a concave surface. The fourth lens has a positive refractive power or a negative refractive power. The fifth lens has a positive refractive power or a negative refractive power. The sixth lens may have a positive refractive power. The seventh lens may have a negative refractive power, an object-side surface of the seventh lens may be a concave surface, and an image-side surface of the seventh lens may be a concave surface.

In an illustrative implementation, an object-side surface of the second lens may be a convex surface, and an image-side surface of the second lens may be a concave surface.

In an illustrative implementation, the third lens may have a negative refractive power, and an object-side surface of the third lens may be a convex surface.

In an illustrative implementation, the fourth lens may have a positive refractive power, and an object-side surface of the fourth lens may be a convex surface.

In an illustrative implementation, an object-side surface of the fifth lens may be a concave surface.

In an illustrative implementation, an image-side surface of the sixth lens may be a convex surface.

In an illustrative implementation, the optical imaging lens assembly of the present disclosure may satisfy the conditional expression: TTL/ImgH≤1.4. Here, TTL is the spacing distance of the center of the object-side surface of the first lens to the image plane of the optical imaging lens assembly on the optical axis, and ImgH is the half of the diagonal length of the effective pixel area on the image plane of the optical imaging lens assembly. More specifically, TTL and ImgH may further satisfy: 1.33=TTL/ImgH≤1.37. By satisfying the conditional expression TTL/ImgH≤1.4, the imaging system can be made compact and meet the miniaturization requirement; at the same time, the imaging system can have more pixels and large aperture optical performance.

In an illustrative implementation, the optical imaging lens assembly of the present disclosure may satisfy the conditional expression: SAG41/CT4<0.5. Here, SAG41 is the distance from the intersection point of the object-side surface of the fourth lens and the optical axis to the vertex of the effective radius of the object-side surface of the fourth lens on the optical axis, and CT4 is the center thickness of the fourth lens on the optical axis. More specifically, SAG41 and CT4 may further satisfy: 0.2<SAG41/CT4<0.4, for example, 0.25≤SAG41/CT4≤0.38. Satisfying the conditional expression SAG41/CT4<0.5 may effectively reduce the incident angle of the chief ray on the object-side surface of the fourth lens, and improve the matching degree between the lens assembly and the chip.

Figure 23:
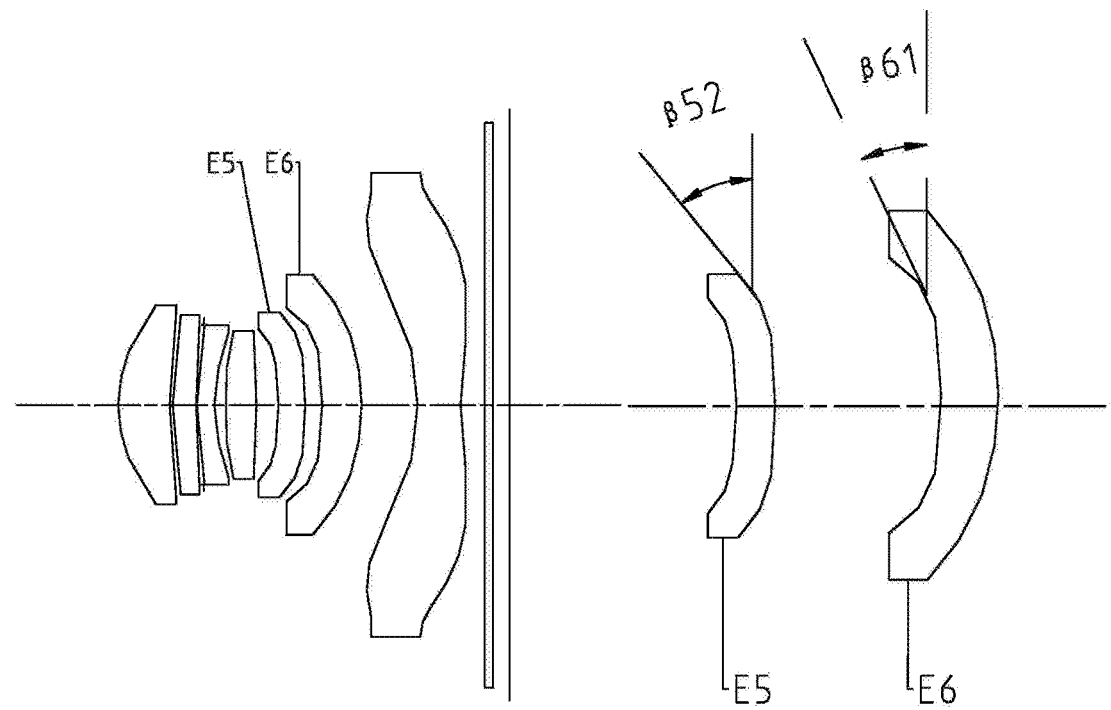
FIG. 23 schematically illustrates a maximum inclination angle β52 of an image-side surface of the fifth lens and a maximum inclination angle β61 of an object-side surface of the sixth lens.

In an illustrative implementation, the optical imaging lens assembly of the present disclosure may satisfy the conditional expression: 1.0<β52/β61≤1.7. Here, β52 is the maximum inclination angle of the image-side surface of the fifth lens and β61 is the maximum inclination angle of the object-side surface of the sixth lens (see FIG. 23). More specifically, β52 and β61 may further satisfy: 1.23≤β52/β61≤1.64. By properly controlling the ratio of β52 to β61, the deflection of light may be effectively mitigated, and the imaging system has good imaging quality and low susceptibility.

In an illustrative implementation, the optical imaging lens assembly of the present disclosure may satisfy the conditional expression: 0.5<ΣCT/TTL<1. Here, ΣCT is the sum of center thicknesses of the first lens to the seventh lens on the optical axis, and TTL is the spacing distance of the center of the object-side surface of the first lens to the image plane of the optical imaging lens assembly on the optical axis. More specifically, ΣCT and TTL may further satisfy: 0.54≤ΣCT/TTL≤0.62. By controlling the sum of the center thicknesses of all the lenses in the optical imaging system, the distortion range of the imaging system can be reasonably controlled, thereby making the imaging system have small distortion.

In an illustrative implementation, the optical imaging lens assembly of the present disclosure may satisfy the conditional expression: −2.5<f67/f<−1. Here, f67 is the combined focal length of the sixth lens and the seventh lens, and f is the total effective focal length of the optical imaging lens assembly. More specifically, f67 and f may further satisfy: −2.3<f67/f<−1.3, for example, −2.2≤f67/f≤−1.47. By controlling the combined focal length of the sixth lens and the seventh lens within a reasonable range, the aberration contribution amount of the sixth lens and the seventh lens can be controlled to balance with aberrations generated by front optical elements, thereby making aberrations of the imaging system within a reasonable range.

In an illustrative implementation, the optical imaging lens assembly of the present disclosure may satisfy the conditional expression: −1.5<(R7+R8)/(R7−R8)≤0. Here, R7 is the radius of curvature of the object-side surface of the fourth lens, and R8 is the radius of curvature of the image-side surface of the fourth lens. More specifically, R7 and R8 may further satisfy: −1.21≤(R7+R8)/(R7−R8)≤−0.05. By properly controlling the radii of curvature of the object-side surface and the image-side surface of the fourth lens, the aberration contribution amount generated by the fourth lens can be effectively controlled.

In an illustrative implementation, the optical imaging lens assembly may further include a diaphragm to improve the imaging quality of the lens assembly. Optionally, the diaphragm may be disposed between the second lens and the third lens.

In an illustrative implementation, the optical imaging lens assembly of the present disclosure may satisfy the conditional expression: 0.5<SL/TTL<1. Here, SL is the spacing distance from the diaphragm to the image plane of the optical imaging lens assembly on the optical axis, and TTL is the spacing distance of the center of the object-side surface of the first lens to the image plane of the optical imaging lens assembly on the optical axis. More specifically, SL and TTL may further satisfy: 0.74≤SL/TTL≤0.80. By properly setting the position of the diaphragm, the coma, astigmatism, distortion, and axial chromatic aberration associated with the diaphragm may be effectively corrected.

In an illustrative implementation, the optical imaging lens assembly of the present disclosure may satisfy the conditional expression: T34/T6≤70.50. Here, T34 is the spacing distance of the third lens and the fourth lens on the optical axis, and T67 is the spacing distance of the sixth lens and the seventh lens on the optical axis. More specifically, T34 and T67 may further satisfy: 0.10≤T34/T67≤0.50, for example, 0.15≤T34/T67≤0.48. By constraining the air gap between the third lens and the fourth lens and the air gap between the sixth lens and the seventh lens, the curvature of field generated by the lenses at the front end and the curvature of field generated by the lenses at the rear end of the optical imaging system may be balanced to make the optical imaging system have a reasonable curvature of field.

In an illustrative implementation, the optical imaging lens assembly of the present disclosure may satisfy the conditional expression: −1.5<R13/R14<−0.5. Here, R13 is the radius of curvature of the object-side surface of the seventh lens, and R14 is the radius of curvature of the image-side surface of the seventh lens. More specifically, R13 and R14 may further satisfy: −1.4<R13/R14<−0.8, for example, −1.30≤R13/R14≤−0.96. By properly controlling the radii of curvature of the object-side surface and the image-side surface of the seventh lens, the ray angle of the edge field-of-view may be controlled within a reasonable range, thereby effectively reducing the susceptibility of the imaging system.

In an illustrative implementation, the optical imaging lens assembly of the present disclosure may satisfy the conditional expression: 0.5<f/f1−f/f2<1.5. Here, f is the total effective focal length of the optical imaging lens assembly, f1 is the effective focal length of the first lens, and f2 is the effective focal length of the second lens. More specifically, f, f1 and f2 may further satisfy: 0.6<f/f1−f/f2<1.3, for example, 0.71≤f/f1−f/f2≤1.25. By properly controlling the refractive powers of the first lens and the second lens, the positive third-order spherical aberration and the negative fifth-order spherical aberration contributed by the first lens and the second lens are within a reasonable range to balance the negative third-order spherical aberrations and the positive fifth-order spherical aberrations generated by the subsequent optical elements, thereby making the imaging system have a small spherical aberration and ensuring good imaging quality on the on-axis field-of-view area.

Optionally, the optical imaging lens assembly may further include at least one of an optical filter for correcting the color deviation, or a cover glass for protecting the photosensitive element on the image plane.

The optical imaging lens assembly according to the above implementations of the present disclosure may use multiple lenses, for example, seven lenses as described above. By reasonably configuring the refractive power and the surface type of each lens, the center thickness of each lens, the spacing distances on the axis between the lenses, etc., the volume of the lens assembly may be effectively reduced, the susceptibility of the lens assembly may be reduced, and the processability of the lens assembly may be improved, thereby making the optical imaging lens assembly more conducive to production and processing and applicable to portable electronic products. In addition, the optical imaging lens assembly with the above configuration also has beneficial effects such as ultra-thin, large aperture, or high imaging quality.

In the implementations of the present disclosure, at least one of the surfaces of the each lens is an aspheric mirror surface. The characteristic of the aspheric lens is: from the center of the lens to the periphery, the curvature continuously changes. Unlike the spherical lens with a constant curvature from the center of the lens to the periphery, the aspheric lens has a better radius-of-curvature characteristic, having advantages of improving the distortion aberration and improving the astigmatic aberration. The use of the aspheric lens can eliminate as much as possible the aberrations that occur during the imaging, thereby improving the imaging quality.

However, it should be understood by those skilled in the art that the various results and advantages described in the present specification may be obtained by changing the number of the lenses constituting the optical imaging lens assembly without departing from the technical solution claimed by the present disclosure. For example, although the optical imaging lens assembly having seven lenses is described as an example in the implementations, the optical imaging lens assembly is not limited to include seven lenses. If desired, the optical imaging lens assembly may also include other numbers of lenses.

Specific embodiments of the optical imaging lens assembly that may be applied to the above implementations are further described below with reference to the accompanying drawings.

First Embodiment

An optical imaging lens assembly according to the first embodiment of the present disclosure is described below with reference to FIGS. 1-2D. FIG. 1 is a schematic structural diagram illustrating the optical imaging lens assembly according to the first embodiment of the present disclosure.

As shown in FIG. 1, the optical imaging lens assembly according to illustrative implementations of the present disclosure along the optical axis from the object side to the image side sequentially includes: a first lens E1, a second lens E2, a diaphragm STO, a third lens E3, a fourth lens E4, a fifth lens E5, a sixth lens E6, a seventh lens E7, an optical filter E8, and an image plane S17.

The first lens E1 has a positive refractive power, an object-side surface S1 of the first lens E1 is a convex surface, and an image-side surface S2 of the first lens E1 is a concave surface. The second lens E2 has a positive refractive power, an object-side surface S3 of the second lens E2 is a convex surface, and an image-side surface S4 of the second lens E2 is a concave surface. The third lens E3 has a negative refractive power, an object-side surface S5 of the third lens E3 is a convex surface, and an image-side surface S6 of the third lens E3 is a concave surface. The fourth lens E4 has a positive refractive power, an object-side surface S7 of the fourth lens E4 is a convex surface, and an image-side surface S8 of the fourth lens E4 is a convex surface. The fifth lens E5 has a negative refractive power, an object-side surface S9 of the fifth lens E5 is a concave surface, and an image-side surface S10 of the fifth lens E5 is a convex surface. The sixth lens E6 has a positive refractive power, an object-side surface S11 of the sixth lens E6 is a concave surface, and an image-side surface S12 of the sixth lens E6 is a convex surface. The seventh lens E7 has a negative refractive power, an object-side surface S13 of the seventh lens E7 is a concave surface, and an image-side surface S14 of the seventh lens E7 is a concave surface. The optical filter E8 has an object-side surface S15 and an image-side surface S16. Light from an object passes through the surfaces S1 to S16 sequentially and is finally imaged on the image plane S17.

Table 1 shows the surface type, the radius of curvature, the thickness, the material, and the conic coefficient of each lens of the optical imaging lens assembly in the first embodiment. The radius of curvature and the thickness are shown in millimeters (mm).

TABLE 1

| surface number | surface type | radius of curvature | thickness | material refractive index | abbe number | conic coefficient |
|---|---|---|---|---|---|---|
| OBJ | spherical | infinite | infinite | | | |
| S1 | aspheric | 1.8467 | 0.6893 | 1.55 | 64.1 | −0.0280 |
| S2 | aspheric | 7.6255 | 0.0394 | | | −15.6237 |
| S3 | aspheric | 7.4519 | 0.3133 | 1.55 | 64.1 | 10.1516 |
| S4 | aspheric | 8.4118 | 0.1016 | | | −38.8182 |
| STO | spherical | infinite | −0.0942 | | | |
| S5 | aspheric | 2.8648 | 0.2350 | 1.67 | 20.4 | −1.1757 |
| S6 | aspheric | 2.0257 | 0.1568 | | | 0.1862 |
| S7 | aspheric | 9.5490 | 0.4178 | 1.54 | 55.7 | 82.5048 |
| S8 | aspheric | −11.2673 | 0.2940 | | | 63.9041 |
| S9 | aspheric | −5.4866 | 0.3575 | 1.67 | 20.4 | 15.8367 |
| S10 | aspheric | −11.8983 | 0.2279 | | | 85.7466 |

TABLE 1-continued

| surface number | surface type | radius of curvature | thickness | refractive index | abbe number | conic coefficient |
|---|---|---|---|---|---|---|
| S11 | aspheric | −7.6814 | 0.5305 | 1.65 | 23.5 | 8.0879 |
| S12 | aspheric | −3.0182 | 0.7463 | | | 0.6620 |
| S13 | aspheric | −4.2376 | 0.5773 | 1.54 | 55.7 | −0.0238 |
| S14 | aspheric | 3.3121 | 0.3223 | | | −0.0046 |
| S15 | spherical | infinite | 0.1100 | 1.52 | 64.2 | |
| S16 | spherical | infinite | 0.2252 | | | |
| S17 | spherical | infinite | | | | |

As can be known from Table 1, the object-side surface and the image-side surface of any one of the first lens E1 to the seventh lens E7 are aspheric surfaces. In the present embodiment, the surface type x of each aspheric surface may be defined by, but not limited to, the following aspheric formula:

$$x = \frac{ch^2}{1 + \sqrt{1 - (k+1)c^2h^2}} + \sum A_i h^i \quad (1)$$

Here, x is the sag—the axis-component of the displacement of the surface from the aspheric vertex, when the surface is at height h from the optical axis; c is the paraxial curvature of the aspheric surface, and c=1/R (i.e., the paraxial curvature c is the reciprocal of the radius of curvature R in Table 1 above); k is the conic coefficient (given in Table 1 above); and $A_i$ is the correction coefficient of the $i^{th}$ order of the aspheric surface. Table 2 below gives the high-order coefficients $A_4$, $A_6$, $A_8$, $A_{10}$, $A_{12}$, $A_{14}$, $A_{16}$, $A_{18}$ and $A_{20}$ applicable to the aspheric surfaces S1-S14 in the first embodiment.

Table 3 below gives the effective focal lengths f1 to f7 of the lenses, the total effective focal length f of the optical imaging lens assembly, the total track length TTL (i.e., the distance from the center of the object-side surface S1 of the first lens E1 to the image plane S17 on the optical axis), and the half of the diagonal length ImgH of the effective pixel area on the image plane S17 in the first embodiment.

TABLE 3

| f1 (mm) | 4.28 | f6 (mm) | 7.38 |
|---|---|---|---|
| f2 (mm) | 107.26 | f7 (mm) | −3.37 |
| f3 (mm) | −11.68 | f (mm) | 4.56 |
| f4 (mm) | 9.70 | TTL (mm) | 5.25 |
| f5 (mm) | −15.61 | ImgH (mm) | 3.93 |

The optical imaging lens assembly in the first embodiment satisfies:

TTL/ImgH=1.34, here, TTL is the spacing distance from the center of the object-side surface S1 of the first lens E1 to the image plane S17 on the optical axis, and ImgH is the half of the diagonal length of the effective pixel area on the image plane S17;

TABLE 2

| surface number | A4 | A6 | A8 | A10 | A12 |
|---|---|---|---|---|---|
| S1 | −8.3136E−03 | −6.0185E−03 | 1.8445E−02 | −5.6704E−02 | 9.1528E−02 |
| S2 | −1.3611E−02 | 2.1724E−02 | −8.6773E−02 | 2.7164E−01 | −4.8488E−01 |
| S3 | 1.4678E−02 | 1.3220E−02 | −1.9210E−01 | 6.5653E−01 | −1.2612E+00 |
| S4 | −5.8627E−02 | 1.9599E−01 | −6.8905E−01 | 1.6924E+00 | −2.8333E+00 |
| S5 | −1.4826E−01 | 1.7795E−01 | −4.3133E−01 | 9.9477E−01 | −1.5182E+00 |
| S6 | −6.8994E−02 | −4.4487E−02 | 3.0423E−01 | −1.0010E+00 | 2.1764E+00 |
| S7 | 2.5479E−02 | −4.2924E−02 | 2.1342E−01 | −7.6668E−01 | 1.6074E+00 |
| S8 | 6.8691E−03 | −9.9975E−02 | 7.3923E−01 | −3.1700E+00 | 8.2654E+00 |
| S9 | −8.1594E−02 | −8.1147E−02 | 4.4459E−01 | −1.7355E+00 | 4.0681E+00 |
| S10 | −9.2075E−02 | 3.3238E−02 | −2.8052E−01 | 9.7251E−01 | −1.9390E+00 |
| S11 | −4.5792E−02 | −5.0197E−02 | −8.0335E−02 | 3.7753E−01 | −7.5229E−01 |
| S12 | 1.7189E−02 | −3.9417E−02 | 3.5134E−02 | −2.2342E−02 | 6.9217E−03 |
| S13 | −8.4531E−02 | 4.3204E−02 | −1.1955E−02 | 2.8840E−03 | −5.8114E−04 |
| S14 | −1.0923E−01 | 4.5353E−02 | −1.5597E−02 | 3.6774E−03 | −5.8083E−04 |

| surface number | A14 | A16 | A18 | A20 |
|---|---|---|---|---|
| S1 | −8.7620E−02 | 4.9212E−02 | −1.4844E−02 | 1.8351E−03 |
| S2 | 5.2772E−01 | −3.4200E−01 | 1.1934E−01 | −1.7132E−02 |
| S3 | 1.4782E+00 | −1.0366E+00 | 3.9490E−01 | −6.2298E−02 |
| S4 | 3.2160E+00 | −2.3573E+00 | 9.9666E−01 | −1.8200E−01 |
| S5 | 1.5751E+00 | −1.1224E+00 | 4.9980E−01 | −1.0323E−01 |
| S6 | −2.9555E+00 | 2.2308E+00 | −7.5454E−01 | 4.7462E−02 |
| S7 | −1.8207E+00 | 8.2870E−01 | 2.1967E−01 | −2.3530E−01 |
| S8 | −1.3413E+01 | 1.3262E+01 | −7.3190E+00 | 1.7502E+00 |
| S9 | −6.2327E+00 | 5.9118E+00 | −3.1840E+00 | 7.4890E−01 |
| S10 | 2.2681E+00 | −1.5602E+00 | 5.8265E−01 | −8.9942E−02 |
| S11 | 8.2173E−01 | −5.2385E−01 | 1.8069E−01 | −2.5457E−02 |
| S12 | 1.0858E−05 | −4.4214E−04 | 6.6293E−05 | −7.9366E−07 |
| S13 | 8.3241E−05 | −7.5586E−06 | 3.8680E−07 | −8.4884E−09 |
| S14 | 5.8334E−05 | −3.4402E−06 | 1.0429E−07 | −1.1822E−09 |

SAG41/CT4=0.25, here, SAG41 is the distance from the intersection point of the object-side surface S7 of the fourth lens E4 and the optical axis to the vertex of the effective radius of the object-side surface S7 of the fourth lens E4 on the optical axis, and CT4 is the center thickness of the fourth lens E4 on the optical axis;

β52/β61=1.50, here, β52 is the maximum inclination angle of the image-side surface S10 of the fifth lens E5, and β61 is the maximum inclination angle of the object-side surface S11 of the sixth lens E6;

ΣCT/TTL=0.59, here, ΣCT is the sum of the center thicknesses of the first lens E1 to the seventh lens E7 on the optical axis, and TTL is the spacing distance from the center of the object-side surface S1 of the first lens E1 to the image plane S17 on the optical axis;

f67/f=−1.67, here, f67 is the combined focal length of the sixth lens E6 and the seventh lens E7, and f is the total effective focal length of the optical imaging lens assembly;

(R7+R8)/(R7−R8)=−0.08, here, R7 is the radius of curvature of the object-side surface S7 of the fourth lens E4, and R8 is the radius of curvature of the image-side surface S8 of the fourth lens E4;

SL/TTL=0.78, here, SL is the spacing distance from the diaphragm STO to the image plane S17 on the optical axis, and TTL is the spacing distance from the center of the object-side surface S1 of the first lens E1 to the image plane S17 on the optical axis;

T34/T67=0.21, here, T34 is the spacing distance of the third lens E3 and the fourth lens E4 on the optical axis, and T67 is the spacing distance of the sixth lens E6 and the seventh lens E7 on the optical axis;

R13/R14=−1.28, here, R13 is the radius of curvature of the object-side surface S13 of the seventh lens E7, and R14 is the radius of curvature of the image-side surface S14 of the seventh lens E7; and f/f1−f/f2=1.02, here, f is the total effective focal length of the optical imaging lens assembly, f1 is the effective focal length of the first lens E1, and f2 is the effective focal length of the second lens E2.

Figures 2A, 2B:
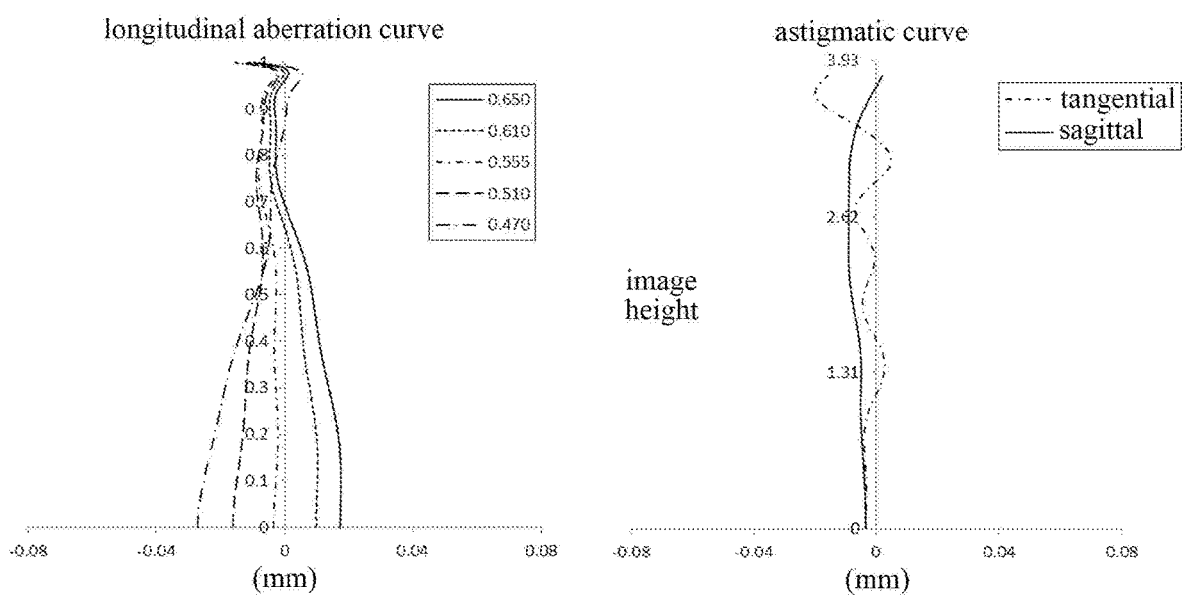

FIG. 2A shows the longitudinal aberration curve of the optical imaging lens assembly according to the first embodiment, representing deviations of focal points of light of different wavelengths converged after passing through the lens assembly. FIG. 2B shows the astigmatic curve of the optical imaging lens assembly according to the first embodiment, representing a curvature of the tangential image plane and a curvature of the sagittal image plane. FIG. 2C shows the distortion curve of the optical imaging lens assembly according to the first embodiment, representing amounts of distortion at different viewing angles. FIG. 2D shows the lateral color curve of the optical imaging lens assembly according to the first embodiment, representing deviations of different image heights on the image plane after light passes through the lens assembly. As can be seen according to FIGS. 2A to 2D, the optical imaging lens assembly given in the first embodiment may achieve good imaging quality.

Second Embodiment

Figure 3:
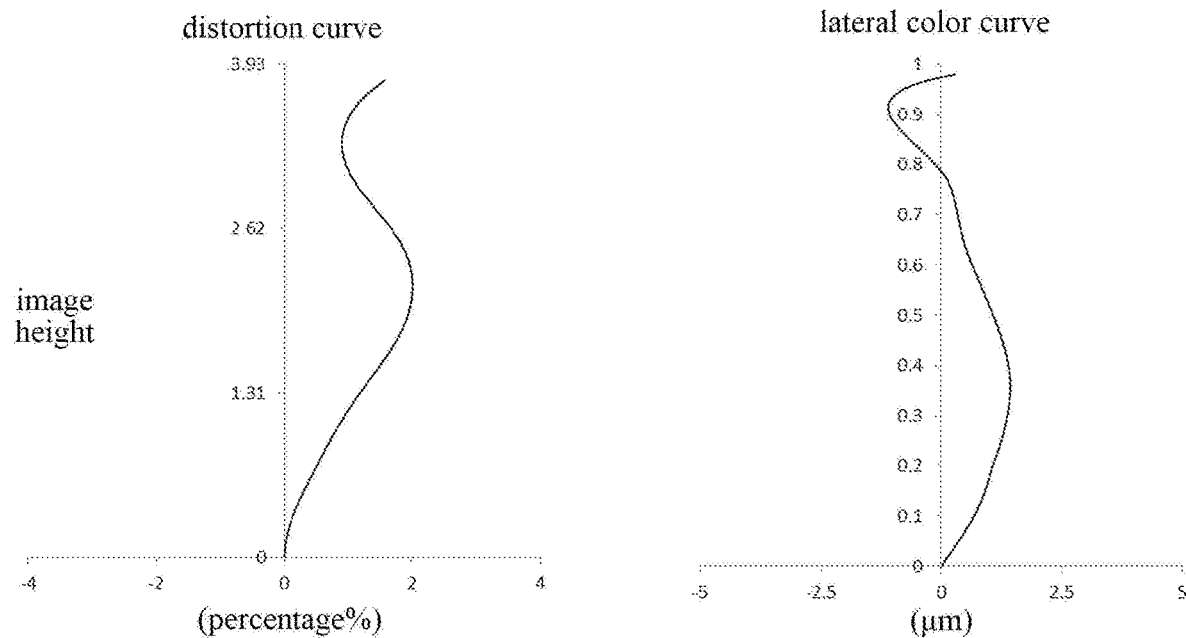
FIG. 3 is a schematic structural diagram illustrating an optical imaging lens assembly according to the second embodiment of the present disclosure.
Figure 3:
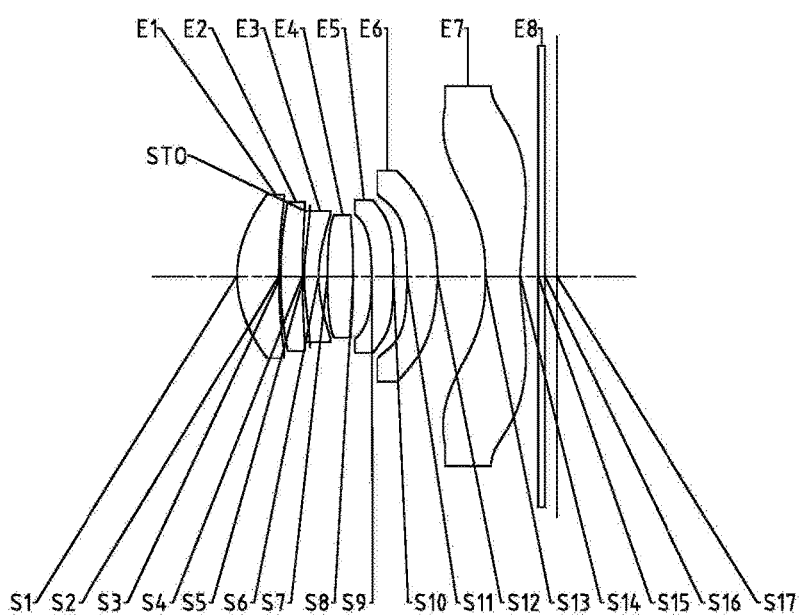

An optical imaging lens assembly according to the second embodiment of the present disclosure is described below with reference to FIGS. 3-4D. In the present embodiment and the following embodiments, for the purpose of brevity, the description of parts similar to those in the first embodiment will be omitted. FIG. 3 is a schematic structural diagram illustrating the optical imaging lens assembly according to the second embodiment of the present disclosure.

As shown in FIG. 3, the optical imaging lens assembly according to illustrative implementations of the present disclosure along the optical axis from the object side to the image side sequentially includes: a first lens E1, a second lens E2, a diaphragm STO, a third lens E3, a fourth lens E4, a fifth lens E5, a sixth lens E6, a seventh lens E7, an optical filter E8, and an image plane S17.

The first lens E1 has a positive refractive power, an object-side surface S1 of the first lens E1 is a convex surface, and an image-side surface S2 of the first lens E1 is a concave surface. The second lens E2 has a positive refractive power, an object-side surface S3 of the second lens E2 is a convex surface, and an image-side surface S4 of the second lens E2 is a concave surface. The third lens E3 has a negative refractive power, an object-side surface S5 of the third lens E3 is a convex surface, and an image-side surface S6 of the third lens E3 is a concave surface. The fourth lens E4 has a positive refractive power, an object-side surface S7 of the fourth lens E4 is a convex surface, and an image-side surface S8 of the fourth lens E4 is a convex surface. The fifth lens E5 has a negative refractive power, an object-side surface S9 of the fifth lens E5 is a concave surface, and an image-side surface S10 of the fifth lens E5 is a convex surface. The sixth lens E6 has a positive refractive power, an object-side surface S11 of the sixth lens E6 is a concave surface, and an image-side surface S12 of the sixth lens E6 is a convex surface. The seventh lens E7 has a negative refractive power, an object-side surface S13 of the seventh lens E7 is a concave surface, and an image-side surface S14 of the seventh lens E7 is a concave surface. The optical filter E8 has an object-side surface S15 and an image-side surface S16. Light from an object passes through the surfaces S1 to S16 sequentially and is finally imaged on the image plane S17.

Table 4 shows the surface type, the radius of curvature, the thickness, the material, and the conic coefficient of each lens of the optical imaging lens assembly in the second embodiment. The radius of curvature and the thickness are shown in millimeters (mm).

TABLE 4

| surface number | surface type | radius of curvature | thickness | refractive index | abbe number | conic coefficient |
|---|---|---|---|---|---|---|
| OBJ | spherical | infinite | infinite | | | |
| S1 | aspheric | 1.8706 | 0.6855 | 1.55 | 64.1 | −0.0655 |
| S2 | aspheric | 7.5744 | 0.0301 | | | −17.6712 |
| S3 | aspheric | 7.3706 | 0.3564 | 1.55 | 64.1 | 11.4973 |
| S4 | aspheric | 8.5667 | 0.1131 | | | −47.9490 |
| STO | spherical | infinite | −0.0831 | | | |
| S5 | aspheric | 3.0801 | 0.2350 | 1.67 | 20.4 | −1.0933 |
| S6 | aspheric | 2.1429 | 0.1425 | | | 0.2411 |

TABLE 4-continued

| surface number | surface type | radius of curvature | thickness | material refractive index | abbe number | conic coefficient |
|---|---|---|---|---|---|---|
| S7 | aspheric | 9.4249 | 0.4244 | 1.54 | 55.7 | 81.9506 |
| S8 | aspheric | −10.8837 | 0.3029 | | | 61.8922 |
| S9 | aspheric | −5.4339 | 0.3640 | 1.67 | 20.4 | 16.4407 |
| S10 | aspheric | −12.0655 | 0.2210 | | | 84.9091 |
| S11 | aspheric | −10.4349 | 0.5001 | 1.65 | 23.5 | 6.5087 |
| S12 | aspheric | −3.4359 | 0.7888 | | | 1.1635 |
| S13 | aspheric | −4.2225 | 0.5695 | 1.54 | 55.7 | −0.0148 |
| S14 | aspheric | 3.3271 | 0.2934 | | | −0.0073 |
| S15 | spherical | infinite | 0.1100 | 1.52 | 64.2 | |
| S16 | spherical | infinite | 0.1963 | | | |
| S17 | spherical | infinite | | | | |

As can be known from Table 4, in the second embodiment, the object-side surface and the image-side surface of any one of the first lens E1 to the seventh lens E7 are aspheric surfaces. Table 5 shows the high-order coefficients of the aspheric surfaces applicable in the second embodiment. Here, the surface types of the aspheric surfaces may be defined by the formula (1) given above in the first embodiment.

TABLE 5

| surface number | A4 | A6 | A8 | A10 | A12 |
|---|---|---|---|---|---|
| S1 | −9.2732E−03 | −1.5217E−03 | −1.0093E−03 | −1.5081E−02 | 3.6298E−02 |
| S2 | −1.3713E−02 | 5.0764E−02 | −1.7506E−01 | 3.7934E−01 | −5.4096E−01 |
| S3 | 1.2519E−03 | 8.8223E−02 | −3.9625E−01 | 9.6926E−01 | −1.5262E+00 |
| S4 | −6.1675E−02 | 1.7605E−01 | −4.4841E−01 | 7.8949E−01 | −9.8647E−01 |
| S5 | −1.4837E−01 | 1.8219E−01 | −3.4113E−01 | 5.4000E−01 | −4.9297E−01 |
| S6 | −6.9045E−02 | −3.4588E−02 | 4.0582E−01 | −1.7800E+00 | 4.5977E+00 |
| S7 | 2.5882E−02 | −2.7219E−02 | 6.6269E−02 | −6.8364E−02 | −4.4459E−01 |
| S8 | 4.1928E−03 | −5.1340E−02 | 4.6022E−01 | −2.2440E+00 | 6.3167E+00 |
| S9 | −7.3641E−02 | −1.2033E−01 | 6.0738E−01 | −2.1204E+00 | 4.4390E+00 |
| S10 | −9.6401E−02 | 4.7989E−02 | −3.0476E−01 | 1.0244E+00 | −2.0272E+00 |
| S11 | −6.1492E−02 | −2.3196E−02 | −1.4283E−01 | 5.3443E−01 | −9.8868E−01 |
| S12 | 8.6058E−03 | −4.3168E−02 | 4.8174E−02 | −4.0761E−02 | 2.4076E−02 |
| S13 | −8.2776E−02 | 4.1628E−02 | −1.1309E−02 | 2.6586E−03 | −5.2174E−04 |
| S14 | −1.0452E−01 | 4.2762E−02 | −1.4263E−02 | 3.2568E−03 | −4.9945E−04 |

| surface number | A14 | A16 | A18 | A20 |
|---|---|---|---|---|
| S1 | −4.2423E−02 | 2.6721E−02 | −8.6223E−03 | 1.1090E−03 |
| S2 | 5.1654E−01 | −3.0912E−01 | 1.0215E−01 | −1.4046E−02 |
| S3 | 1.5623E+00 | −9.8837E−01 | 3.4555E−01 | −5.0513E−02 |
| S4 | 9.1741E−01 | −6.1731E−01 | 2.5866E−01 | −4.7658E−02 |
| S5 | 2.2884E−01 | −6.2255E−02 | 3.3282E−02 | −1.4382E−02 |
| S6 | −7.1231E+00 | 6.3321E+00 | −2.9154E+00 | 5.2308E−01 |
| S7 | 1.8633E+00 | −3.1328E+00 | 2.5561E+00 | −8.1483E−01 |
| S8 | −1.0785E+01 | 1.1044E+01 | −6.2403E+00 | 1.5156E+00 |
| S9 | −6.0730E+00 | 5.1973E+00 | −2.5672E+00 | 5.6763E−01 |
| S10 | 2.3592E+00 | −1.6157E+00 | 6.0193E−01 | −9.3026E−02 |
| S11 | 1.0405E+00 | −6.4677E−01 | 2.1957E−01 | −3.0841E−02 |
| S12 | −1.0665E−02 | 3.5515E−03 | −7.3252E−04 | 6.4938E−05 |
| S13 | 7.3440E−05 | −6.6277E−06 | 3.4050E−07 | −7.5664E−09 |
| S14 | 4.8703E−05 | −2.7730E−06 | 7.9873E−08 | −8.2658E−10 |

Table 6 gives the effective focal lengths f1 to f7 of the lenses, the total effective focal length f of the optical imaging lens assembly, the total track length TTL, and the half of the diagonal length ImgH of the effective pixel area on the image plane S17 in the second embodiment.

TABLE 6

| f1 (mm) | 4.37 | f6 (mm) | 7.73 |
|---|---|---|---|
| f2 (mm) | 87.50 | f7 (mm) | −3.38 |
| f3 (mm) | −11.74 | f (mm) | 4.53 |
| f4 (mm) | 9.48 | TTL (mm) | 5.25 |
| f5 (mm) | −15.16 | ImgH (mm) | 3.93 |

Figure 4A:
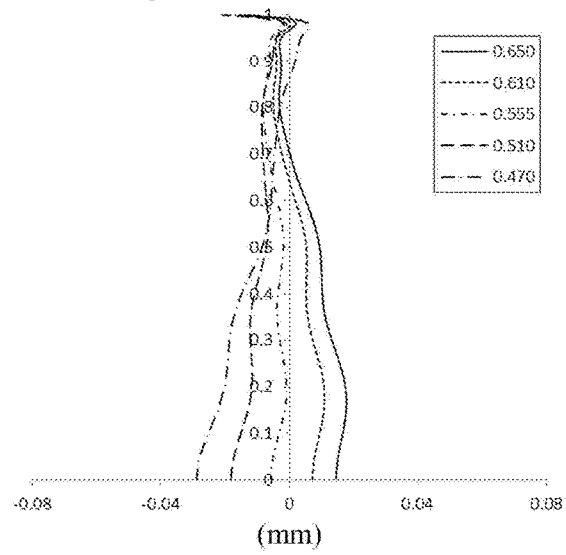
FIGS. 4A-4D respectively illustrate a longitudinal aberration curve, an astigmatic curve, a distortion curve and a lateral color curve of the optical imaging lens assembly according to the second embodiment.
Figure 4B:
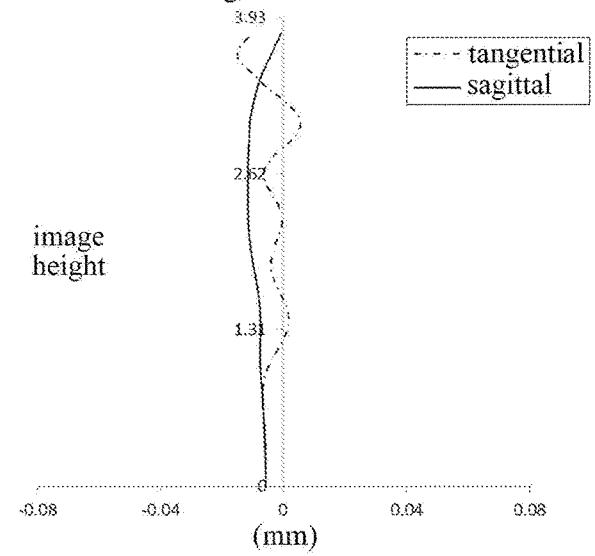
Figure 4C:
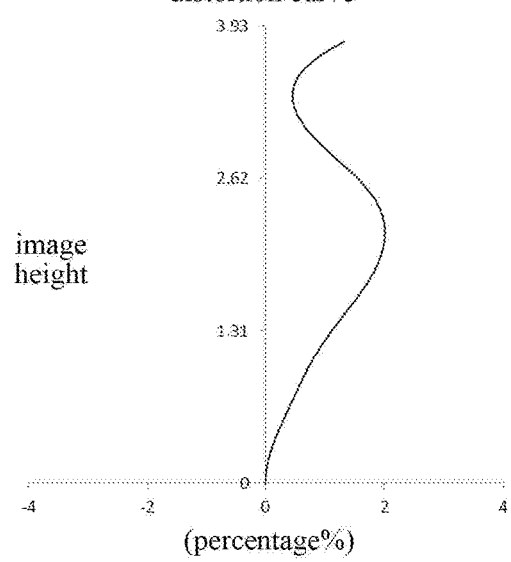
Figure 4D:
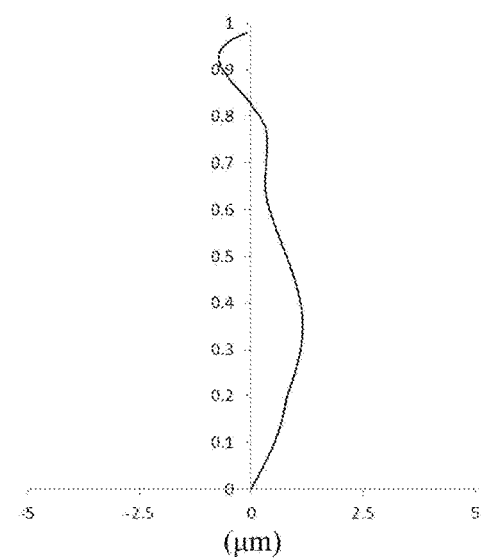

FIG. 4A shows the longitudinal aberration curve of the optical imaging lens assembly according to the second embodiment, representing deviations of focal points of light of different wavelengths converged after passing through the lens assembly. FIG. 4B shows the astigmatic curve of the optical imaging lens assembly according to the second embodiment, representing a curvature of the tangential image plane and a curvature of the sagittal image plane. FIG. 4C shows the distortion curve of the optical imaging lens assembly according to the second embodiment, representing amounts of distortion at different viewing angles. FIG. 4D shows the lateral color curve of the optical imaging lens assembly according to the second embodiment, representing deviations of different image heights on the image plane after light passes through the lens assembly. As can be seen according to FIGS. 4A to 4D, the optical imaging lens assembly given in the second embodiment may achieve good imaging quality.

Third Embodiment

Figure 5:
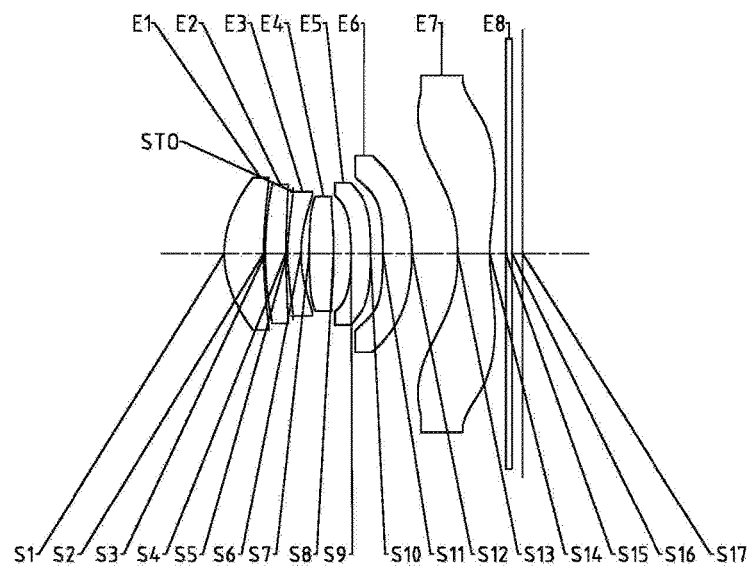
FIG. 5 is a schematic structural diagram illustrating an optical imaging lens assembly according to the third embodiment of the present disclosure.

An optical imaging lens assembly according to the third embodiment of the present disclosure is described below with reference to FIGS. 5-6D. FIG. 5 is a schematic structural diagram illustrating the optical imaging lens assembly according to the third embodiment of the present disclosure.

As shown in FIG. 5, the optical imaging lens assembly according to illustrative implementations of the present disclosure along the optical axis from the object side to the image side sequentially includes: a first lens E1, a second lens E2, a diaphragm STO, a third lens E3, a fourth lens E4, a fifth lens E5, a sixth lens E6, a seventh lens E7, an optical filter E8, and an image plane S17.

The first lens E1 has a positive refractive power, an object-side surface S1 of the first lens E1 is a convex surface, and an image-side surface S2 of the first lens E1 is a concave surface. The second lens E2 has a positive refractive power, an object-side surface S3 of the second lens E2 is a convex surface, and an image-side surface S4 of the second lens E2 is a concave surface. The third lens E3 has a negative refractive power, an object-side surface S5 of the third lens E3 is a convex surface, and an image-side surface S6 of the third lens E3 is a concave surface. The fourth lens E4 has a positive refractive power, an object-side surface S7 of the fourth lens E4 is a convex surface, and an image-side surface S8 of the fourth lens E4 is a convex surface. The fifth lens E5 has a negative refractive power, an object-side surface S9 of the fifth lens E5 is a concave surface, and an image-side surface S10 of the fifth lens E5 is a convex surface. The sixth lens E6 has a positive refractive power, an object-side surface S11 of the sixth lens E6 is a concave surface, and an image-side surface S12 of the sixth lens E6 is a convex surface. The seventh lens E7 has a negative refractive power, an object-side surface S13 of the seventh lens E7 is a concave surface, and an image-side surface S14 of the seventh lens E7 is a concave surface. The optical filter E8 has an object-side surface S15 and an image-side surface S16. Light from an object passes through the surfaces S1 to S16 sequentially and is finally imaged on the image plane S17.

Table 7 shows the surface type, the radius of curvature, the thickness, the material, and the conic coefficient of each lens of the optical imaging lens assembly in the third embodiment. The radius of curvature and the thickness are shown in millimeters (mm).

TABLE 7

| surface number | surface type | radius of curvature | thickness | refractive index | abbe number | conic coefficient |
|---|---|---|---|---|---|---|
| OBJ | spherical | infinite | infinite | | | |
| S1 | aspheric | 1.8726 | 0.6921 | 1.55 | 64.1 | −0.0656 |
| S2 | aspheric | 7.5296 | 0.0300 | | | −18.2971 |
| S3 | aspheric | 7.4017 | 0.3575 | 1.55 | 64.1 | 11.7150 |
| S4 | aspheric | 8.6294 | 0.1178 | | | −50.4288 |
| STO | spherical | infinite | −0.0868 | | | |
| S5 | aspheric | 3.0412 | 0.2350 | 1.67 | 20.4 | −1.1304 |
| S6 | aspheric | 2.1313 | 0.1439 | | | 0.2570 |
| S7 | aspheric | 9.5171 | 0.4280 | 1.54 | 55.7 | 80.9157 |
| S8 | aspheric | −11.1969 | 0.3080 | | | 62.9023 |
| S9 | aspheric | −5.5320 | 0.3528 | 1.67 | 20.4 | 16.0010 |
| S10 | aspheric | −12.0734 | 0.2177 | | | 85.0400 |
| S11 | aspheric | −11.2473 | 0.5106 | 1.65 | 23.5 | 9.9227 |
| S12 | aspheric | −3.5072 | 0.8038 | | | 1.3700 |
| S13 | aspheric | −4.2206 | 0.5615 | 1.54 | 55.7 | −0.0083 |
| S14 | aspheric | 3.3294 | 0.2824 | | | −0.0077 |
| S15 | spherical | infinite | 0.1100 | 1.52 | 64.2 | |
| S16 | spherical | infinite | 0.1853 | | | |
| S17 | spherical | infinite | | | | |

As can be known from Table 7, in the third embodiment, the object-side surface and the image-side surface of any one of the first lens E1 to the seventh lens E7 are aspheric surfaces. Table 8 shows the high-order coefficients of the aspheric surfaces applicable in the third embodiment. Here, the surface types of the aspheric surfaces may be defined by the formula (1) given above in the first embodiment.

TABLE 8

| surface number | A4 | A6 | A8 | A10 | A12 |
|---|---|---|---|---|---|
| S1 | −1.0902E−02 | 5.3325E−03 | −1.5992E−02 | 5.2414E−03 | 1.8446E−02 |
| S2 | −1.1690E−02 | 3.7596E−02 | −1.1973E−02 | 2.4022E−01 | −3.3110E−01 |
| S3 | 2.0929E−03 | 8.0790E−02 | −3.5292E−01 | 8.3211E−01 | −1.2770E+00 |
| S4 | −6.1854E−02 | 1.6908E−01 | −3.8460E−01 | 5.6696E−01 | −5.5454E−01 |
| S5 | −1.5140E−01 | 1.9603E−01 | −3.7488E−01 | 5.9269E−01 | −5.4708E−01 |
| S6 | −6.3652E−02 | −1.3126E−01 | 1.1256E+00 | −4.7288E+00 | 1.1854E+01 |
| S7 | 2.0141E−02 | 2.2196E−01 | −1.8498E−01 | 6.5273E−01 | −1.5615E+00 |
| S8 | 1.0122E−02 | −9.7022E−02 | 6.4485E−01 | −2.6316E+00 | 6.6094E+00 |
| S9 | −8.3519E−02 | 1.4514E−02 | −2.7729E−01 | 1.2717E+00 | −3.5669E+00 |
| S10 | −9.4290E−02 | 3.1243E−02 | −2.2743E−01 | 8.2703E−01 | −1.7119E+00 |
| S11 | −6.3813E−02 | −2.1354E−02 | −1.3314E−01 | 4.9664E−01 | −9.1418E−01 |

TABLE 8-continued

| | | | | | |
|---|---|---|---|---|---|
| S12 | 6.7026E−03 | −4.4117E−02 | 5.2845E−02 | −4.9686E−02 | 3.3610E−02 |
| S13 | −8.2541E−02 | 4.1810E−02 | −1.1709E−02 | 2.8705E−03 | −5.7698E−04 |
| S14 | −1.0371E−01 | 4.2313E−02 | −1.4020E−02 | 3.1709E−03 | −4.8100E−04 |

| surface number | A14 | A16 | A18 | A20 |
|---|---|---|---|---|
| S1 | −3.1929E−02 | 2.2569E−02 | −7.6060E−03 | 9.9486E−04 |
| S2 | 3.2053E−01 | −1.9743E−01 | 6.6616E−02 | −9.2252E−03 |
| S3 | 1.2869E+00 | −8.0429E−01 | 2.7736E−01 | −3.9837E−02 |
| S4 | 4.0512E−01 | −2.4566E−01 | 1.0613E−01 | −2.0560E−02 |
| S5 | 2.6079E−01 | −6.6349E−02 | 2.6098E−02 | −1.1026E−02 |
| S6 | −1.8070E+01 | 1.6249E+01 | −7.8719E+00 | 1.5740E+00 |
| S7 | 2.6172E+00 | −2.9650E+00 | 2.0175E+00 | −5.9427E−01 |
| S8 | −1.0385E+01 | 9.9610E+00 | −5.3269E+00 | 1.2336E+00 |
| S9 | 5.7235E+00 | −5.3701E+00 | 2.7008E+00 | −5.5445E−01 |
| S10 | 2.0403E+00 | −1.4182E+00 | 5.3377E−01 | −8.3050E−02 |
| S11 | 9.5573E−01 | −5.9071E−01 | 1.9967E−01 | −2.7939E−02 |
| S12 | −1.6744E−02 | 5.7967E−03 | −1.1732E−03 | 1.0048E−04 |
| S13 | 8.1387E−05 | −7.2515E−06 | 3.6392E−07 | −7.8304E−09 |
| S14 | 4.6383E−05 | −2.6142E−06 | 7.4888E−08 | −7.8739E−10 |

Table 9 gives the effective focal lengths f1 to f7 of the lenses, the total effective focal length f of the optical imaging lens assembly, the total track length TTL, and the half of the diagonal length ImgH of the effective pixel area on the image plane S17 in the third embodiment.

TABLE 9

| f1 (mm) | 4.38 | f6 (mm) | 7.71 |
|---|---|---|---|
| f2 (mm) | 86.42 | f7 (mm) | −3.38 |
| f3 (mm) | −11.91 | f (mm) | 4.48 |
| f4 (mm) | 9.65 | TTL (mm) | 5.25 |
| f5 (mm) | −15.65 | ImgH (mm) | 3.93 |

Figures 6A, 6B:
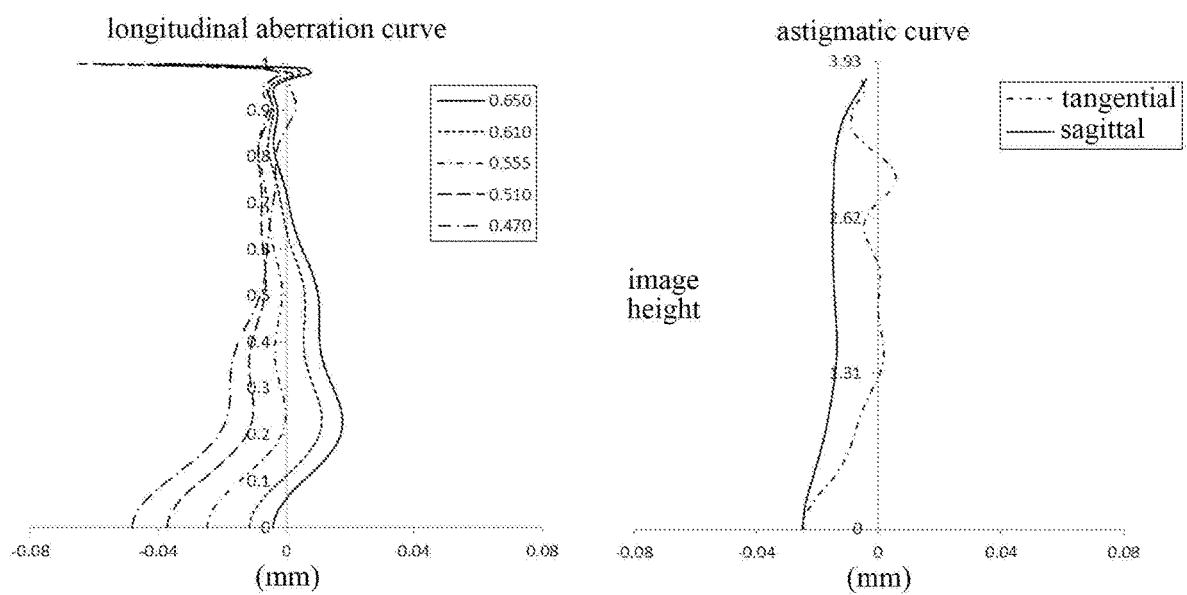

FIG. 6A shows the longitudinal aberration curve of the optical imaging lens assembly according to the third embodiment, representing deviations of focal points of light of different wavelengths converged after passing through the lens assembly. FIG. 6B shows the astigmatic curve of the optical imaging lens assembly according to the third embodiment, representing a curvature of the tangential image plane and a curvature of the sagittal image plane. FIG. 6C shows the distortion curve of the optical imaging lens assembly according to the third embodiment, representing amounts of distortion at different viewing angles. FIG. 6D shows the lateral color curve of the optical imaging lens assembly according to the third embodiment, representing deviations of different image heights on the image plane after light passes through the lens assembly. As can be seen according to FIGS. 6A to 6D, the optical imaging lens assembly given in the third embodiment may achieve good imaging quality.

Fourth Embodiment

Figure 7:
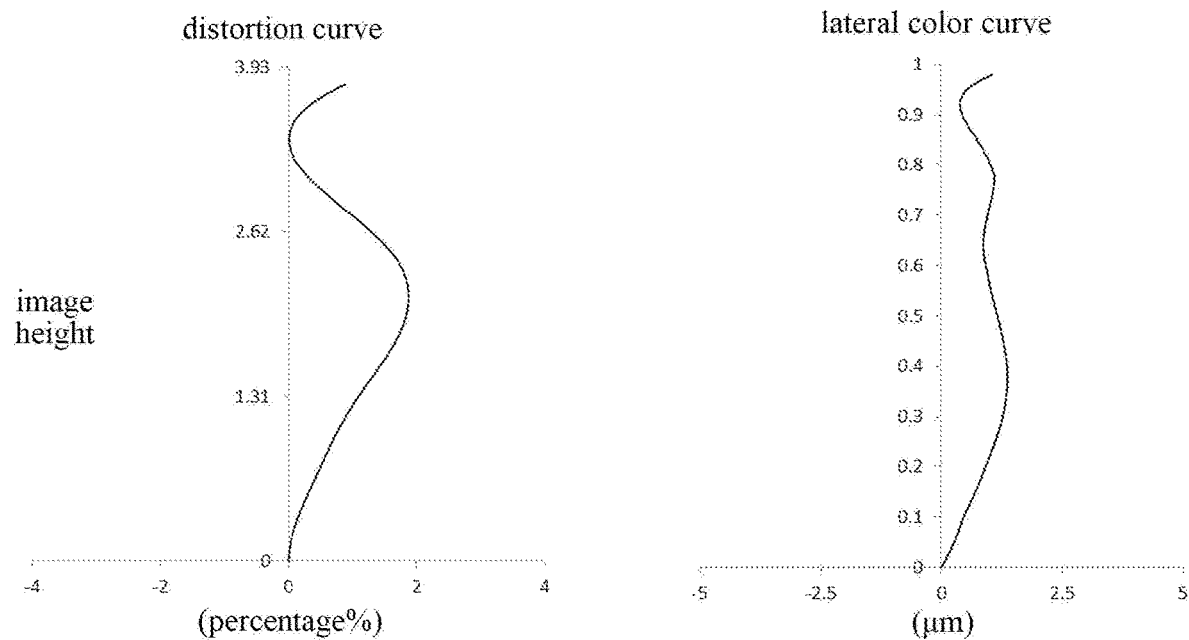
FIG. 7 is a schematic structural diagram illustrating an optical imaging lens assembly according to the fourth embodiment of the present disclosure.
Figure 7:
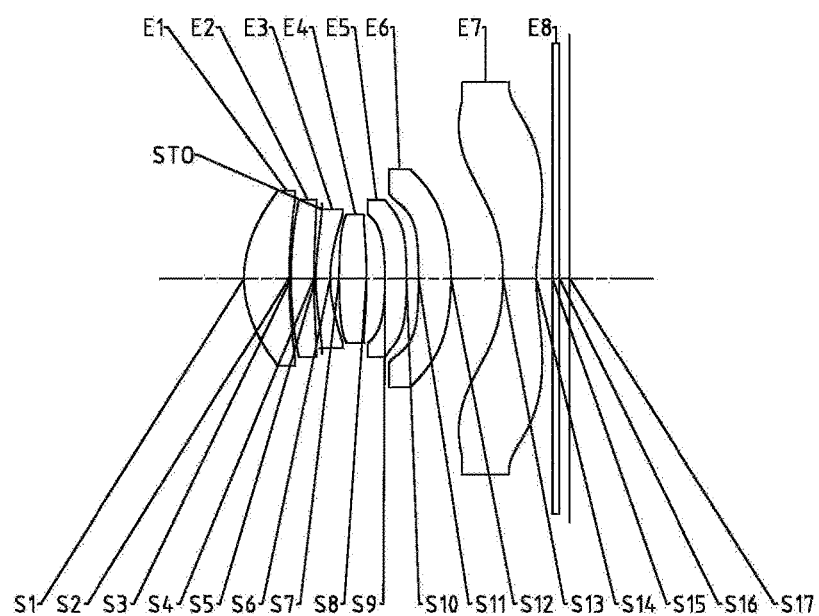

An optical imaging lens assembly according to the fourth embodiment of the present disclosure is described below with reference to FIGS. 7-8D. FIG. 7 is a schematic structural diagram illustrating the optical imaging lens assembly according to the fourth embodiment of the present disclosure.

As shown in FIG. 7, the optical imaging lens assembly according to illustrative implementations of the present disclosure along the optical axis from the object side to the image side sequentially includes: a first lens E1, a second lens E2, a diaphragm STO, a third lens E3, a fourth lens E4, a fifth lens E5, a sixth lens E6, a seventh lens E7, an optical filter E8, and an image plane S17.

The first lens E1 has a positive refractive power, an object-side surface S1 of the first lens E1 is a convex surface, and an image-side surface S2 of the first lens E1 is a concave surface. The second lens E2 has a positive refractive power, an object-side surface S3 of the second lens E2 is a convex surface, and an image-side surface S4 of the second lens E2 is a concave surface. The third lens E3 has a negative refractive power, an object-side surface S5 of the third lens E3 is a convex surface, and an image-side surface S6 of the third lens E3 is a concave surface. The fourth lens E4 has a positive refractive power, an object-side surface S7 of the fourth lens E4 is a convex surface, and an image-side surface S8 of the fourth lens E4 is a convex surface. The fifth lens E5 has a negative refractive power, an object-side surface S9 of the fifth lens E5 is a concave surface, and an image-side surface S10 of the fifth lens E5 is a convex surface. The sixth lens E6 has a positive refractive power, an object-side surface S11 of the sixth lens E6 is a concave surface, and an image-side surface S12 of the sixth lens E6 is a convex surface. The seventh lens E7 has a negative refractive power, an object-side surface S13 of the seventh lens E7 is a concave surface, and an image-side surface S14 of the seventh lens E7 is a concave surface. The optical filter E8 has an object-side surface S15 and an image-side surface S16. Light from an object passes through the surfaces S1 to S16 sequentially and is finally imaged on the image plane S17.

Table 10 shows the surface type, the radius of curvature, the thickness, the material, and the conic coefficient of each lens of the optical imaging lens assembly in the fourth embodiment. The radius of curvature and the thickness are shown in millimeters (mm).

TABLE 10

| surface number | surface type | radius of curvature | thickness | material refractive index | abbe number | conic coefficient |
|---|---|---|---|---|---|---|
| OBJ | spherical | infinite | infinite | | | |
| S1 | aspheric | 1.8899 | 0.7262 | 1.55 | 64.1 | −0.0667 |
| S2 | aspheric | 7.1616 | 0.0300 | | | −19.5095 |
| S3 | aspheric | 7.5430 | 0.3685 | 1.55 | 64.1 | 12.9951 |
| S4 | aspheric | 8.2603 | 0.1195 | | | −53.7079 |
| STO | spherical | infinite | −0.0895 | | | |
| S5 | aspheric | 2.9986 | 0.2350 | 1.67 | 20.4 | −1.1583 |
| S6 | aspheric | 2.2027 | 0.1423 | | | 0.4082 |
| S7 | aspheric | 9.6738 | 0.4363 | 1.54 | 55.7 | 79.0035 |
| S8 | aspheric | −11.0649 | 0.3007 | | | 68.6297 |
| S9 | aspheric | −5.5777 | 0.3560 | 1.67 | 20.4 | 10.6044 |
| S10 | aspheric | −12.2439 | 0.1933 | | | 84.2133 |
| S11 | aspheric | −18.4430 | 0.5243 | 1.65 | 23.5 | 33.1843 |
| S12 | aspheric | −4.1099 | 0.8320 | | | 1.6753 |
| S13 | aspheric | −4.2182 | 0.5404 | 1.54 | 55.7 | −0.0089 |
| S14 | aspheric | 3.3301 | 0.2611 | | | −0.0099 |
| S15 | spherical | infinite | 0.1100 | 1.52 | 64.2 | |
| S16 | spherical | infinite | 0.1640 | | | |
| S17 | spherical | infinite | | | | |

As can be known from Table 10, in the fourth embodiment, the object-side surface and the image-side surface of any one of the first lens E1 to the seventh lens E7 are aspheric surfaces. Table 11 shows the high-order coefficients of the aspheric surfaces applicable in the fourth embodiment. Here, the surface types of the aspheric surfaces may be defined by the formula (1) given above in the first embodiment.

TABLE 11

| surface number | A4 | A6 | A8 | A10 | A12 |
|---|---|---|---|---|---|
| S1 | −1.4558E−02 | 2.3274E−02 | −6.1141E−02 | 7.5623E−02 | −5.3156E−02 |
| S2 | −8.2218E−03 | 2.3042E−02 | −6.9321E−02 | 1.2957E−01 | −1.7662E−01 |
| S3 | 5.9256E−03 | 4.8575E−02 | −2.0627E−01 | 4.5272E−01 | −6.5807E−01 |
| S4 | −6.3104E−02 | 1.5720E−01 | −2.7835E−01 | 2.2221E−01 | 9.7125E−02 |
| S5 | −1.4656E−01 | 1.7354E−01 | −2.9585E−01 | 4.0384E−01 | −2.5321E−01 |
| S6 | −5.9577E−02 | −7.0463E−02 | 5.2803E−01 | −2.0134E+00 | 4.7687E+00 |
| S7 | 2.4995E−02 | −3.0081E−02 | 1.1650E−01 | −4.1599E−01 | 8.6715E−01 |
| S8 | 4.6039E−03 | −3.3296E−02 | 3.0303E−01 | −1.4674E+00 | 4.0065E+00 |
| S9 | −7.4647E−02 | −1.3597E−02 | −7.4317E−02 | 5.8609E−01 | −2.1800E+00 |
| S10 | −9.6000E−02 | 3.9349E−02 | −1.8760E−01 | 6.3568E−01 | −1.2983E+00 |
| S11 | −6.3884E−02 | −5.2952E−02 | 1.4729E−02 | 1.6781E−01 | −4.7228E−01 |
| S12 | 6.0857E−03 | −4.4108E−02 | 5.6735E−02 | −5.7385E−02 | 3.9769E−02 |
| S13 | − 8.0151E−02 | 3.8624E−02 | −9.6948E−03 | 2.0819E−03 | −3.8271E−04 |
| S14 | −9.9744E−02 | 3.8990E−02 | −1.2197E−02 | 2.5472E−03 | −3.4457E−04 |

| surface number | A14 | A16 | A18 | A20 |
|---|---|---|---|---|
| S1 | 1.7152E−02 | 3.2654E−04 | −1.6367E−03 | 2.9292E−04 |
| S2 | 1.7165E−01 | −1.0293E−01 | 3.2758E−02 | −4.1881E−03 |
| S3 | 6.2954E−01 | −3.6857E−01 | 1.1702E−01 | −1.5213E−02 |
| S4 | −3.8485E−01 | 3.5781E−01 | −1.5545E−01 | 2.7557E−02 |
| S5 | −6.3113E−02 | 1.9562E−01 | −1.1077E−01 | 2.1424E−02 |
| S6 | −6.9452E+00 | 5.9436E+00 | −2.7165E+00 | 5.0664E−01 |
| S7 | −9.5670E−01 | 3.9618E−01 | 1.4308E−01 | −1.2289E−01 |
| S8 | −6.5573E+00 | 6.3917E+00 | −3.4163E+00 | 7.8134E−01 |
| S9 | 4.0081E+00 | −4.0955E+00 | 2.1999E+00 | −4.8277E−01 |
| S10 | 1.5221E+00 | −1.0360E+00 | 3.8099E−01 | −5.7822E−02 |
| S11 | 5.7993E−01 | −3.9252E−01 | 1.4054E−01 | −2.0359E−02 |
| S12 | −1.9132E−02 | 6.1278E−03 | −1.1371E−03 | 9.0140E−05 |
| S13 | 5.1515E−05 | −4.4733E−06 | 2.2080E−07 | −4.6875E−09 |
| S14 | 2.7763E−05 | −1.1002E−06 | 7.9435E−09 | 4.5373E−10 |

TABLE 12

| f1 (mm) | 4.49 | f6 (mm) | 8.09 |
|---|---|---|---|
| f2 (mm) | 134.71 | f7 (mm) | −3.38 |
| f3 (mm) | −14.11 | f (mm) | 4.44 |
| f4 (mm) | 9.69 | TTL (mm) | 5.25 |
| f5 (mm) | −15.70 | ImgH (mm) | 3.96 |

Table 12 gives the effective focal lengths f1 to f7 of the lenses, the total effective focal length f of the optical imaging lens assembly, the total track length TTL, and the half of the diagonal length ImgH of the effective pixel area on the image plane S17 in the fourth embodiment.

Figure 8A:
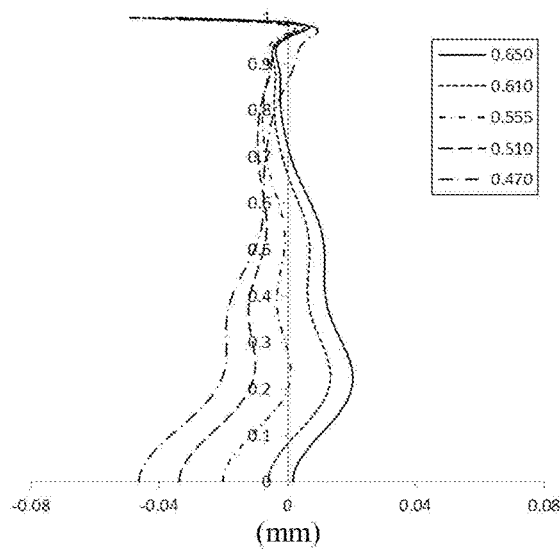
FIGS. 8A-8D respectively illustrate a longitudinal aberration curve, an astigmatic curve, a distortion curve and a lateral color curve of the optical imaging lens assembly according to the fourth embodiment.
Figure 8B:
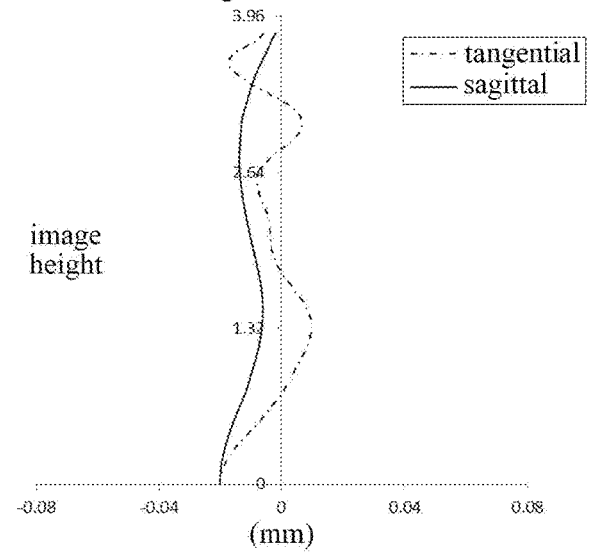
Figure 8C:
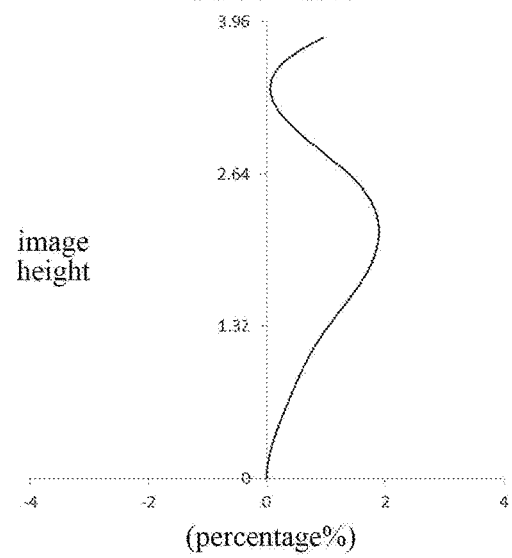
Figure 8D:
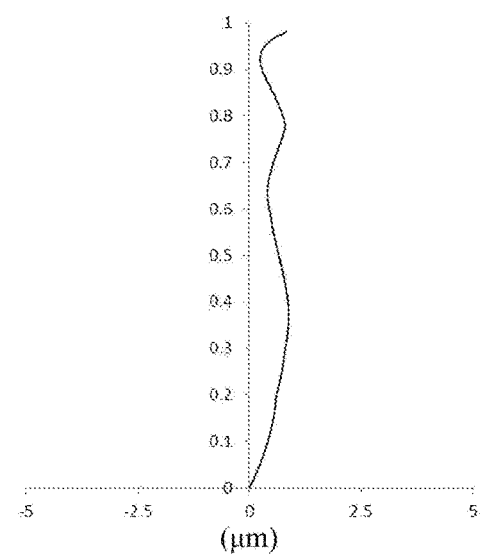

FIG. 8A shows the longitudinal aberration curve of the optical imaging lens assembly according to the fourth embodiment, representing deviations of focal points of light of different wavelengths converged after passing through the lens assembly. FIG. 8B shows the astigmatic curve of the optical imaging lens assembly according to the fourth embodiment, representing a curvature of the tangential image plane and a curvature of the sagittal image plane. FIG. 8C shows the distortion curve of the optical imaging lens assembly according to the fourth embodiment, representing amounts of distortion at different viewing angles. FIG. 8D shows the lateral color curve of the optical imaging lens assembly according to the fourth embodiment, representing deviations of different image heights on the image plane after light passes through the lens assembly. As can be seen according to FIGS. 8A to 8D, the optical imaging lens assembly given in the fourth embodiment may achieve good imaging quality.

Fifth Embodiment

Figure 9:
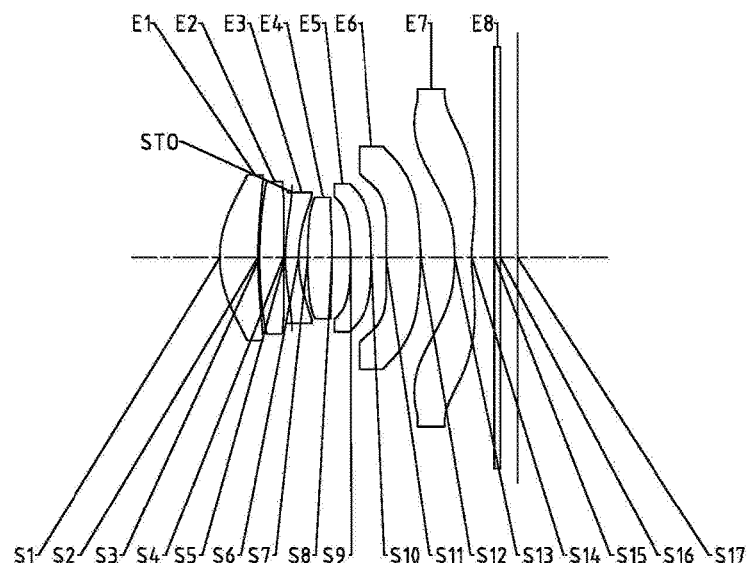
FIG. 9 is a schematic structural diagram illustrating an optical imaging lens assembly according to the fifth embodiment of the present disclosure.

An optical imaging lens assembly according to the fifth embodiment of the present disclosure is described below with reference to FIGS. 9-10D. FIG. 9 is a schematic structural diagram illustrating the optical imaging lens assembly according to the fifth embodiment of the present disclosure.

As shown in FIG. 9, the optical imaging lens assembly according to illustrative implementations of the present disclosure along the optical axis from the object side to the image side sequentially includes: a first lens E1, a second lens E2, a diaphragm STO, a third lens E3, a fourth lens E4, a fifth lens E5, a sixth lens E6, a seventh lens E7, an optical filter E8, and an image plane S17.

The first lens E1 has a positive refractive power, an object-side surface S1 of the first lens E1 is a convex surface, and an image-side surface S2 of the first lens E1 is a concave surface. The second lens E2 has a positive refractive power, an object-side surface S3 of the second lens E2 is a convex surface, and an image-side surface S4 of the second lens E2 is a concave surface. The third lens E3 has a negative refractive power, an object-side surface S5 of the third lens E3 is a convex surface, and an image-side surface S6 of the third lens E3 is a concave surface. The fourth lens E4 has a positive refractive power, an object-side surface S7 of the fourth lens E4 is a convex surface, and an image-side surface S8 of the fourth lens E4 is a convex surface. The fifth lens E5 has a negative refractive power, an object-side surface S9 of the fifth lens E5 is a concave surface, and an image-side surface S10 of the fifth lens E5 is a convex surface. The sixth lens E6 has a positive refractive power, an object-side surface S11 of the sixth lens E6 is a convex surface, and an image-side surface S12 of the sixth lens E6 is a convex surface. The seventh lens E7 has a negative refractive power, an object-side surface S13 of the seventh lens E7 is a concave surface, and an image-side surface S14 of the seventh lens E7 is a concave surface. The optical filter E8 has an object-side surface S15 and an image-side surface S16. Light from an object passes through the surfaces S1 to S16 sequentially and is finally imaged on the image plane S17.

Table 13 shows the surface type, the radius of curvature, the thickness, the material, and the conic coefficient of each lens of the optical imaging lens assembly in the fifth embodiment. The radius of curvature and the thickness are shown in millimeters (mm).

TABLE 13

| surface number | surface type | radius of curvature | thickness | material refractive index | abbe number | conic coefficient |
|---|---|---|---|---|---|---|
| OBJ | spherical | infinite | infinite | | | |
| S1 | aspheric | 1.9536 | 0.6710 | 1.55 | 64.1 | −0.1663 |
| S2 | aspheric | 6.7799 | 0.0300 | | | −41.7525 |
| S3 | aspheric | 9.9601 | 0.4204 | 1.55 | 64.1 | 22.1735 |
| S4 | aspheric | 16.5349 | 0.1127 | | | −91.5011 |
| STO | spherical | infinite | −0.0827 | | | |
| S5 | aspheric | 2.7176 | 0.2350 | 1.67 | 20.4 | −1.5821 |
| S6 | aspheric | 2.0314 | 0.1596 | | | 0.2230 |
| S7 | aspheric | 9.6310 | 0.4280 | 1.54 | 55.7 | 72.2521 |
| S8 | aspheric | −14.2844 | 0.3276 | | | 59.3349 |
| S9 | aspheric | −6.6198 | 0.3722 | 1.67 | 20.4 | 8.4253 |
| S10 | aspheric | −12.8299 | 0.2651 | | | 87.8883 |
| S11 | aspheric | 19.6796 | 0.6088 | 1.65 | 23.5 | −99.0000 |
| S12 | aspheric | −5.2791 | 0.5967 | | | 1.9182 |
| S13 | aspheric | −4.0253 | 0.3000 | 1.54 | 55.7 | 0.0152 |
| S14 | aspheric | 3.4264 | 0.3963 | | | 0.0244 |
| S15 | spherical | infinite | 0.1100 | 1.52 | 64.2 | |
| S16 | spherical | infinite | 0.2992 | | | |
| S17 | spherical | infinite | | | | |

As can be known from Table 13, in the fifth embodiment, the object-side surface and the image-side surface of any one of the first lens E1 to the seventh lens E7 are aspheric surfaces. Table 14 shows the high-order coefficients of the aspheric surfaces applicable in the fifth embodiment. Here, the surface types of the aspheric surfaces may be defined by the formula (1) given above in the first embodiment.

TABLE 14

| surface number | A4 | A6 | A8 | A10 | A12 |
|---|---|---|---|---|---|
| S1 | −1.6249E−02 | 2.1884E−02 | −7.1745E−02 | 1.0561E−01 | −9.8009E−02 |
| S2 | 1.1531E−02 | −5.2784E−02 | 1.2163E−01 | −2.7194E−01 | 3.7835E−01 |
| S3 | 2.6759E−02 | −3.1955E−02 | 3.7386E−02 | −1.0329E−01 | 1.6678E−01 |
| S4 | −7.3827E−02 | 1.9493E−01 | −4.1035E−01 | 5.5680E−01 | −4.9153E−01 |
| S5 | −1.5879E−01 | 1.8855E−01 | −3.2860E−01 | 4.8130E−01 | −4.0174E−01 |
| S6 | −6.8042E−02 | −1.1086E−01 | 6.6880E−01 | −2.2186E+00 | 4.7244E+00 |
| S7 | 3.2052E−02 | −1.8136E−02 | 5.0577E−02 | −3.1935E−01 | 8.9997E−01 |
| S8 | 2.1101E−02 | −1.5176E−01 | 9.3814E−01 | −3.4371E+00 | 7.6406E+00 |
| S9 | −8.5208E−02 | 6.7818E−02 | −3.8099E−01 | 1.2035E+00 | −2.5823E+00 |
| S10 | −9.2756E−02 | −7.1058E−03 | 1.9291E−02 | 6.1231E−02 | −2.6832E−01 |
| S11 | −3.9571E−02 | −5.5637E−02 | 1.7238E−02 | 6.9070E−02 | −1.7322E−01 |
| S12 | 4.6731E−02 | −6.8821E−02 | 5.9347E−02 | −4.5828E−02 | 2.5130E−02 |
| S13 | −1.0150E−01 | 5.4742E−02 | −1.6469E−02 | 4.2212E−03 | −8.6150E−04 |
| S14 | −1.4225E−01 | 6.9879E−02 | −2.7975E−02 | 7.7626E−03 | −1.4295E−03 |

TABLE 14-continued

| surface number | A14 | A16 | A18 | A20 |
|---|---|---|---|---|
| S1 | 5.4504E−02 | −1.7485E−02 | 2.9366E−03 | −1.9351E−04 |
| S2 | −3.0193E−01 | 1.3906E−01 | −3.5051E−02 | 3.8068E−03 |
| S3 | −1.3054E−01 | 5.2909E−02 | −1.1252E−02 | 1.1202E−03 |
| S4 | 2.7624E−01 | −9.4354E−02 | 1.7458E−02 | −1.2280E−03 |
| S5 | 1.4066E−01 | 2.7385E−02 | −3.6554E−02 | 7.8312E−03 |
| S6 | −6.3011E+00 | 5.0296E+00 | −2.1789E+00 | 3.9026E−01 |
| S7 | −1.3276E+00 | 1.0394E+00 | −3.6797E−01 | 3.5054E−02 |
| S8 | −1.0563E+01 | 8.8836E+00 | −4.1614E+00 | 8.3919E−01 |
| S9 | 3.4027E+00 | −2.7200E+00 | 1.1994E+00 | −2.2262E−01 |
| S10 | 3.8406E−01 | −2.8051E−01 | 1.0513E−01 | −1.5769E−02 |
| S11 | 1.7963E−01 | −1.0134E−01 | 3.0131E−02 | −3.6264E−03 |
| S12 | −9.2051E−03 | 2.1584E−03 | −2.9069E−04 | 1.6940E−05 |
| S13 | 1.2203E−04 | −1.0896E−05 | 5.4725E−07 | −1.1740E−08 |
| S14 | 1.6755E−04 | −1.1658E−05 | 4.2114E−07 | −5.6013E−09 |

Table 15 gives the effective focal lengths f1 to f7 of the lenses, the total effective focal length f of the optical imaging lens assembly, the total track length TTL, and the half of the diagonal length ImgH of the effective pixel area on the image plane S17 in the fifth embodiment.

TABLE 15

| f1 (mm) | 4.79 | f6 (mm) | 6.52 |
|---|---|---|---|
| f2 (mm) | 44.87 | f7 (mm) | −3.40 |
| f3 (mm) | −13.98 | f (mm) | 4.44 |
| f4 (mm) | 10.78 | TTL (mm) | 5.25 |
| f5 (mm) | −21.01 | ImgH (mm) | 3.96 |

Figures 10A, 10B:
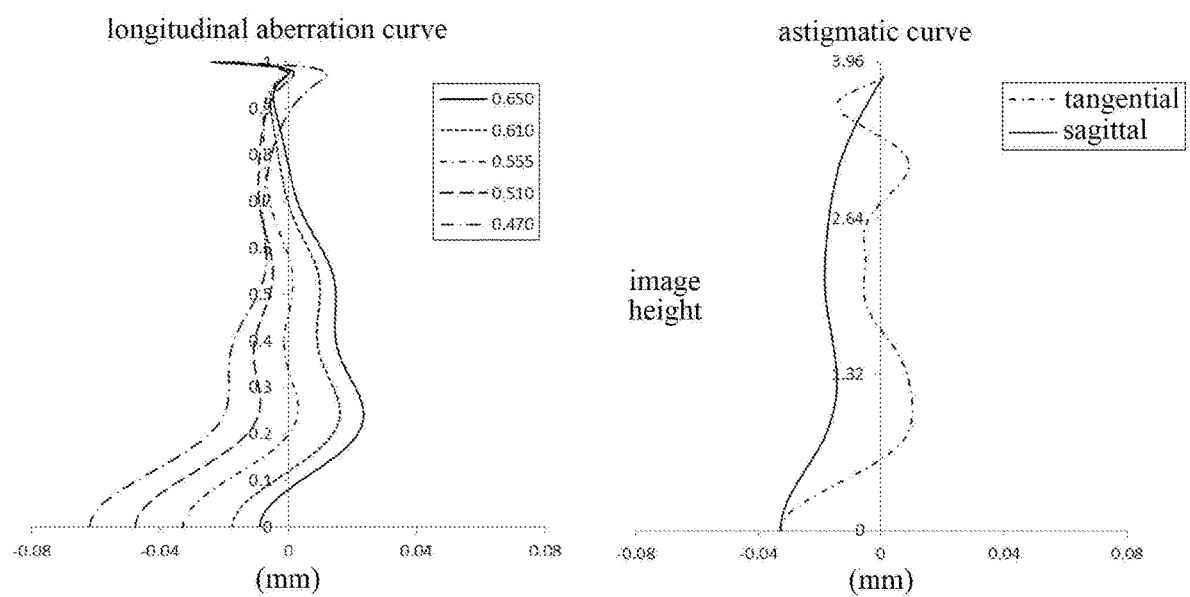

FIG. 10A shows the longitudinal aberration curve of the optical imaging lens assembly according to the fifth embodiment, representing deviations of focal points of light of different wavelengths converged after passing through the lens assembly. FIG. 10B shows the astigmatic curve of the optical imaging lens assembly according to the fifth embodiment, representing a curvature of the tangential image plane and a curvature of the sagittal image plane. FIG. 10C shows the distortion curve of the optical imaging lens assembly according to the fifth embodiment, representing amounts of distortion at different viewing angles. FIG. 10D shows the lateral color curve of the optical imaging lens assembly according to the fifth embodiment, representing deviations of different image heights on the image plane after light passes through the lens assembly. As can be seen according to FIGS. 10A to 10D, the optical imaging lens assembly given in the fifth embodiment may achieve good imaging quality.

Sixth Embodiment

An optical imaging lens assembly according to the sixth embodiment of the present disclosure is described below with reference to FIGS. 11-12D. FIG. 11 is a schematic structural diagram illustrating the optical imaging lens assembly according to the sixth embodiment of the present disclosure.

As shown in FIG. 11, the optical imaging lens assembly according to illustrative implementations of the present disclosure along the optical axis from the object side to the image side sequentially includes: a first lens E1, a second lens E2, a diaphragm STO, a third lens E3, a fourth lens E4, a fifth lens E5, a sixth lens E6, a seventh lens E7, an optical filter E8, and an image plane S17.

The first lens E1 has a positive refractive power, an object-side surface S1 of the first lens E1 is a convex surface, and an image-side surface S2 of the first lens E1 is a concave surface. The second lens E2 has a positive refractive power, an object-side surface S3 of the second lens E2 is a convex surface, and an image-side surface S4 of the second lens E2 is a concave surface. The third lens E3 has a negative refractive power, an object-side surface S5 of the third lens E3 is a convex surface, and an image-side surface S6 of the third lens E3 is a concave surface. The fourth lens E4 has a positive refractive power, an object-side surface S7 of the fourth lens E4 is a convex surface, and an image-side surface S8 of the fourth lens E4 is a convex surface. The fifth lens E5 has a negative refractive power, an object-side surface S9 of the fifth lens E5 is a concave surface, and an image-side surface S10 of the fifth lens E5 is a convex surface. The sixth lens E6 has a positive refractive power, an object-side surface S11 of the sixth lens E6 is a convex surface, and an image-side surface S12 of the sixth lens E6 is a convex surface. The seventh lens E7 has a negative refractive power, an object-side surface S13 of the seventh lens E7 is a concave surface, and an image-side surface S14 of the seventh lens E7 is a concave surface. The optical filter E8 has an object-side surface S15 and an image-side surface S16. Light from an object passes through the surfaces S1 to S16 sequentially and is finally imaged on the image plane S17.

Table 16 shows the surface type, the radius of curvature, the thickness, the material, and the conic coefficient of each lens of the optical imaging lens assembly in the sixth embodiment. The radius of curvature and the thickness are shown in millimeters (mm).

TABLE 16

| surface number | surface type | radius of curvature | thickness | material refractive index | abbe number | conic coefficient |
|---|---|---|---|---|---|---|
| OBJ | spherical | infinite | infinite | | | |
| S1 | aspheric | 2.0630 | 0.5948 | 1.55 | 64.1 | −0.4020 |
| S2 | aspheric | 6.4685 | 0.0342 | | | −84.6213 |
| S3 | aspheric | 10.4252 | 0.5468 | 1.55 | 64.1 | 37.4579 |
| S4 | aspheric | 20.0019 | 0.1843 | | | 39.0027 |
| STO | spherical | infinite | −0.1543 | | | |
| S5 | aspheric | 2.0542 | 0.2354 | 1.67 | 20.4 | −2.2688 |
| S6 | aspheric | 1.6947 | 0.1605 | | | −0.0825 |
| S7 | aspheric | 7.7784 | 0.4852 | 1.54 | 55.7 | 46.4426 |
| S8 | aspheric | −8.7372 | 0.4773 | | | −19.6497 |
| S9 | aspheric | −4.4688 | 0.4453 | 1.67 | 20.4 | 6.0903 |
| S10 | aspheric | −12.1079 | 0.1179 | | | 70.3353 |
| S11 | aspheric | 6.9646 | 0.6740 | 1.65 | 23.5 | −90.7042 |

TABLE 16-continued

| surface number | surface type | radius of curvature | thickness | material refractive index | abbe number | conic coefficient |
|---|---|---|---|---|---|---|
| S12 | aspheric | −7.2532 | 0.3313 | | | 2.8941 |
| S13 | aspheric | −3.3949 | 0.3000 | 1.54 | 55.7 | 0.0222 |
| S14 | aspheric | 3.5335 | 0.4122 | | | 0.0205 |
| S15 | spherical | infinite | 0.1100 | 1.52 | 64.2 | |
| S16 | spherical | infinite | 0.3151 | | | |
| S17 | spherical | infinite | | | | |

As can be known from Table 16, in the sixth embodiment, the object-side surface and the image-side surface of any one of the first lens E1 to the seventh lens E7 are aspheric surfaces. Table 17 shows the high-order coefficients of the aspheric surfaces applicable in the sixth embodiment. Here, the surface types of the aspheric surfaces may be defined by the formula (1) given above in the first embodiment.

TABLE 17

| surface number | A4 | A6 | A8 | A10 | A12 |
|---|---|---|---|---|---|
| S1 | −1.3550E−02 | −6.8375E−03 | −1.5368E−02 | 2.6046E−02 | −3.2367E−02 |
| S2 | 4.1831E−02 | −1.6761E−01 | 2.3208E−01 | −1.7293E−01 | 7.1399E−02 |
| S3 | 3.5342E−02 | −1.0557E−01 | 1.2918E−01 | −2.0390E−01 | −7.6277E−02 |
| S4 | −9.7973E−02 | 2.4912E−01 | −4.3951E−01 | 5.3454E−01 | −4.5291E−01 |
| S5 | −1.5619E−01 | 2.1268E−01 | −4.6548E−01 | 8.5598E−01 | −1.1108E+00 |
| S6 | −6.0041E−02 | −1.4808E−01 | 5.4761E−01 | −1.2811E+00 | 2.0168E+00 |
| S7 | 4.2228E−02 | 2.6027E−02 | −2.2995E−01 | 9.9269E−01 | −2.4358E+00 |
| S8 | 1.6069E−02 | −1.0888E−01 | 6.4835E−01 | −2.2786E+00 | 5.0231E+00 |
| S9 | −4.6057E−02 | −1.3805E−01 | 8.7363E−01 | −3.2850E+00 | 7.1192E+00 |
| S10 | −1.0294E−01 | −1.2762E−01 | 5.1095E−01 | −9.2867E−01 | 9.7445E−01 |
| S11 | −5.1534E−02 | −9.4906E−02 | 1.2051E−01 | −2.2185E−01 | −1.3320E−01 |
| S12 | 7.2360E−02 | −1.5240E−01 | 1.5408E−01 | −1.0542E−01 | 4.7757E−02 |
| S13 | −1.1581E−01 | 2.0419E−02 | 2.3914E−02 | −1.3080E−02 | 3.1883E−03 |
| S14 | −1.8425E−01 | 1.0395E−01 | −4.5571E−02 | 1.4236E−02 | −2.9971E−03 |

| surface number | A14 | A16 | A18 | A20 |
|---|---|---|---|---|
| S1 | 2.1715E−02 | −7.6164E−03 | 1.3451E−03 | −9.5042E−05 |
| S2 | −1.3991E−02 | 3.9498E−05 | 4.2440E−04 | −4.6059E−05 |
| S3 | 7.6658E−02 | −3.4639E−02 | 7.8336E−03 | −7.0910E−04 |
| S4 | 2.5781E−01 | −9.3416E−02 | 1.9400E−02 | −1.7492E−03 |
| S5 | 9.8129E−01 | −5.5751E−01 | 1.8184E−01 | −2.5735E−02 |
| S6 | −2.0313E+00 | 1.2237E+00 | −3.9816E−01 | 5.3346E−02 |
| S7 | 3.5943E+00 | −3.1517E+00 | 1.5111E+00 | −3.0457E−01 |
| S8 | −6.9524E+00 | 5.8953E+00 | −2.7996E+00 | 5.7458E−01 |
| S9 | −9.4743E+00 | 7.5607E+00 | −3.3244E+00 | 6.1865E−01 |
| S10 | −6.2771E−01 | 2.4212E−01 | −5.0778E−02 | 4.4872E−03 |
| S11 | 1.6660E−01 | −9.2663E−02 | 2.5619E−02 | −2.8196E−03 |
| S12 | −1.4244E−02 | 2.6984E−03 | −2.9330E−04 | 1.3857E−05 |
| S13 | −4.4875E−04 | 3.7694E−05 | −1.7633E−06 | 3.5513E−08 |
| S14 | 4.1008E−04 | −3.4712E−05 | 1.6449E−06 | −3.3293E−08 |

Table 18 gives the effective focal lengths f1 to f7 of the lenses, the total effective focal length f of the optical imaging lens assembly, the total track length TTL, and the half of the diagonal length ImgH of the effective pixel area on the image plane S17 in the sixth embodiment.

TABLE 18

| f1 (mm) | 5.30 | f6 (mm) | 5.62 |
|---|---|---|---|
| f2 (mm) | 39.10 | f7 (mm) | −3.18 |
| f3 (mm) | −19.67 | f (mm) | 4.38 |
| f4 (mm) | 7.75 | TTL (mm) | 5.27 |
| f5 (mm) | −10.87 | ImgH (mm) | 3.96 |

Figure 12A:
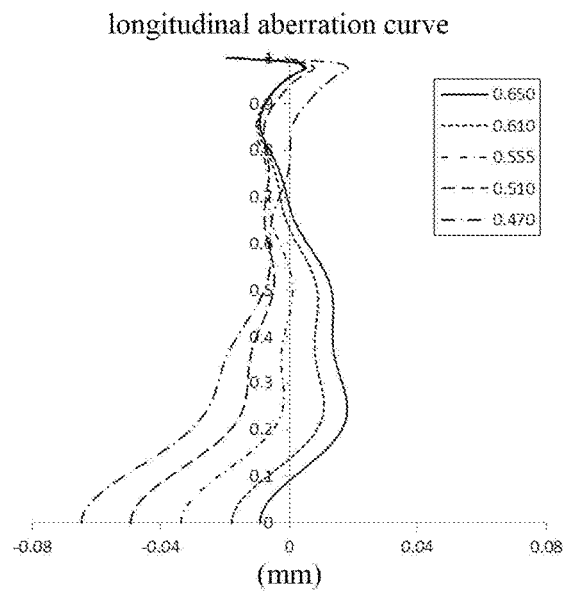
FIGS. 12A-12D respectively illustrate a longitudinal aberration curve, an astigmatic curve, a distortion curve and a lateral color curve of the optical imaging lens assembly according to the sixth embodiment.
Figure 12B:
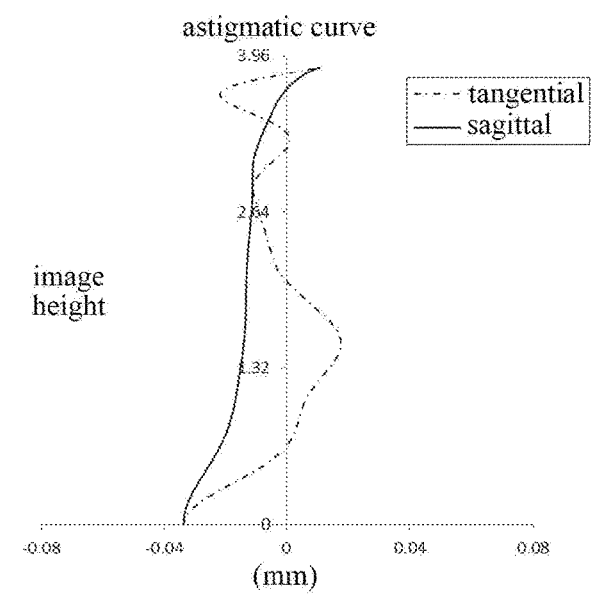
Figure 12C:
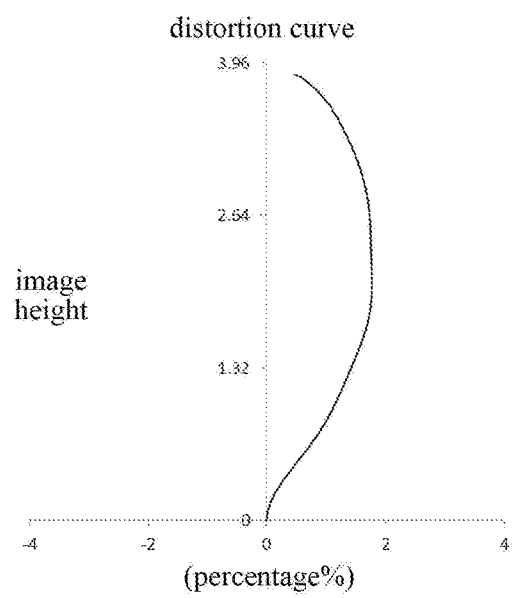
Figure 12D:
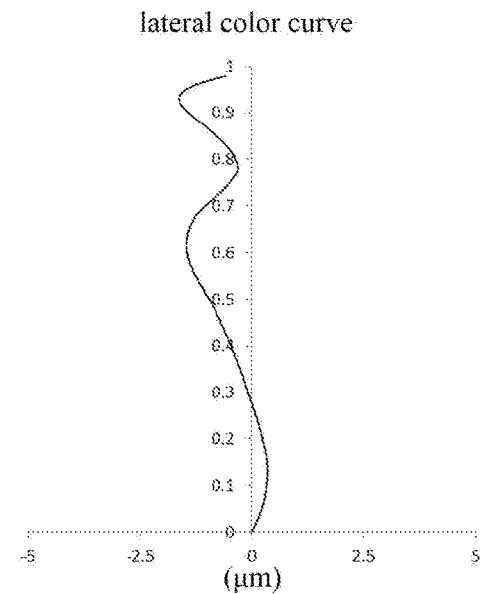

FIG. 12A shows the longitudinal aberration curve of the optical imaging lens assembly according to the sixth embodiment, representing deviations of focal points of light of different wavelengths converged after passing through the lens assembly. FIG. 12B shows the astigmatic curve of the optical imaging lens assembly according to the sixth embodiment, representing a curvature of the tangential image plane and a curvature of the sagittal image plane. FIG. 12C shows the distortion curve of the optical imaging lens assembly according to the sixth embodiment, representing amounts of distortion at different viewing angles. FIG. 12D shows the lateral color curve of the optical imaging lens assembly according to the sixth embodiment, representing deviations of different image heights on the image plane after light passes through the lens assembly. As can be seen according to FIGS. 12A to 12D, the optical imaging lens assembly given in the sixth embodiment may achieve good imaging quality.

Seventh Embodiment

An optical imaging lens assembly according to the seventh embodiment of the present disclosure is described below with reference to FIGS. 13-14D. FIG. 13 is a schematic structural diagram illustrating the optical imaging lens assembly according to the seventh embodiment of the present disclosure.

As shown in FIG. 13, the optical imaging lens assembly according to illustrative implementations of the present disclosure along the optical axis from the object side to the image side sequentially includes: a first lens E1, a second lens E2, a diaphragm STO, a third lens E3, a fourth lens E4, a fifth lens E5, a sixth lens E6, a seventh lens E7, an optical filter E8, and an image plane S17.

The first lens E1 has a positive refractive power, an object-side surface S1 of the first lens E1 is a convex surface, and an image-side surface S2 of the first lens E1 is a concave surface. The second lens E2 has a negative refractive power, an object-side surface S3 of the second lens E2 is a convex surface, and an image-side surface S4 of the second lens E2 is a concave surface. The third lens E3 has a negative refractive power, an object-side surface S5 of the third lens E3 is a convex surface, and an image-side surface S6 of the third lens E3 is a concave surface. The fourth lens E4 has a positive refractive power, an object-side surface S7 of the fourth lens E4 is a convex surface, and an image-side surface S8 of the fourth lens E4 is a convex surface. The fifth lens E5 has a negative refractive power, an object-side surface S9 of the fifth lens E5 is a concave surface, and an image-side surface S10 of the fifth lens E5 is a convex surface. The sixth lens E6 has a positive refractive power, an object-side surface S11 of the sixth lens E6 is a concave surface, and an image-side surface S12 of the sixth lens E6 is a convex surface. The seventh lens E7 has a negative refractive power, an object-side surface S13 of the seventh lens E7 is a concave surface, and an image-side surface S14 of the seventh lens E7 is a concave surface. The optical filter E8 has an object-side surface S15 and an image-side surface S16. Light from an object passes through the surfaces S1 to S16 sequentially and is finally imaged on the image plane S17.

Table 19 shows the surface type, the radius of curvature, the thickness, the material, and the conic coefficient of each lens of the optical imaging lens assembly in the seventh embodiment. The radius of curvature and the thickness are shown in millimeters (mm).

TABLE 19

| surface number | surface type | radius of curvature | thickness | refractive index | abbe number | conic coefficient |
|---|---|---|---|---|---|---|
| OBJ | spherical | infinite | infinite | | | |
| S1 | aspheric | 1.8302 | 0.6577 | 1.55 | 64.1 | −0.0233 |
| S2 | aspheric | 9.0010 | 0.1000 | | | −19.3482 |
| S3 | aspheric | 9.0632 | 0.2252 | 1.55 | 64.1 | 34.1175 |
| S4 | aspheric | 6.6405 | 0.1000 | | | −34.4929 |
| STO | spherical | infinite | 0.1000 | | | |
| S5 | aspheric | 3.2072 | 0.2200 | 1.67 | 20.4 | −1.9294 |
| S6 | aspheric | 2.3246 | 0.1046 | | | 0.4137 |
| S7 | aspheric | 9.9035 | 0.3701 | 1.54 | 55.7 | 81.9791 |
| S8 | aspheric | −15.9828 | 0.2434 | | | 80.3857 |
| S9 | aspheric | −6.3652 | 0.3091 | 1.67 | 20.4 | 9.5084 |
| S10 | aspheric | −10.9369 | 0.2434 | | | 80.6476 |
| S11 | aspheric | −4.0501 | 0.5739 | 1.65 | 23.5 | 8.5136 |
| S12 | aspheric | −2.1394 | 0.6891 | | | −0.1649 |
| S13 | aspheric | −4.3264 | 0.5460 | 1.54 | 55.7 | 0.0200 |
| S14 | aspheric | 3.3406 | 0.4321 | | | 0.0025 |
| S15 | spherical | infinite | 0.1100 | 1.52 | 64.2 | |
| S16 | spherical | infinite | 0.3352 | | | |
| S17 | spherical | infinite | | | | |

As can be known from Table 19, in the seventh embodiment, the object-side surface and the image-side surface of any one of the first lens E1 to the seventh lens E7 are aspheric surfaces. Table 20 shows the high-order coefficients of the aspheric surfaces applicable in the seventh embodiment. Here, the surface types of the aspheric surfaces may be defined by the formula (1) given above in the first embodiment.

TABLE 20

| surface number | A4 | A6 | A8 | A10 | A12 |
|---|---|---|---|---|---|
| S1 | −1.2978E−02 | 3.3370E−02 | −9.9989E−02 | 1.6255E−01 | −1.6361E−01 |
| S2 | −3.9781E−03 | 1.3324E−02 | 9.4220E−03 | −4.5210E−02 | 5.1281E−02 |
| S3 | −1.4257E−02 | 7.0073E−02 | −1.5125E−01 | 2.7720E−01 | −4.2599E−01 |
| S4 | −3.1681E−02 | 5.5855E−02 | −8.0169E−02 | 6.9976E−02 | −8.7678E−02 |
| S5 | −1.2103E−01 | 5.0795E−02 | 1.4787E−02 | −2.1263E−01 | 7.0603E−01 |
| S6 | −8.5106E−02 | 6.9009E−02 | −2.6828E−01 | 1.2120E+00 | −3.3695E+00 |
| S7 | 1.9705E−02 | 1.6084E−01 | −1.0111E+00 | 3.9067E+00 | −9.6143E+00 |
| S8 | 1.1298E−02 | −7.5722E−02 | 5.3356E−01 | −2.0471E+00 | 4.8094E+00 |
| S9 | −9.1261E−02 | −5.8595E−02 | 3.1526E−01 | −1.1494E+00 | 2.7740E+00 |
| S10 | −6.8051E−02 | −1.2277E−01 | 3.5155E−01 | −7.2776E−01 | 1.0192E+00 |
| S11 | 7.6727E−03 | −2.4022E−01 | 6.8321E−01 | −1.6033E+00 | 2.4506E+00 |
| S12 | 2.9209E−02 | −4.7490E−02 | 5.9507E−02 | −6.6313E−02 | 5.0326E−02 |
| S13 | −8.4282E−02 | 4.3094E−02 | −1.1964E−02 | 2.8344E−03 | −5.4236E−04 |
| S14 | −1.1259E−01 | 4.5631E−02 | −1.5509E−02 | 3.5970E−03 | −5.4645E−04 |

| surface number | A14 | A16 | A18 | A20 |
|---|---|---|---|---|
| S1 | 1.0037E−01 | −3.6183E−02 | 6.8356E−03 | −4.9882E−04 |
| S2 | −2.4454E−02 | 1.9906E−03 | 2.1112E−03 | −5.0032E−04 |
| S3 | 4.5777E−01 | −3.0526E−01 | 1.1193E−01 | −1.7132E−02 |
| S4 | 1.5305E−01 | −1.6529E−01 | 8.8231E−02 | −1.8306E−02 |
| S5 | −1.1546E+00 | 1.0212E+00 | −4.7376E−01 | 9.0397E−02 |
| S6 | 5.7970E+00 | −5.9767E+00 | 3.3437E+00 | −7.7772E−01 |
| S7 | 1.4893E+01 | −1.4001E+01 | 7.2727E+00 | −1.5941E+00 |
| S8 | −7.1887E+00 | 6.6684E+00 | −3.5144E+00 | 8.1292E−01 |
| S9 | −4.4916E+00 | 4.5139E+00 | −2.5508E+00 | 6.1534E−01 |
| S10 | −1.0054E+00 | 6.7165E−01 | −2.7478E−01 | 5.1786E−02 |
| S11 | −2.4440E+00 | 1.5178E+00 | −5.3424E−01 | 8.1095E−02 |
| S12 | −2.5012E−02 | 8.1398E−03 | −1.5556E−03 | 1.2832E−04 |
| S13 | 7.2234E−05 | −6.0393E−06 | 2.8298E−07 | −5.6586E−09 |
| S14 | 5.0136E−05 | −2.3442E−06 | 2.7986E−08 | 9.6042E−10 |

Table 21 gives the effective focal lengths f1 to f7 of the lenses, the total effective focal length f of the optical imaging lens assembly, the total track length TTL, and the half of the diagonal length ImgH of the effective pixel area on the image plane S17 in the seventh embodiment.

TABLE 21

| f1 (mm) | 4.08   | f6 (mm)   | 6.29  |
|---------|--------|-----------|-------|
| f2 (mm) | −47.05 | f7 (mm)   | −3.43 |
| f3 (mm) | −14.07 | f (mm)    | 4.70  |
| f4 (mm) | 11.45  | TTL (mm)  | 5.36  |
| f5 (mm) | −23.47 | ImgH (mm) | 3.90  |

FIG. 14A shows the longitudinal aberration curve of the optical imaging lens assembly according to the seventh embodiment, representing deviations of focal points of light of different wavelengths converged after passing through the lens assembly. FIG. 14B shows the astigmatic curve of the optical imaging lens assembly according to the seventh embodiment, representing a curvature of the tangential image plane and a curvature of the sagittal image plane. FIG. 14C shows the distortion curve of the optical imaging lens assembly according to the seventh embodiment, representing amounts of distortion at different viewing angles. FIG. 14D shows the lateral color curve of the optical imaging lens assembly according to the seventh embodiment, representing deviations of different image heights on the image plane after light passes through the lens assembly. As can be seen according to FIGS. 14A to 14D, the optical imaging lens assembly given in the seventh embodiment may achieve good imaging quality.

Eighth Embodiment

An optical imaging lens assembly according to the eighth embodiment of the present disclosure is described below with reference to FIGS. 15-16D. FIG. 15 is a schematic structural diagram illustrating the optical imaging lens assembly according to the eighth embodiment of the present disclosure.

As shown in FIG. 15, the optical imaging lens assembly according to illustrative implementations of the present disclosure along the optical axis from the object side to the image side sequentially includes: a first lens E1, a second lens E2, a diaphragm STO, a third lens E3, a fourth lens E4, a fifth lens E5, a sixth lens E6, a seventh lens E7, an optical filter E8, and an image plane S17.

The first lens E1 has a positive refractive power, an object-side surface S1 of the first lens E1 is a convex surface, and an image-side surface S2 of the first lens E1 is a concave surface. The second lens E2 has a positive refractive power, an object-side surface S3 of the second lens E2 is a convex surface, and an image-side surface S4 of the second lens E2 is a concave surface. The third lens E3 has a negative refractive power, an object-side surface S5 of the third lens E3 is a convex surface, and an image-side surface S6 of the third lens E3 is a concave surface. The fourth lens E4 has a positive refractive power, an object-side surface S7 of the fourth lens E4 is a convex surface, and an image-side surface S8 of the fourth lens E4 is a concave surface. The fifth lens E5 has a negative refractive power, an object-side surface S9 of the fifth lens E5 is a concave surface, and an image-side surface S10 of the fifth lens E5 is a convex surface. The sixth lens E6 has a positive refractive power, an object-side surface S11 of the sixth lens E6 is a convex surface, and an image-side surface S12 of the sixth lens E6 is a convex surface. The seventh lens E7 has a negative refractive power, an object-side surface S13 of the seventh lens E7 is a concave surface, and an image-side surface S14 of the seventh lens E7 is a concave surface. The optical filter E8 has an object-side surface S15 and an image-side surface S16. Light from an object passes through the surfaces S1 to S16 sequentially and is finally imaged on the image plane S17.

Table 22 shows the surface type, the radius of curvature, the thickness, the material, and the conic coefficient of each lens of the optical imaging lens assembly in the eighth embodiment. The radius of curvature and the thickness are shown in millimeters (mm).

TABLE 22

| surface number | surface type | radius of curvature | thickness | refractive index | abbe number | conic coefficient |
|---|---|---|---|---|---|---|
| OBJ | spherical | infinite | infinite | | | |
| S1 | aspheric | 1.9448 | 0.7061 | 1.55 | 64.1 | −0.0822 |
| S2 | aspheric | 7.1973 | 0.0303 | | | −26.1242 |
| S3 | aspheric | 8.8626 | 0.3949 | 1.55 | 64.1 | 17.7830 |
| S4 | aspheric | 12.8022 | 0.1090 | | | −83.6657 |
| STO | spherical | infinite | −0.0790 | | | |
| S5 | aspheric | 3.2838 | 0.2350 | 1.67 | 20.4 | −0.7483 |
| S6 | aspheric | 2.2979 | 0.1457 | | | 0.5827 |
| S7 | aspheric | 9.4897 | 0.3826 | 1.54 | 55.7 | 69.3380 |
| S8 | aspheric | 5599.5959 | 0.3205 | | | 99.0000 |
| S9 | aspheric | −11.5009 | 0.4049 | 1.67 | 20.4 | 0.1766 |
| S10 | aspheric | −12.4243 | 0.3176 | | | 87.5240 |
| S11 | aspheric | 120.9905 | 0.4314 | 1.65 | 23.5 | −99.0000 |
| S12 | aspheric | −6.0921 | 0.8756 | | | 3.7443 |
| S13 | aspheric | −4.1748 | 0.4441 | 1.54 | 55.7 | −0.0042 |
| S14 | aspheric | 3.4064 | 0.2843 | | | −0.0188 |
| S15 | spherical | infinite | 0.1100 | 1.52 | 64.2 | |
| S16 | spherical | infinite | 0.1872 | | | |
| S17 | spherical | infinite | | | | |

As can be known from Table 22, in the eighth embodiment, the object-side surface and the image-side surface of any one of the first lens E1 to the seventh lens E7 are aspheric surfaces. Table 23 shows the high-order coefficients of the aspheric surfaces applicable in the eighth embodiment. Here, the surface types of the aspheric surfaces may be defined by the formula (1) given above in the first embodiment.

TABLE 23

| surface number | A4 | A6 | A8 | A10 | A12 |
|---|---|---|---|---|---|
| S1 | −1.3295E−02 | 2.0858E−02 | −6.2458E−02 | 8.9521E−02 | −7.9984E−02 |
| S2 | 1.1726E−02 | −8.4898E−02 | 2.7958E−01 | −5.8061E−01 | 7.1682E−01 |
| S3 | 2.3988E−02 | −7.1634E−02 | 2.3363E−01 | −5.1718E−01 | 6.6876E−01 |
| S4 | −6.8646E−02 | 1.6140E−01 | −2.5715E−01 | 1.8836E−01 | 4.4809E−02 |
| S5 | −1.4646E−01 | 1.8545E−01 | −3.0804E−01 | 4.1628E−01 | −3.3529E−01 |
| S6 | −5.7620E−02 | −7.3962E−02 | 4.9745E−01 | −1.6727E+00 | 3.4960E+00 |

TABLE 23-continued

| | | | | | |
|---|---|---|---|---|---|
| S7 | 2.8697E−02 | −2.5309E−02 | −2.3749E−02 | 2.5848E−01 | −8.1068E−01 |
| S8 | −1.4398E−02 | 1.4957E−01 | −6.3923E−01 | 1.6092E+00 | −2.5109E+00 |
| S9 | −7.5909E−02 | 3.1761E−03 | −4.9650E−02 | 5.6303E−03 | 1.9733E−01 |
| S10 | −6.3707E−02 | −8.5360E−02 | 2.9099E−01 | −6.2969E−01 | 8.5679E−01 |
| S11 | −3.9035E−02 | −3.0029E−02 | −5.9573E−02 | 1.7525E−01 | −2.5093E−01 |
| S12 | 2.1605E−02 | −5.2530E−02 | 4.4468E−02 | −3.7351E−02 | 2.3530E−02 |
| S13 | −8.4398E−02 | 4.2442E−02 | −1.1193E−02 | 2.4380E−03 | −4.2754E−04 |
| S14 | −1.1088E−01 | 4.8335E−02 | −1.7219E−02 | 4.3209E−03 | −7.4196E−04 |

| surface number | A14 | A16 | A18 | A20 |
|---|---|---|---|---|
| S1 | 4.2681E−02 | −1.3169E−02 | 2.1375E−03 | −1.3859E−04 |
| S2 | −5.3034E−01 | 2.3387E−01 | −5.7230E−02 | 6.0235E−03 |
| S3 | −5.1101E−01 | 2.3199E−01 | −5.9005E−02 | 6.5904E−03 |
| S4 | −2.0810E−01 | 1.7174E−01 | −6.4309E−02 | 9.5962E−03 |
| S5 | 1.3175E−01 | −4.9213E−03 | −1.3164E−02 | 2.9689E−03 |
| S6 | −4.5261E+00 | 3.4973E+00 | −1.4672E+00 | 2.5498E−01 |
| S7 | 1.3591E+00 | −1.3050E+00 | 6.9491E−01 | −1.5899E−01 |
| S8 | 2.3908E+00 | −1.2975E+00 | 3.3693E−01 | −1.9125E−02 |
| S9 | −5.6359E−01 | 6.7182E−01 | −3.9339E−01 | 9.1211E−02 |
| S10 | −7.5709E−01 | 4.2058E−01 | −1.3448E−01 | 1.9183E−02 |
| S11 | 2.0702E−01 | −1.0137E−01 | 2.7251E−02 | −3.0441E−03 |
| S12 | −1.0041E−02 | 2.7678E−03 | −4.3842E−04 | 2.9769E−05 |
| S13 | 5.2830E−05 | −4.1339E−06 | 1.8170E−07 | −3.4016E−09 |
| S14 | 8.3556E−05 | −5.8032E−06 | 2.2376E−07 | −3.6645E−09 |

Table 24 gives the effective focal lengths f1 to f7 of the lenses, the total effective focal length f of the optical imaging lens assembly, the total track length TTL, and the half of the diagonal length ImgH of the effective pixel area on the image plane S17 in the eighth embodiment.

TABLE 24

| f1 (mm) | 4.66 | f6 (mm) | 9.01 |
|---|---|---|---|
| f2 (mm) | 50.96 | f7 (mm) | −3.42 |
| f3 (mm) | −12.68 | f (mm) | 4.52 |
| f4 (mm) | 17.71 | TTL (mm) | 5.30 |
| f5 (mm) | −281.39 | ImgH (mm) | 3.96 |

Figure 16A:
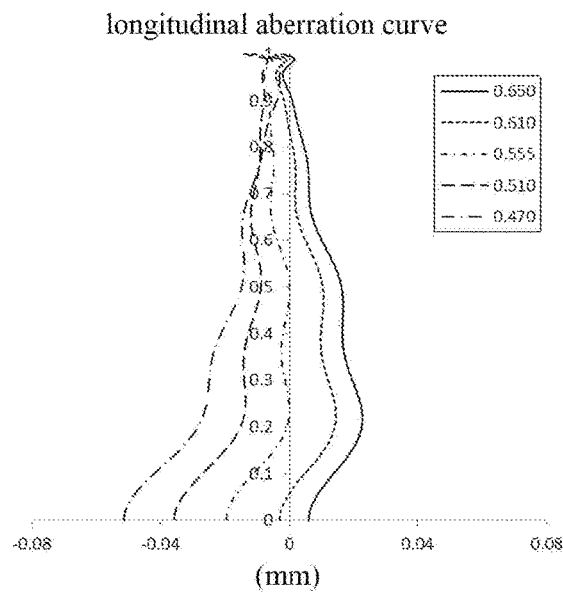
FIGS. 16A-16D respectively illustrate a longitudinal aberration curve, an astigmatic curve, a distortion curve and a lateral color curve of the optical imaging lens assembly according to the eighth embodiment.
Figure 16B:
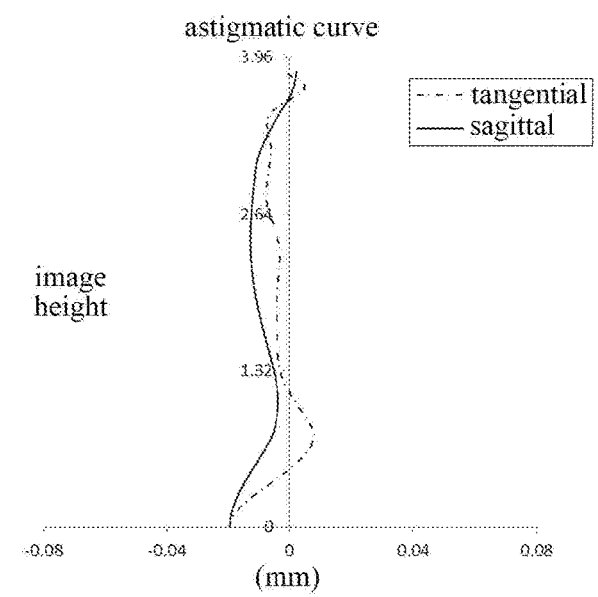
Figure 16C:
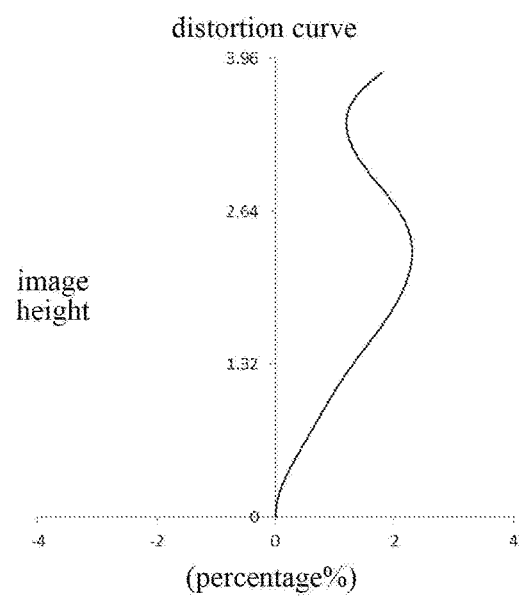
Figure 16D:
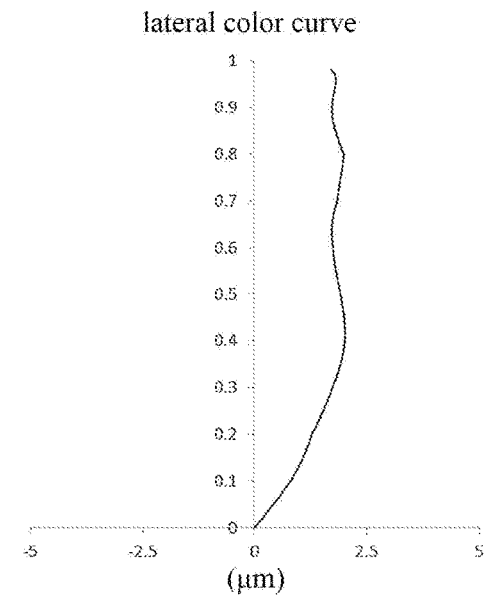

FIG. 16A shows the longitudinal aberration curve of the optical imaging lens assembly according to the eighth embodiment, representing deviations of focal points of light of different wavelengths converged after passing through the lens assembly. FIG. 16B shows the astigmatic curve of the optical imaging lens assembly according to the eighth embodiment, representing a curvature of the tangential image plane and a curvature of the sagittal image plane. FIG. 16C shows the distortion curve of the optical imaging lens assembly according to the eighth embodiment, representing amounts of distortion at different viewing angles. FIG. 16D shows the lateral color curve of the optical imaging lens assembly according to the eighth embodiment, representing deviations of different image heights on the image plane after light passes through the lens assembly. As can be seen according to FIGS. 16A to 16D, the optical imaging lens assembly given in the eighth embodiment may achieve good imaging quality.

Ninth Embodiment

An optical imaging lens assembly according to the ninth embodiment of the present disclosure is described below with reference to FIGS. 17-18D. FIG. 17 is a schematic structural diagram illustrating the optical imaging lens assembly according to the ninth embodiment of the present disclosure.

As shown in FIG. 17, the optical imaging lens assembly according to illustrative implementations of the present disclosure along the optical axis from the object side to the image side sequentially includes: a first lens E1, a second lens E2, a diaphragm STO, a third lens E3, a fourth lens E4, a fifth lens E5, a sixth lens E6, a seventh lens E7, an optical filter E8, and an image plane S17.

The first lens E1 has a positive refractive power, an object-side surface S1 of the first lens E1 is a convex surface, and an image-side surface S2 of the first lens E1 is a concave surface. The second lens E2 has a positive refractive power, an object-side surface S3 of the second lens E2 is a convex surface, and an image-side surface S4 of the second lens E2 is a concave surface. The third lens E3 has a negative refractive power, an object-side surface S5 of the third lens E3 is a convex surface, and an image-side surface S6 of the third lens E3 is a concave surface. The fourth lens E4 has a positive refractive power, an object-side surface S7 of the fourth lens E4 is a convex surface, and an image-side surface S8 of the fourth lens E4 is a concave surface. The fifth lens E5 has a positive refractive power, an object-side surface S9 of the fifth lens E5 is a concave surface, and an image-side surface S10 of the fifth lens E5 is a convex surface. The sixth lens E6 has a positive refractive power, an object-side surface S11 of the sixth lens E6 is a convex surface, and an image-side surface S12 of the sixth lens E6 is a convex surface. The seventh lens E7 has a negative refractive power, an object-side surface S13 of the seventh lens E7 is a concave surface, and an image-side surface S14 of the seventh lens E7 is a concave surface. The optical filter E8 has an object-side surface S15 and an image-side surface S16. Light from an object passes through the surfaces S1 to S16 sequentially and is finally imaged on the image plane S17.

Table 25 shows the surface type, the radius of curvature, the thickness, the material, and the conic coefficient of each lens of the optical imaging lens assembly in the ninth embodiment. The radius of curvature and the thickness are shown in millimeters (mm).

TABLE 25

| surface number | surface type | radius of curvature | thickness | material refractive index | abbe number | conic coefficient |
|---|---|---|---|---|---|---|
| OBJ | spherical | infinite | infinite | | | |
| S1 | aspheric | 1.9458 | 0.7043 | 1.55 | 64.1 | −0.0815 |
| S2 | aspheric | 7.1673 | 0.0311 | | | −27.2095 |
| S3 | aspheric | 8.9505 | 0.3868 | 1.55 | 64.1 | 18.1014 |
| S4 | aspheric | 10.6697 | 0.1110 | | | −88.6840 |
| STO | spherical | infinite | −0.0810 | | | |
| S5 | aspheric | 3.1317 | 0.2350 | 1.67 | 20.4 | −0.8783 |
| S6 | aspheric | 2.3135 | 0.1475 | | | 0.6321 |
| S7 | aspheric | 9.4867 | 0.3774 | 1.54 | 55.7 | 69.0806 |
| S8 | aspheric | 99.9101 | 0.3189 | | | −99.0000 |
| S9 | aspheric | −12.9293 | 0.4060 | 1.67 | 20.4 | −3.1779 |
| S10 | aspheric | −12.4160 | 0.3248 | | | 87.7429 |
| S11 | aspheric | 140.0423 | 0.4396 | 1.65 | 23.5 | 1.2285 |
| S12 | aspheric | −6.2190 | 0.8680 | | | 3.8417 |
| S13 | aspheric | −4.1732 | 0.4515 | 1.54 | 55.7 | −0.0095 |
| S14 | aspheric | 3.4107 | 0.2831 | | | −0.0192 |
| S15 | spherical | infinite | 0.1100 | 1.52 | 64.2 | |
| S16 | spherical | infinite | 0.1859 | | | |
| S17 | spherical | infinite | | | | |

As can be known from Table 25, in the ninth embodiment, the object-side surface and the image-side surface of any one of the first lens E1 to the seventh lens E7 are aspheric surfaces. Table 26 shows the high-order coefficients of the aspheric surfaces applicable in the ninth embodiment. Here, the surface types of the aspheric surfaces may be defined by the formula (1) given above in the first embodiment.

TABLE 26

| surface number | A4 | A6 | A8 | A10 | A12 |
|---|---|---|---|---|---|
| S1 | −1.3202E−02 | 2.0647E−02 | −6.2242E−02 | 8.9319E−02 | −7.9775E−02 |
| S2 | 1.1610E−02 | −8.4855E−02 | 2.8002E−01 | −5.8417E−01 | 7.2445E−01 |
| S3 | 2.4589E−02 | −7.2433E−02 | 2.3529E−01 | −5.2231E−01 | 6.7767E−01 |
| S4 | −6.9903E−02 | 1.6395E−01 | −2.6071E−01 | 1.9173E−01 | 4.3228E−02 |
| S5 | −1.4674E−01 | 1.8760E−01 | −3.2219E−01 | 4.4589E−01 | −3.7247E−01 |
| S6 | −5.4836E−02 | −7.3341E−02 | 4.8273E−01 | −1.6265E+00 | 3.4051E+00 |
| S7 | 2.7202E−02 | −3.7143E−02 | 4.7415E−02 | 4.8744E−02 | −4.1332E−01 |
| S8 | −9.1269E−03 | 8.4375E−02 | −3.1537E−01 | 6.6366E−01 | −7.7372E−01 |
| S9 | −7.8252E−02 | 2.7448E−02 | −1.7478E−01 | 3.9444E−01 | −5.4717E−01 |
| S10 | −6.3638E−02 | −7.6559E−02 | 2.6123E−01 | −5.8112E−01 | 8.1859E−01 |
| S11 | −3.7732E−02 | −3.3460E−02 | −4.8871E−02 | 1.5424E−01 | −2.2602E−01 |
| S12 | 2.0895E−02 | −5.0953E−02 | 4.1884E−02 | −3.4436E−02 | 2.1401E−02 |
| S13 | −8.4421E−02 | 4.2478E−02 | −1.1203E−02 | 2.4394E−03 | −4.2760E−04 |
| S14 | −1.1124E−01 | 4.8516E−02 | −1.7299E−02 | 4.3444E−03 | −7.4634E−04 |

| surface number | A14 | A16 | A18 | A20 |
|---|---|---|---|---|
| S1 | 4.2498E−02 | −1.3069E−02 | 2.1092E−03 | −1.3505E−04 |
| S2 | −5.3802E−01 | 2.3790E−01 | −5.8300E−02 | 6.1364E−03 |
| S3 | −5.1858E−01 | 2.3502E−01 | −5.9449E−02 | 6.5792E−03 |
| S4 | −2.0696E−01 | 1.6995E−01 | −6.3069E−02 | 9.3032E−03 |
| S5 | 1.6353E−01 | −2.2639E−02 | −7.4975E−03 | 2.1894E−03 |
| S6 | −4.4125E+00 | 3.4160E+00 | −1.4381E+00 | 2.5116E−01 |
| S7 | 8.6710E−01 | −9.2005E−01 | 5.2197E−01 | −1.2509E−01 |
| S8 | 3.7307E−01 | 1.3583E−01 | −2.3007E−01 | 7.6062E−02 |
| S9 | 3.2858E−01 | 2.1078E−02 | −1.2874E−01 | 4.4904E−02 |
| S10 | −7.5095E−01 | 4.3247E−01 | −1.4276E−01 | 2.0875E−02 |
| S11 | 1.8908E−01 | −9.3607E−02 | 2.5391E−02 | −2.8551E−03 |
| S12 | −9.0210E−03 | 2.4586E−03 | −3.8554E−04 | 2.5932E−05 |
| S13 | 5.2815E−05 | −4.1310E−06 | 1.8153E−07 | −3.3991E−09 |
| S14 | 8.4053E−05 | −5.8347E−06 | 2.2468E−07 | −3.6714E−09 |

Table 27 gives the effective focal lengths f1 to f7 of the lenses, the total effective focal length f of the optical imaging lens assembly, the total track length TTL, and the half of the diagonal length ImgH of the effective pixel area on the image plane S17 in the ninth embodiment.

TABLE 27

| f1 (mm) | 4.67 | f6 (mm) | 9.25 |
|---|---|---|---|
| f2 (mm) | 94.27 | f7 (mm) | −3.43 |
| f3 (mm) | −15.00 | f (mm) | 4.51 |
| f4 (mm) | 19.50 | TTL (mm) | 5.30 |
| f5 (mm) | 356.24 | ImgH (mm) | 3.96 |

Figures 18C, 18D:
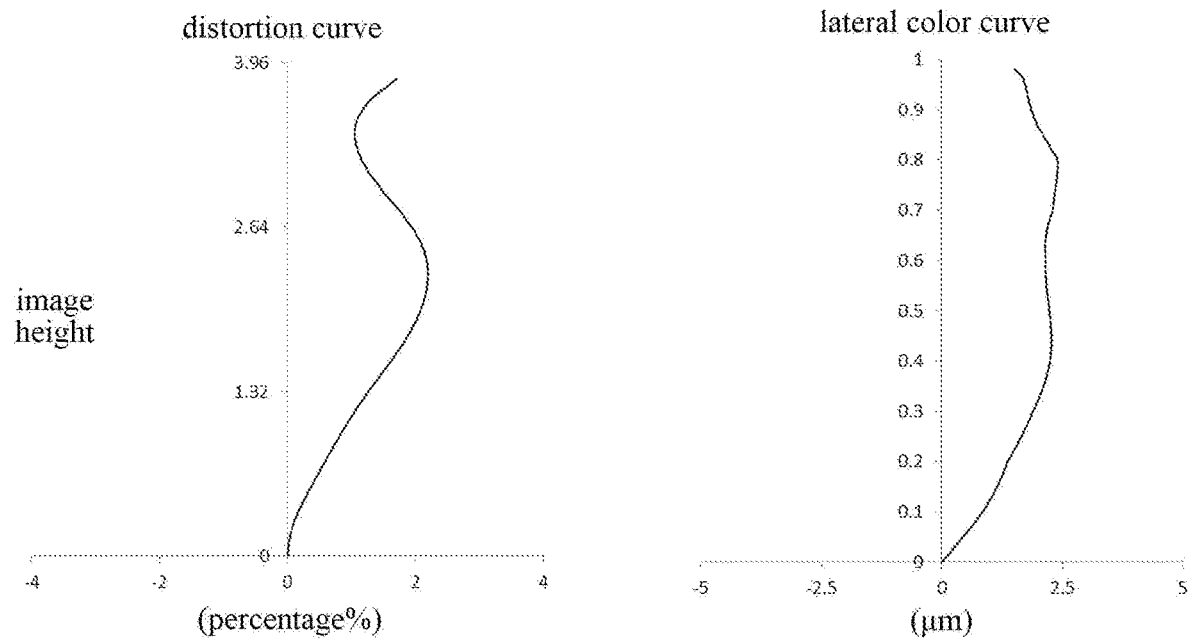

FIG. 18A shows the longitudinal aberration curve of the optical imaging lens assembly according to the ninth embodiment, representing deviations of focal points of light of different wavelengths converged after passing through the lens assembly. FIG. 18B shows the astigmatic curve of the optical imaging lens assembly according to the ninth embodiment, representing a curvature of the tangential image plane and a curvature of the sagittal image plane. FIG. 18C shows the distortion curve of the optical imaging lens assembly according to the ninth embodiment, representing amounts of distortion at different viewing angles. FIG. 18D shows the lateral color curve of the optical imaging lens assembly according to the ninth embodiment, representing deviations of different image heights on the image plane after light passes through the lens assembly. As can be seen according to FIGS. 18A to 18D, the optical imaging lens assembly given in the ninth embodiment may achieve good imaging quality.

Tenth Embodiment

Figure 19:
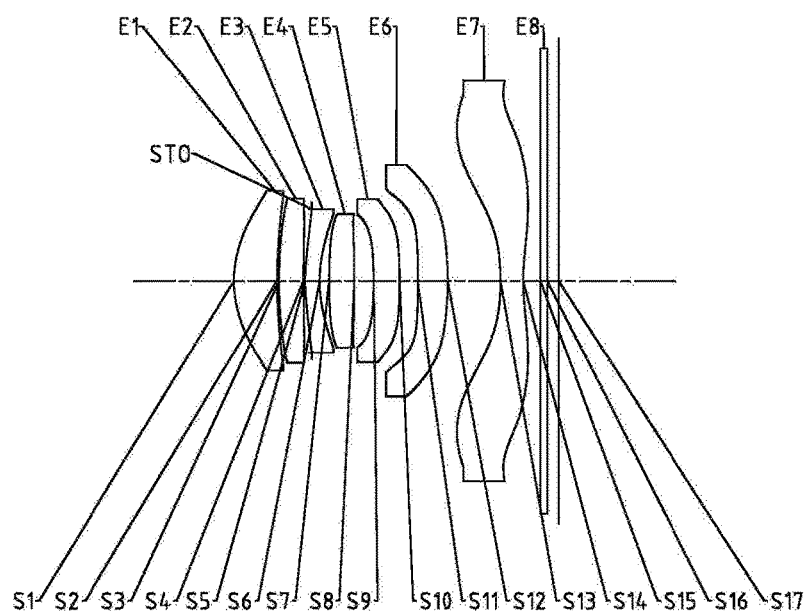
FIG. 19 is a schematic structural diagram illustrating an optical imaging lens assembly according to the tenth embodiment of the present disclosure.

An optical imaging lens assembly according to the tenth embodiment of the present disclosure is described below with reference to FIGS. 19-20D. FIG. 19 is a schematic structural diagram illustrating the optical imaging lens assembly according to the tenth embodiment of the present disclosure.

As shown in FIG. 19, the optical imaging lens assembly according to illustrative implementations of the present disclosure along the optical axis from the object side to the image side sequentially includes: a first lens E1, a second lens E2, a diaphragm STO, a third lens E3, a fourth lens E4, a fifth lens E5, a sixth lens E6, a seventh lens E7, an optical filter E8, and an image plane S17.

The first lens E1 has a positive refractive power, an object-side surface S1 of the first lens E1 is a convex surface, and an image-side surface S2 of the first lens E1 is a concave surface. The second lens E2 has a positive refractive power, an object-side surface S3 of the second lens E2 is a convex surface, and an image-side surface S4 of the second lens E2 is a concave surface. The third lens E3 has a negative refractive power, an object-side surface S5 of the third lens E3 is a convex surface, and an image-side surface S6 of the third lens E3 is a concave surface. The fourth lens E4 has a positive refractive power, an object-side surface S7 of the fourth lens E4 is a convex surface, and an image-side surface S8 of the fourth lens E4 is a convex surface. The fifth lens E5 has a negative refractive power, an object-side surface S9 of the fifth lens E5 is a concave surface, and an image-side surface S10 of the fifth lens E5 is a convex surface. The sixth lens E6 has a positive refractive power, an object-side surface S11 of the sixth lens E6 is a concave surface, and an image-side surface S12 of the sixth lens E6 is a convex surface. The seventh lens E7 has a negative refractive power, an object-side surface S13 of the seventh lens E7 is a concave surface, and an image-side surface S14 of the seventh lens E7 is a concave surface. The optical filter E8 has an object-side surface S15 and an image-side surface S16. Light from an object passes through the surfaces S1 to S16 sequentially and is finally imaged on the image plane S17.

Table 28 shows the surface type, the radius of curvature, the thickness, the material, and the conic coefficient of each lens of the optical imaging lens assembly in the tenth embodiment. The radius of curvature and the thickness are shown in millimeters (mm).

TABLE 28

| surface number | surface type | radius of curvature | thickness | refractive index | abbe number | conic coefficient |
|---|---|---|---|---|---|---|
| OBJ | spherical | infinite | infinite | | | |
| S1 | aspheric | 1.9409 | 0.7007 | 1.55 | 64.1 | −0.0919 |
| S2 | aspheric | 7.1433 | 0.0343 | | | −25.1072 |
| S3 | aspheric | 8.6489 | 0.3965 | 1.55 | 64.1 | 17.6087 |
| S4 | aspheric | 12.0636 | 0.1058 | | | −90.1696 |
| STO | spherical | infinite | −0.0758 | | | |
| S5 | aspheric | 3.1517 | 0.2350 | 1.67 | 20.4 | −0.7739 |
| S6 | aspheric | 2.2375 | 0.1513 | | | 0.5758 |
| S7 | aspheric | 9.4439 | 0.4126 | 1.54 | 55.7 | 68.4123 |
| S8 | aspheric | −24.7867 | 0.3166 | | | 99.0000 |
| S9 | aspheric | −7.9396 | 0.4314 | 1.67 | 20.4 | 6.9778 |
| S10 | aspheric | −12.6560 | 0.2925 | | | 85.8091 |
| S11 | aspheric | −196.7229 | 0.4922 | 1.65 | 23.5 | 99.0000 |
| S12 | aspheric | −5.2949 | 0.8572 | | | 2.8984 |
| S13 | aspheric | −4.1616 | 0.3691 | 1.54 | 55.7 | −0.0426 |
| S14 | aspheric | 3.4316 | 0.2839 | | | −0.0209 |
| S15 | spherical | infinite | 0.1100 | 1.52 | 64.2 | |
| S16 | spherical | infinite | 0.1867 | | | |
| S17 | spherical | infinite | | | | |

As can be known from Table 28, in the tenth embodiment, the object-side surface and the image-side surface of any one of the first lens E1 to the seventh lens E7 are aspheric surfaces. Table 29 shows the high-order coefficients of the aspheric surfaces applicable in the tenth embodiment. Here, the surface types of the aspheric surfaces may be defined by the formula (1) given above in the first embodiment.

TABLE 29

| surface number | A4 | A6 | A8 | A10 | A12 |
|---|---|---|---|---|---|
| S1 | −1.3103E−02 | 2.0408E−02 | −6.2914E−02 | 9.0961E−02 | −8.2002E−02 |
| S2 | 1.1930E−02 | −8.1787E−02 | 2.5607E−01 | −5.1538E−01 | 6.2343E−01 |
| S3 | 2.6191E−02 | −7.9284E−02 | 2.3407E−01 | −4.7785E−01 | 5.8238E−01 |
| S4 | −7.0905E−02 | 1.6896E−01 | −2.7483E−01 | 2.1876E−01 | 2.9571E−03 |
| S5 | −1.4690E−01 | 1.7550E−01 | −2.5455E−01 | 2.7854E−01 | −1.2981E−01 |
| S6 | −5.6085E−02 | −9.9681E−02 | 6.3047E−01 | −2.0481E+00 | 4.1403E+00 |
| S7 | 2.3075E−02 | 1.9413E−02 | −1.9616E−01 | 6.7841E−01 | −1.4503E+00 |
| S8 | 3.8178E−03 | −3.3048E−02 | 2.6599E−01 | −1.1765E+00 | 2.9134E+00 |
| S9 | −6.4389E−02 | −7.1921E−02 | 2.5052E−01 | −7.4894E−01 | 1.3420E+00 |
| S10 | −7.1028E−02 | −7.5252E−03 | −2.3805E−02 | 1.1819E−01 | −2.4642E−01 |
| S11 | −3.8872E−02 | −3.8130E−02 | −3.1598E−02 | 1.3043E−01 | −2.0655E−01 |
| S12 | 2.2168E−02 | −4.8927E−02 | 3.9465E−02 | −3.0572E−02 | 1.7944E−02 |
| S13 | −8.0499E−02 | 3.9439E−02 | −1.0110E−02 | 2.1359E−03 | −3.6344E−04 |
| S14 | −1.0904E−01 | 4.7578E−02 | −1.6939E−02 | 4.2628E−03 | −7.3394E−04 |

| surface number | A14 | A16 | A18 | A20 |
|---|---|---|---|---|
| S1 | 4.4169E−02 | −1.3807E−02 | 2.2898E−03 | −1.5372E−04 |
| S2 | −4.5403E−01 | 1.9782E−01 | −4.8028E−02 | 5.0379E−03 |
| S3 | −4.2160E−01 | 1.8149E−01 | −4.4039E−02 | 4.7659E−03 |
| S4 | −1.6350E−01 | 1.3993E−01 | −5.1566E−02 | 7.4704E−03 |
| S5 | −4.9395E−02 | 8.5499E−02 | −3.5430E−02 | 4.7332E−03 |
| S6 | −5.1990E+00 | 3.8995E+00 | −1.5859E+00 | 2.6628E−01 |

TABLE 29-continued

| | | | | |
|---|---|---|---|---|
| S7 | 1.9846E+00 | −1.7026E+00 | 8.4981E−01 | −1.8692E−01 |
| S8 | −4.3236E+00 | 3.8260E+00 | −1.8636E+00 | 3.8958E−01 |
| S9 | −1.5967E+00 | 1.1829E+00 | −5.0319E−01 | 9.4492E−02 |
| S10 | 2.6699E−01 | −1.6212E−01 | 5.1929E−02 | −6.6050E−03 |
| S11 | 1.7914E−01 | −9.0838E−02 | 2.5132E−02 | −2.8748E−03 |
| S12 | −7.2925E−03 | 1.9508E−03 | −3.0312E−04 | 2.0276E−05 |
| S13 | 4.3727E−05 | −3.3456E−06 | 1.4435E−07 | −2.6617E−09 |
| S14 | 8.2834E−05 | −5.7697E−06 | 2.2338E−07 | −3.6751E−09 |

Table 30 gives the effective focal lengths f1 to f7 of the lenses, the total effective focal length f of the optical imaging lens assembly, the total track length TTL, and the half of the diagonal length ImgH of the effective pixel area on the image plane S17 in the tenth embodiment.

TABLE 30

| | | | |
|---|---|---|---|
| f1 (mm) | 4.66 | f6 (mm) | 8.43 |
| f2 (mm) | 53.77 | f7 (mm) | −3.45 |
| f3 (mm) | −12.89 | f (mm) | 4.50 |
| f4 (mm) | 12.79 | TTL (mm) | 5.30 |
| f5 (mm) | −33.16 | ImgH (mm) | 3.96 |

Figure 20A:
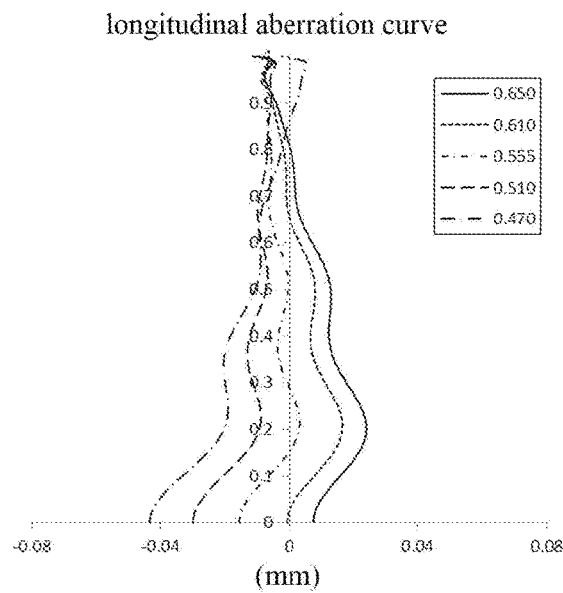
FIGS. 20A-20D respectively illustrate a longitudinal aberration curve, an astigmatic curve, a distortion curve and a lateral color curve of the optical imaging lens assembly according to the tenth embodiment.
Figure 20B:
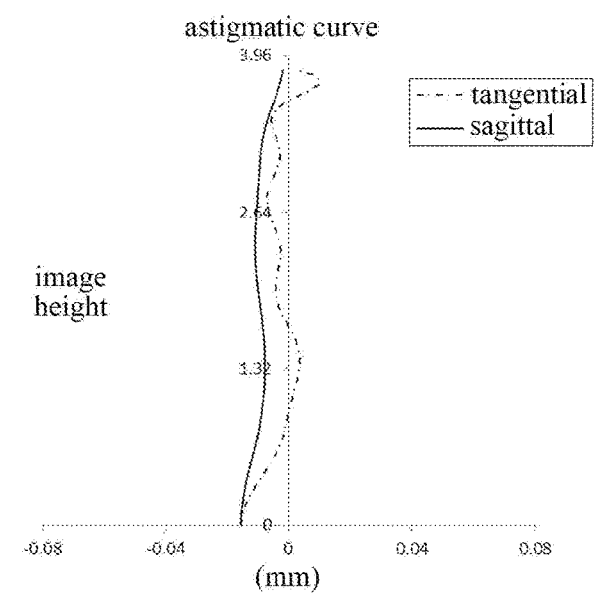
Figure 20C:
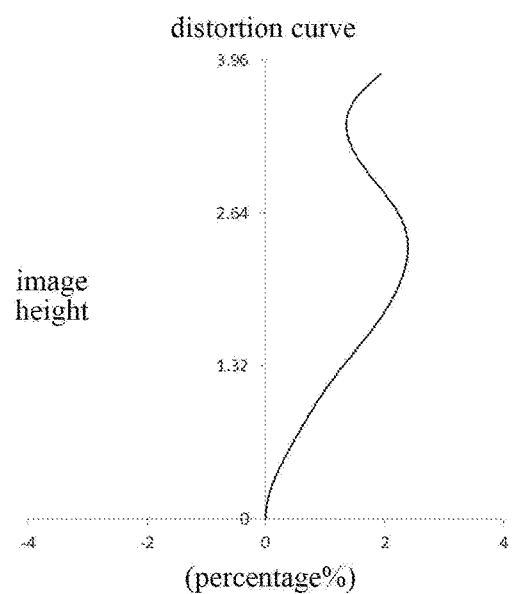
Figure 20D:
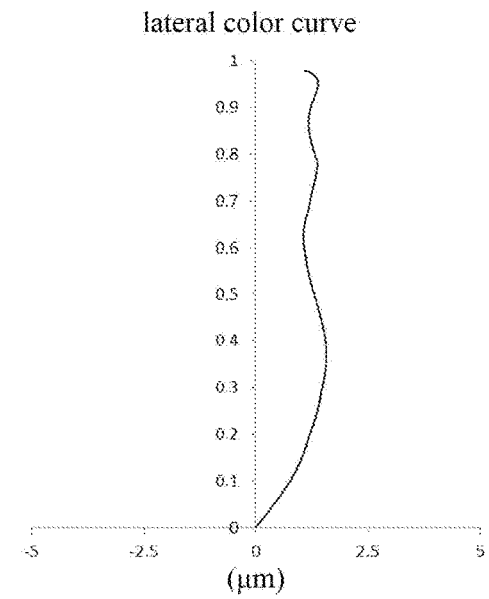

FIG. 20A shows the longitudinal aberration curve of the optical imaging lens assembly according to the tenth embodiment, representing deviations of focal points of light of different wavelengths converged after passing through the lens assembly. FIG. 20B shows the astigmatic curve of the optical imaging lens assembly according to the tenth embodiment, representing a curvature of the tangential image plane and a curvature of the sagittal image plane. FIG. 20C shows the distortion curve of the optical imaging lens assembly according to the tenth embodiment, representing amounts of distortion at different viewing angles. FIG. 20D shows the lateral color curve of the optical imaging lens assembly according to the tenth embodiment, representing deviations of different image heights on the image plane after light passes through the lens assembly. As can be seen according to FIGS. 20A to 20D, the optical imaging lens assembly given in the tenth embodiment may achieve good imaging quality.

Eleventh Embodiment

Figure 21:
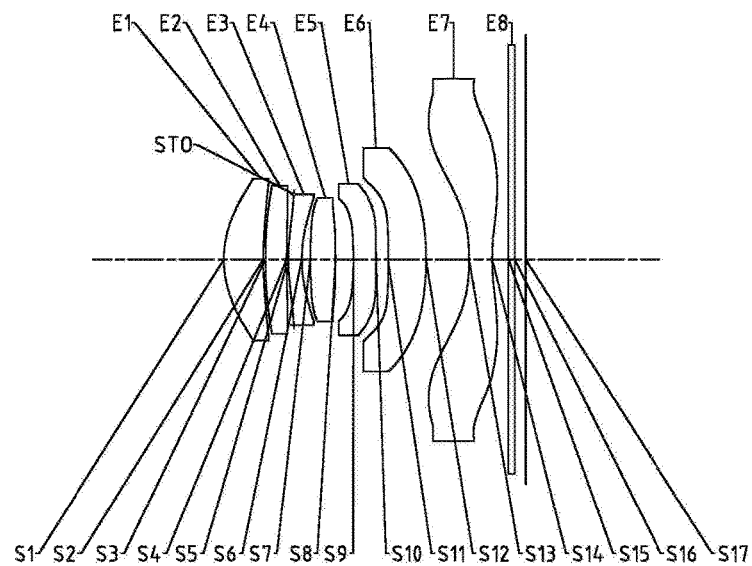
FIG. 21 is a schematic structural diagram illustrating an optical imaging lens assembly according to the eleventh embodiment of the present disclosure.

An optical imaging lens assembly according to the eleventh embodiment of the present disclosure is described below with reference to FIGS. 21-22D. FIG. 21 is a schematic structural diagram illustrating the optical imaging lens assembly according to the eleventh embodiment of the present disclosure.

As shown in FIG. 21, the optical imaging lens assembly according to illustrative implementations of the present disclosure along the optical axis from the object side to the image side sequentially includes: a first lens E1, a second lens E2, a diaphragm STO, a third lens E3, a fourth lens E4, a fifth lens E5, a sixth lens E6, a seventh lens E7, an optical filter E8, and an image plane S17.

The first lens E1 has a positive refractive power, an object-side surface S1 of the first lens E1 is a convex surface, and an image-side surface S2 of the first lens E1 is a concave surface. The second lens E2 has a positive refractive power, an object-side surface S3 of the second lens E2 is a convex surface, and an image-side surface S4 of the second lens E2 is a concave surface. The third lens E3 has a negative refractive power, an object-side surface S5 of the third lens E3 is a convex surface, and an image-side surface S6 of the third lens E3 is a concave surface. The fourth lens E4 has a positive refractive power, an object-side surface S7 of the fourth lens E4 is a convex surface, and an image-side surface S8 of the fourth lens E4 is a convex surface. The fifth lens E5 has a negative refractive power, an object-side surface S9 of the fifth lens E5 is a concave surface, and an image-side surface S10 of the fifth lens E5 is a concave surface. The sixth lens E6 has a positive refractive power, an object-side surface S11 of the sixth lens E6 is a convex surface, and an image-side surface S12 of the sixth lens E6 is a convex surface. The seventh lens E7 has a negative refractive power, an object-side surface S13 of the seventh lens E7 is a concave surface, and an image-side surface S14 of the seventh lens E7 is a concave surface. The optical filter E8 has an object-side surface S15 and an image-side surface S16. Light from an object passes through the surfaces S1 to S16 sequentially and is finally imaged on the image plane S17.

Table 31 shows the surface type, the radius of curvature, the thickness, the material, and the conic coefficient of each lens of the optical imaging lens assembly in the eleventh embodiment. The radius of curvature and the thickness are shown in millimeters (mm).

TABLE 31

| | | | | material | | |
|---|---|---|---|---|---|---|
| surface number | surface type | radius of curvature | thickness | refractive index | abbe number | conic coefficient |
| OBJ | spherical | infinite | infinite | | | |
| S1 | aspheric | 1.9424 | 0.6914 | 1.55 | 64.1 | −0.0913 |
| S2 | aspheric | 7.3220 | 0.0362 | | | −26.4787 |
| S3 | aspheric | 9.0905 | 0.3722 | 1.55 | 64.1 | 15.0392 |
| S4 | aspheric | 11.9565 | 0.0985 | | | −97.6122 |
| STO | spherical | infinite | −0.0684 | | | |
| S5 | aspheric | 3.1086 | 0.2350 | 1.67 | 20.4 | −1.2291 |
| S6 | aspheric | 2.2566 | 0.1494 | | | 0.3557 |
| S7 | aspheric | 9.9430 | 0.4419 | 1.54 | 55.7 | 74.0116 |
| S8 | aspheric | −10.9819 | 0.3122 | | | 76.6763 |
| S9 | aspheric | −9.4835 | 0.4102 | 1.67 | 20.4 | 11.4302 |
| S10 | aspheric | 212.5785 | 0.2085 | | | 99.0000 |
| S11 | aspheric | 59.3021 | 0.6678 | 1.65 | 23.5 | −99.0000 |
| S12 | aspheric | −4.8636 | 0.7536 | | | 1.5360 |
| S13 | aspheric | −4.1990 | 0.4039 | 1.54 | 55.7 | −0.0216 |
| S14 | aspheric | 3.3597 | 0.2874 | | | −0.0101 |
| S15 | spherical | infinite | 0.1100 | 1.52 | 64.2 | |
| S16 | spherical | infinite | 0.1903 | | | |
| S17 | spherical | infinite | | | | |

As can be known from Table 31, in the eleventh embodiment, the object-side surface and the image-side surface of any one of the first lens E1 to the seventh lens E7 are aspheric surfaces. Table 32 shows the high-order coefficients of the aspheric surfaces applicable in the eleventh embodiment. Here, the surface types of the aspheric surfaces may be defined by the formula (1) given above in the first embodiment.

TABLE 32

| surface number | A4 | A6 | A8 | A10 | A12 |
|---|---|---|---|---|---|
| S1 | −1.2008E−02 | 1.4777E−02 | −5.0875E−02 | 7.4055E−02 | −6.5751E−02 |
| S2 | 9.6136E−03 | −6.4118E−02 | 1.6320E−01 | −3.0650E−01 | 3.7109E−01 |
| S3 | 2.7813E−02 | −6.5573E−02 | 1.2839E−01 | −2.1224E−01 | 2.2468E−01 |
| S4 | −7.0242E−02 | 1.6957E−01 | −2.9585E−01 | 2.6475E−01 | −4.1851E−02 |
| S5 | −1.5241E−01 | 1.6854E−01 | −1.9556E−01 | 4.8660E−01 | 3.5354E−01 |
| S6 | −6.2568E−02 | −7.7873E−02 | 5.1008E−01 | −1.6570E+00 | 3.2845E+00 |
| S7 | 2.4237E−02 | 3.0154E−02 | −2.5866E−01 | 8.5342E−01 | −1.7624E+00 |
| S8 | 8.7264E−03 | −4.9951E−02 | 3.6140E−01 | −1.4128E+00 | 3.2129E+00 |
| S9 | −9.1628E−02 | 7.9467E−02 | −4.0789E−01 | 1.3408E+00 | −3.0393E+00 |
| S10 | −1.1623E−01 | 8.5511E−02 | −2.4584E−01 | 5.7129E−01 | −8.9904E−01 |
| S11 | −6.9923E−02 | −4.4477E−03 | −5.6552E−02 | 1.7213E−01 | −2.8143E−01 |
| S12 | 1.6029E−02 | −3.8001E−02 | 3.7948E−02 | −2.8683E−02 | 1.4615E−02 |
| S13 | −8.3127E−02 | 4.0771E−02 | −1.0388E−02 | 2.1382E−03 | −3.5187E−04 |
| S14 | −1.0648E−01 | 4.4829E−02 | −1.5325E−02 | 3.6650E−03 | −6.0195E−04 |

| surface number | A14 | A16 | A18 | A20 |
|---|---|---|---|---|
| S1 | 3.3025E−02 | −8.4697E−03 | 7.6757E−04 | 2.9749E−05 |
| S2 | −2.7150E−01 | 1.1857E−01 | −2.9316E−02 | 3.2361E−03 |
| S3 | −1.2961E−01 | 3.6432E−02 | −4.2101E−03 | 2.2281E−04 |
| S4 | −1.4274E−01 | 1.3933E−01 | −5.5210E−02 | 8.6704E−03 |
| S5 | −6.2811E−01 | 4.8557E−01 | −1.8472E−01 | 2.8036E−02 |
| S6 | −4.0104E+00 | 2.8968E+00 | −1.1166E+00 | 1.7346E−01 |
| S7 | 2.2893E+00 | −1.8489E+00 | 8.7415E−01 | −1.8409E−01 |
| S8 | −4.4758E+00 | 3.7675E+00 | −1.7573E+00 | 3.5347E−01 |
| S9 | 4.2640E+00 | −3.6183E+00 | 1.6920E+00 | −3.3401E−01 |
| S10 | 8.6850E−01 | −5.0142E−01 | 1.5899E−01 | −2.1092E−02 |
| S11 | 2.6000E−01 | −1.4231E−01 | 4.2744E−02 | −5.3082E−03 |
| S12 | −4.9779E−03 | 1.1069E−03 | −1.4462E−04 | 8.2878E−06 |
| S13 | 4.1097E−05 | −3.0628E−06 | 1.2852E−07 | −2.2839E−09 |
| S14 | 6.5218E−05 | −4.3743E−06 | 1.6327E−07 | −2.6023E−09 |

Table 33 gives the effective focal lengths f1 to f7 of the lenses, the total effective focal length f of the optical imaging lens assembly, the total track length TTL, and the half of the diagonal length ImgH of the effective pixel area on the image plane S17 in the eleventh embodiment.

TABLE 33

| f1 (mm) | 4.63 | f6 (mm) | 7.00 |
|---|---|---|---|
| f2 (mm) | 66.43 | f7 (mm) | −3.41 |
| f3 (mm) | −13.88 | f (mm) | 4.42 |
| f4 (mm) | 9.79 | TTL (mm) | 5.30 |
| f5 (mm) | −13.60 | ImgH (mm) | 3.96 |

Figures 22A, 22B:
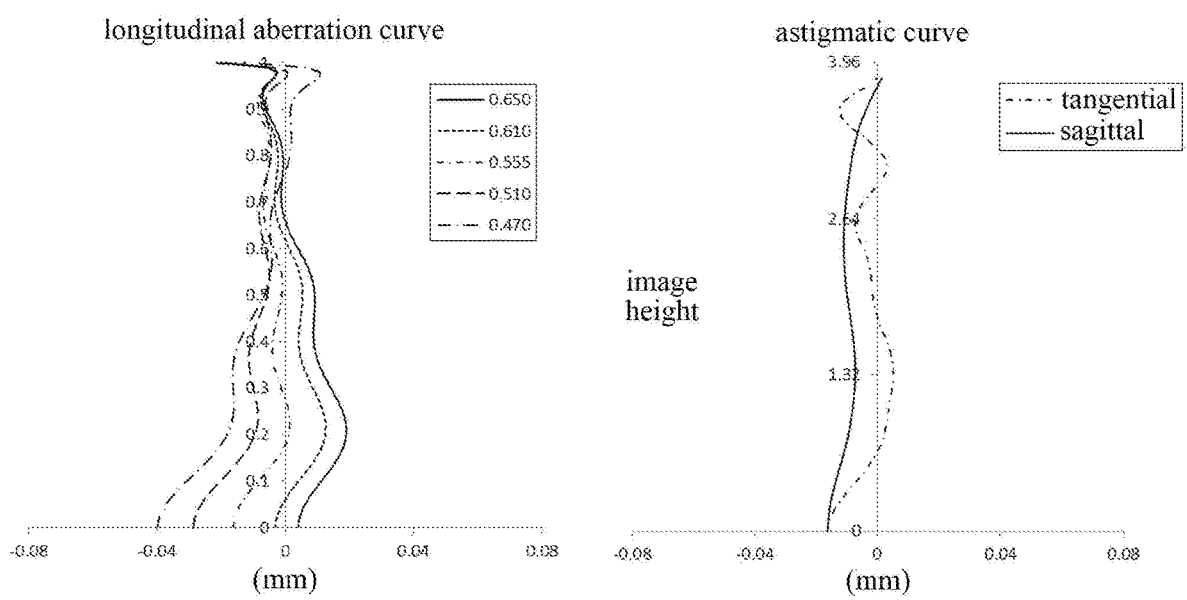
FIGS. 22A-22D respectively illustrate a longitudinal aberration curve, an astigmatic curve, a distortion curve and a lateral color curve of the optical imaging lens assembly according to the eleventh embodiment.
Figure 22C:
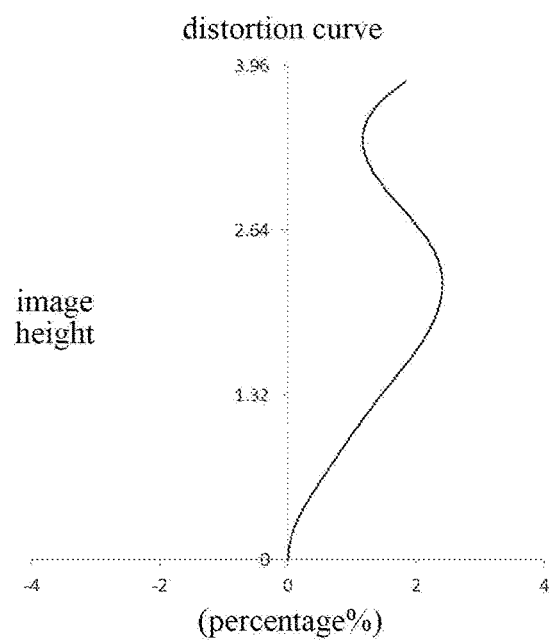
Figure 22D:
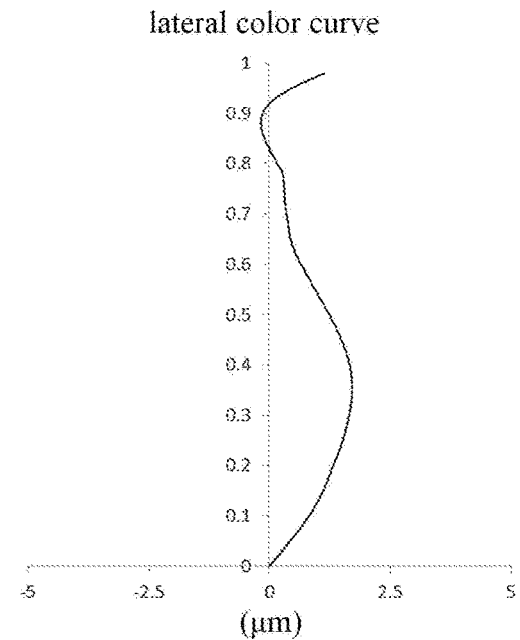

FIG. 22A shows the longitudinal aberration curve of the optical imaging lens assembly according to the eleventh embodiment, representing deviations of focal points of light of different wavelengths converged after passing through the lens assembly. FIG. 22B shows the astigmatic curve of the optical imaging lens assembly according to the eleventh embodiment, representing a curvature of the tangential image plane and a curvature of the sagittal image plane. FIG. 22C shows the distortion curve of the optical imaging lens assembly according to the eleventh embodiment, representing amounts of distortion at different viewing angles. FIG. 22D shows the lateral color curve of the optical imaging lens assembly according to the eleventh embodiment, representing deviations of different image heights on the image plane after light passes through the lens assembly. As can be seen according to FIGS. 22A to 22D, the optical imaging lens assembly given in the eleventh embodiment may achieve good imaging quality.

To sum up, the first to the eleventh embodiments respectively satisfy the relationships shown in Table 34.

TABLE 34

| conditional expression | embodiment | | | | | | | | | | |
|---|---|---|---|---|---|---|---|---|---|---|---|
| | 1 | 2 | 3 | 4 | 5 | 6 | 7 | 8 | 9 | 10 | 11 |
| TTL/ImgH | 1.34 | 1.34 | 1.34 | 1.33 | 1.33 | 1.33 | 1.37 | 1.34 | 1.34 | 1.34 | 1.34 |
| SAG41/CT4 | 0.25 | 0.25 | 0.27 | 0.27 | 0.30 | 0.38 | 0.34 | 0.34 | 0.35 | 0.32 | 0.29 |
| β52/β61 | 1.50 | 1.55 | 1.55 | 1.51 | 1.48 | 1.44 | 1.23 | 1.42 | 1.40 | 1.55 | 1.64 |
| ΣCT/TTL | 0.59 | 0.60 | 0.60 | 0.61 | 0.58 | 0.62 | 0.54 | 0.57 | 0.57 | 0.57 | 0.61 |
| f67/f | −1.67 | −1.64 | −1.68 | −1.63 | −2.14 | −2.26 | −1.97 | −1.50 | −1.47 | −1.61 | −2.03 |
| (R7 + R8)/(R7 − R8) | −0.08 | −0.07 | −0.08 | −0.07 | −0.19 | −0.06 | −0.23 | −1.00 | −1.21 | −0.45 | −0.05 |
| SL/TTL | 0.78 | 0.77 | 0.77 | 0.76 | 0.76 | 0.74 | 0.80 | 0.77 | 0.77 | 0.77 | 0.77 |
| T34/T67 | 0.21 | 0.18 | 0.18 | 0.17 | 0.27 | 0.48 | 0.15 | 0.17 | 0.17 | 0.18 | 0.20 |
| R13/R14 | −1.28 | −1.27 | −1.27 | −1.27 | −1.17 | −0.96 | −1.30 | −1.23 | −1.22 | −1.21 | −1.25 |
| f/f1 − f/f2 | 1.02 | 0.99 | 0.97 | 0.96 | 0.83 | 0.71 | 1.25 | 0.88 | 0.92 | 0.88 | 0.89 |

The present disclosure further provides an imaging device, having a photosensitive element that may be a photosensitive charge-coupled device (CCD) or a complementary metal-oxide semiconductor (CMOS) element. The imaging device may be an independent imaging device such as a digital camera, or may be an imaging module integrated in a mobile electronic device such as a mobile phone. The imaging device is equipped with the optical imaging lens assembly described above.

The foregoing is only a description for the preferred embodiments of the present disclosure and the applied technical principles. It should be appreciated by those skilled in the art that the inventive scope of the present disclosure is not limited to the technical solution formed by the particular combinations of the above technical features. The inventive scope should also cover other technical solutions formed by any combinations of the above technical features or equivalent features thereof without departing from the concept of the invention, such as technical solutions formed by replacing the features as disclosed in the present disclosure with (but not limited to) technical features with similar functions.

What is claimed is:

1. An optical imaging lens assembly comprising, sequentially along an optical axis from an object side to an image side: a first lens, a second lens, a third lens, a fourth lens, a fifth lens, a sixth lens, and a seventh lens,
   wherein the first lens has a positive refractive power, an object-side surface of the first lens is a convex surface, and an image-side surface of the first lens is a concave surface;
   each of the second lens, the third lens, the fourth lens, and the fifth lens has a positive refractive power or a negative refractive power;
   an image-side surface of the third lens is a concave surface;
   the sixth lens has a positive refractive power;
   the seventh lens has a negative refractive power, and both an object-side surface and an image-side surface of the seventh lens are concave surfaces; and
   a spacing distance TTL of a center of the object-side surface of the first lens to an image plane of the optical imaging lens assembly on the optical axis and half of a diagonal length ImgH of an effective pixel area on the image plane of the optical imaging lens assembly satisfy: $TTL/ImgH \leq 1.4$,
   wherein a distance SAG41 from an intersection point of an object-side surface of the fourth lens and the optical axis to a vertex of an effective radius of the object-side surface of the fourth lens on the optical axis and a center thickness CT4 of the fourth lens on the optical axis satisfy: $SAG41/CT4 < 0.5$.

2. The optical imaging lens assembly according to claim 1, wherein a maximum inclination angle β52 of an image-side surface of the fifth lens and a maximum inclination angle β61 of an object-side surface of the sixth lens satisfy: $1.0 < \beta 52/\beta 61 \leq 1.7$.

3. The optical imaging lens assembly according to claim 1, wherein a radius of curvature R7 of the object-side surface of the fourth lens and a radius of curvature R8 of an image-side surface of the fourth lens satisfy: $-1.5 < (R7+R8)/(R7-R8) \leq 0$.

4. The optical imaging lens assembly according to claim 1, wherein a spacing distance T34 of the third lens and the fourth lens on the optical axis and a spacing distance T67 of the sixth lens and the seventh lens on the optical axis satisfy: $T34/T67 \leq 0.50$.

5. The optical imaging lens assembly according to claim 1, wherein a radius of curvature R13 of the object-side surface of the seventh lens and a radius of curvature R14 of the image-side surface of the seventh lens satisfy: $-1.5 < R13/R14 < -0.5$.

6. The optical imaging lens assembly according to claim 5, wherein a combined focal length f67 of the sixth lens and the seventh lens and a total effective focal length f of the optical imaging lens assembly satisfy: $-2.5 < f67/f < -1$.

7. The optical imaging lens assembly according to claim 1, wherein a total effective focal length f of the optical imaging lens assembly, an effective focal length f1 of the first lens, and an effective focal length f2 of the second lens satisfy: $0.5 < f/f1 - f/f2 < 1.5$.

8. The optical imaging lens assembly according to claim 1, wherein a sum of center thicknesses ΣCT of the first lens to the seventh lens on the optical axis and the spacing distance TTL of the center of the object-side surface of the first lens to the image plane of the optical imaging lens assembly on the optical axis satisfy: $0.5 < \Sigma CT/TTL < 1$.

9. The optical imaging lens assembly according to claim 1, further comprising a diaphragm,
   wherein a spacing distance SL from the diaphragm to the image plane of the optical imaging lens assembly on the optical axis and the spacing distance TTL of the center of the object-side surface of the first lens to the image plane of the optical imaging lens assembly on the optical axis satisfy: $0.5 < SL/TTL < 1$.

10. An optical imaging lens assembly comprising, sequentially along an optical axis from an object side to an image side: a first lens, a second lens, a third lens, a fourth lens, a fifth lens, a sixth lens, and a seventh lens,
    wherein the first lens has a positive refractive power, an object-side surface of the first lens is a convex surface, and an image-side surface of the first lens is a concave surface;
    each of the second lens, the third lens, the fourth lens, and the fifth lens has a positive refractive power or a negative refractive power;
    an image-side surface of the third lens is a concave surface;
    the sixth lens has a positive refractive power;
    the seventh lens has a negative refractive power, and both an object-side surface and an image-side surface of the seventh lens are concave surfaces; and
    a combined focal length f67 of the sixth lens and the seventh lens and a total effective focal length f of the optical imaging lens assembly satisfy: $-2.5 < f67/f < -1$.

11. The optical imaging lens assembly according to claim 10, wherein the total effective focal length f of the optical imaging lens assembly, an effective focal length f1 of the first lens, and an effective focal length f2 of the second lens satisfy: $0.5 < f/f1 - f/f2 < 1.5$.

12. The optical imaging lens assembly according to claim 10, wherein a radius of curvature R7 of an object-side surface of the fourth lens and a radius of curvature R8 of an image-side surface of the fourth lens satisfy: $-1.5 < (R7+R8)/(R7-R8) \leq 0$.

13. The optical imaging lens assembly according to claim 12, wherein a distance SAG41 from an intersection point of the object-side surface of the fourth lens and the optical axis to a vertex of an effective radius of the object-side surface of the fourth lens on the optical axis and a center thickness CT4 of the fourth lens on the optical axis satisfy: $SAG41/CT4 < 0.5$.

14. The optical imaging lens assembly according to claim 12, wherein a radius of curvature R13 of the object-side surface of the seventh lens and a radius of curvature R14 of the image-side surface of the seventh lens satisfy: −1.5<R13/R14<−0.5.

15. The optical imaging lens assembly according to claim 10, wherein a maximum inclination angle β52 of an image-side surface of the fifth lens and a maximum inclination angle β61 of an object-side surface of the sixth lens satisfy: 1.0<β52/β61≤1.7.

16. The optical imaging lens assembly according to claim 10, wherein a spacing distance T34 of the third lens and the fourth lens on the optical axis and a spacing distance T67 of the sixth lens and the seventh lens on the optical axis satisfy: T34/T67≤0.50.

17. The optical imaging lens assembly according to claim 16, wherein a sum of center thicknesses ΣCT of the first lens to the seventh lens on the optical axis and a spacing distance TTL of a center of the object-side surface of the first lens to an image plane of the optical imaging lens assembly on the optical axis satisfy: 0.5<ΣCT/TTL<1.

18. The optical imaging lens assembly according to claim 17, further comprising a diaphragm,
wherein a spacing distance SL from the diaphragm to the image plane of the optical imaging lens assembly on the optical axis and the spacing distance TTL of the center of the object-side surface of the first lens to the image plane of the optical imaging lens assembly on the optical axis satisfy: 0.5<SL/TTL<1.

19. The optical imaging lens assembly according to claim 17, wherein the spacing distance TTL of the center of the object-side surface of the first lens to the image plane of the optical imaging lens assembly on the optical axis and half of a diagonal length ImgH of an effective pixel area on the image plane of the optical imaging lens assembly satisfy: TTL/ImgH≤1.4.

* * * * *